US009429761B2

(12) United States Patent
Imai et al.

(10) Patent No.: US 9,429,761 B2
(45) Date of Patent: Aug. 30, 2016

(54) COLOR SYNTHESIS OPTICAL ELEMENT, PROJECTION-TYPE DISPLAY DEVICE USING SAME, AND METHOD FOR CONTROLLING DISPLAY THEREOF

(75) Inventors: Masao Imai, Minato-ku (JP); Goroh Saitoh, Minato-ku (JP); Fujio Okumura, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 1192 days.

(21) Appl. No.: 13/498,512

(22) PCT Filed: Sep. 9, 2010

(86) PCT No.: PCT/JP2010/065469
§ 371 (c)(1),
(2), (4) Date: Mar. 27, 2012

(87) PCT Pub. No.: WO2011/037014
PCT Pub. Date: Mar. 31, 2011

(65) Prior Publication Data
US 2012/0188458 A1 Jul. 26, 2012

(30) Foreign Application Priority Data
Sep. 28, 2009 (JP) ................................. 2009-222355

(51) Int. Cl.
*G02B 27/14* (2006.01)
*G02B 27/10* (2006.01)
(Continued)

(52) U.S. Cl.
CPC ......... *G02B 27/149* (2013.01); *G02B 27/1046* (2013.01); *G02B 27/142* (2013.01);
(Continued)

(58) Field of Classification Search
CPC ... G02B 27/102; H04N 9/2204; G03B 21/13
USPC ......................................................... 353/20
See application file for complete search history.

(56) References Cited

U.S. PATENT DOCUMENTS

| 2005/0248733 A1 | 11/2005 | Sakata et al. |
| 2006/0001984 A1 | 1/2006 | Tani |
| 2007/0052928 A1* | 3/2007 | Maeda ............... G02B 27/1026 353/20 |

FOREIGN PATENT DOCUMENTS

| CN | 1047951 A | 12/1990 |
| CN | 1605214 A | 4/2005 |

(Continued)

OTHER PUBLICATIONS

Office Action dated Sep. 13, 2013, issued by the State Intellectual Property Office of the People's Republic of China in counterpart Chinese Application No. 201080043521.5.

(Continued)

*Primary Examiner* — William C. Dowling
*Assistant Examiner* — Jerry Brooks
(74) *Attorney, Agent, or Firm* — Sughrue Mion, PLLC

(57) ABSTRACT

A first dichroic mirror (2a) and a second dichroic mirror (2b) are formed on the bonding surfaces between four right angle prisms (1a-1d) so as to intersect. The first dichroic mirror (2a) transmits, of visible light of P-polarization, at least the light of a specific wavelength band and reflects, of visible light of S-polarization, at least the light of the specific wavelength band. The second dichroic mirror (2b) transmits, of visible light of P-polarization, at least light of the specific wavelength band and transmits, of visible light of S-polarization, at least light of the specific wavelength band. The cutoff wavelengths with respect to S-polarized light of both dichroic mirrors (2a and 2b) are set within ranges of bands other than those of the three primary colors of light.

28 Claims, 30 Drawing Sheets

(51) Int. Cl.
*G02B 27/28* (2006.01)
*G03B 21/14* (2006.01)
*H04N 9/31* (2006.01)
*G03B 21/20* (2006.01)

(52) U.S. Cl.
CPC ............ *G02B27/283* (2013.01); *G03B 21/14* (2013.01); *G03B 21/2073* (2013.01); *H04N 9/3105* (2013.01); *H04N 9/3167* (2013.01)

(56) References Cited

FOREIGN PATENT DOCUMENTS

| | | | |
|---|---|---|---|
| JP | 01-302385 A | 12/1989 | |
| JP | 2000-056410 A | 2/2000 | |
| JP | 2000-305040 A | 11/2000 | |
| JP | 2000-347292 A | 12/2000 | |
| JP | 2001-042431 A | 2/2001 | |
| JP | 2002-296680 A | 10/2002 | |
| JP | 2004-29692 A | 1/2004 | |
| JP | 2004-070018 A | 3/2004 | |
| JP | 2006-18067 * | 7/2004 | ............... G02B 5/04 |
| JP | 2004-325630 A | 11/2004 | |
| JP | 2005-189277 A | 7/2005 | |
| JP | 2005-321524 A | 11/2005 | |
| JP | 2006-018067 A | 1/2006 | |
| JP | 2006-337609 A | 12/2006 | |
| JP | 2007-279154 A | 10/2007 | |

OTHER PUBLICATIONS

Communication dated Aug. 26, 2014 from the Japanese Patent Office in counterpart application No. 2011-532957.

* cited by examiner

Figure of spectral reflectance characteristic (45° incidence)
of blue-reflecting multilayer film of color synthesis means Figure of spectral reflectance characteristic (45° incidence)
of red-reflecting multilayer film of color synthesis means

COLOR SYNTHESIS OPTICAL ELEMENT, PROJECTION-TYPE DISPLAY DEVICE USING SAME, AND METHOD FOR CONTROLLING DISPLAY THEREOF

CROSS REFERENCE TO RELATED APPLICATION

This application is a National Stage of International Application No. PCT/JP2010/065469, filed on Sep. 9, 2010, claiming priority based on Japanese Patent Application No. 2009-222355, filed Sep. 28, 2009, the contents of all of which are incorporated herein by reference in their entirety.

TECHNICAL FIELD

The present invention relates to a projection-type display device in which a projector is representative, and more particularly relates to a technique for synthesizing light of a plurality of colors.

BACKGROUND ART

In a projection-type display device that enlarges and projects a displayed image on display elements, the performance that is demanded varies depending on the purpose of use. For example, high color reproducibility is sought when displaying a full-color picture such as a movie. On the other hand, high luminance is demanded to enable visibility even in a bright room when used for a presentation such as in a conference.

In a projection-type display device, a white-light source, which is a discharge lamp such as a metal-halide lamp or high-pressure mercury lamp, is typically used as a light source.

When importance is placed on the color reproducibility of a projected image, light of the three primary colors red (R), green (G), and blue (B) having a narrow spectrum width is extracted from the white light of the light source. In this case, the light utilization efficiency of the illumination optics falls, and the projected image becomes darker.

On the other hand, when seeking higher luminance, the spectrum width of the three primary colors is set wider and the light from the white light source is used at its maximum. In this case, the color purity of the three primary colors drops, and high color reproducibility cannot be obtained.

The achievement of both brightness and color reproducibility is thus problematic in a projection-type display device.

When light of the three primary colors having good color purity for use in a color display is extracted from white light having a broad band spectrum of wavelengths from about 400 nm to 700 nm, yellow light having wavelength in the vicinity of 580 nm is not used. This is because when yellow light is added to green light, green becomes yellow-green and color purity deteriorates. In addition, when yellow light is added to red light, red becomes orange and color purity again deteriorates. When yellow light is used in this way, the color purity of the three primary colors deteriorates and high color reproducibility cannot be obtained.

However, the human eye is more visually sensitive to yellow light than red or blue light, and yellow light can therefore be effectively used to obtain a brighter picture.

Accordingly, a display device is disclosed in Patent Document 1 that allows switching between a display mode that, by inserting a color selection element in an optical path, implements display of a color image that prioritizes color reproducibility and a display mode that, by removing the color selection element from the optical path, implements display of a color image that prioritizes brightness.

According to Patent Document 1, a color selection element is used that is composed of a dichroic filter and that eliminates yellow light. Switching is carried out between a state in which the color selection element is inserted into the optical path of red (or green) light and a state in which the color selection element is removed from the optical path, and the video signal that is displayed on display element is controlled in accordance with the color purity of the illumination light, whereby switching is enabled between a color image display that prioritizes color reproducibility and a color image display that prioritizes brightness.

In a display device, white balance also figures as a factor deserving consideration in addition to brightness and color reproducibility. The color of white light (W) that is obtained by synthesizing the three primary colors of red, green and blue must be kept within a determined color range.

In order to achieve white balance, the ratio of the quantities of light is set when color-mixing the light of each of red, green, and blue. If the light of one of the three primary colors is weak, the quantity of light of the other two colors must be reduced to achieve balance. As a result of this constraint, the luminance of white light that is obtained is reduced.

Patent Documents 2 and 3 disclose display devices that provide improvements in not only brightness and color reproducibility but also white balance by replacing light of a specific wavelength band of the light from the white light source with light from another light source such as a semiconductor light source such as a light-emitting diode (LED) or laser diode (LD) or a light source referred to as a solid-state light source.

According to Patent Document 2, the quantity of light of the red wavelength component is small in a high-pressure mercury lamp that is used as a white light source. Accordingly, an LED array light source that emits red light is used for the red illumination light.

According to Patent Document 3, the light of the red wavelength component that has a smaller quantity of light within the white light from a white light source is partially replaced by using a hologram element for the light from a semiconductor laser light source that emits red light.

This use of a main illumination light and auxiliary illumination light obtains a display device with superior brightness, color reproducibility, as well as white balance.

The width of the spectrum of light of the three primary colors realized by solid-state light sources such as the above-described LEDs is narrower than light of a white light source which is a discharge lamp such as an existing high-pressure mercury lamp. As a result, a sol id-state light source has the advantage of allowing high color reproducibility to be obtained even without the use of color filters.

In addition, a solid-state light source has longer life than a discharge lamp and, because mercury is not used, is advantageous from the standpoint of environment concerns.

The installation of a dimmer function that controls the amount of current of an LED according to whether the viewing condition in which a display device is viewed is bright or dark or the displayed picture is bright or dark enables precise economizing of power according to the conditions.

In contrast to a discharge lamp that takes time after being lit until brightness reaches a steady state, a solid-state light source obtains a bright picture immediately after being lit. A solid-state light source further enhances convenience for users by, for example, eliminating the need for a waiting time for cooling before being relighted.

Due to the many advantages of a solid-state light source as described hereinabove, a solid-state light source is used as the light source of a projection-type display device.

However, emitted light having sufficient brightness cannot currently be obtained by a single LED. Accordingly, to achieve higher luminance, various techniques of synthesizing a plurality of colors have been proposed. For example, Patent Documents 4-6 disclose light source devices that synthesize luminous flux from a plurality of LEDs having different peak wavelengths by means of dichroic mirrors or dichroic prisms. The devices disclosed by these Patent Documents 4-6 use differences in wavelength to synthesize colored light by dichroic mirrors.

On the other hand, Patent Documents 7 and 8 disclose light source devices in which, in a light source device that synthesizes colored light from three light sources by means of a dichroic prism, at least one of the three light sources is a light source in which a plurality of light sources having different peak wavelengths is arranged in an array. These light source devices synthesize colored light spatially.

Another mode of synthesizing colored light is a technique that employs polarized light. For example, Patent Document 9 discloses an illumination device that, after first converting light from two light sources that emit light of random polarization directions to linearly polarized light having orthogonal directions of polarization, synthesizes the light by means of a polarization beam splitter.

As a related invention, Patent Document 10 discloses a light source device that arranges light of each color in a specific polarization direction in advance and then synthesizes the light by means of a dichroic prism. In addition, Patent Document 11 discloses a projection-type display device that selects the polarization direction of the incident light while taking into consideration the dependence on the angle of incidence when synthesizing colors by a dichroic prism.

The color synthesis optical element that is used in the light source device described in Patent Document 11 includes a blue-reflecting multilayer film and a red-reflecting multilayer film. FIG. 1A shows the spectral reflectance characteristic of the blue-reflecting multilayer film and FIG. 1B shows the spectral reflectance characteristic of the red-reflecting multilayer film.

As shown in FIG. 1A, the cutoff wavelength of the S-polarized light of the blue-reflecting multilayer film is at least 510 nm but no greater than 540 nm. In contrast, the cutoff wavelength of the S-polarized light of the red-reflecting multilayer film is at least 540 nm but no greater than 560 nm.

Light (P-polarized light) from a green light valve (display element) is entered into the blue-reflecting multilayer film and the red-reflecting multilayer film, and light (S-polarized light) from red and blue light valves (display elements) is entered into the blue-reflecting multilayer film and the red-reflecting multilayer film.

LITERATURE OF THE PRIOR ART

Patent Documents

Patent Document 1: Japanese Unexamined Patent Application Publication No. 2000-347292 (FIG. 1)
Patent Document 2: Japanese Unexamined Patent Application Publication No. 2000-305040 (FIG. 1)
Patent Document 3: Japanese Unexamined Patent Application Publication No. 2002-296680 (FIG. 1)
Patent Document 4: Japanese Unexamined Patent Application Publication No. 2001-042431 (FIG. 1)
Patent Document 5: Japanese Unexamined Patent Application Publication No. 2005-321524 (FIG. 1)
Patent Document 6: Japanese Unexamined Patent Application Publication No. 2004-070018 (FIG. 5)
Patent Document 7: Japanese Unexamined Patent Application Publication No. 2004-325630 (FIG. 1)
Patent Document 8: Japanese Unexamined Patent Application Publication No. 2005-189277 (FIG. 1)
Patent Document 9: Japanese Unexamined Patent Application Publication No. 2006-337609 (FIG. 1)
Patent Document 10: Japanese Unexamined Patent Application Publication No. 2000-056410 (FIG. 7)
Patent Document 11: Japanese Unexamined Patent Application Publication No. H1-302385 (FIG. 1)

SUMMARY OF THE INVENTION

In a display device that uses LEDs as the light sources of each of the colors red, green, and blue, a color synthesis optical element is used that synthesizes the colored light from the LEDs of each color to obtain white light, but this color synthesis optical element has problems as described hereinbelow.

A dichroic mirror is used as a means for separating and synthesizing colored light. Such a dichroic mirror is formed by a dielectric multilayer film, and therefore, while having the advantage that the absorption of light is small, also entails the disadvantages of incident angle dependence and polarization dependence.

The incident angle dependence means that the cutoff wavelength is shifted from the set value in the direction of shorter wavelengths or the direction of longer wavelengths according to the angle of incidence to the dichroic mirror. The polarization dependence means that the cutoff wavelength differs for P-polarized light and S-polarized light. Although incident angle dependence and polarization dependence do not occur in the case of perpendicular incidence (the incident angle is 0°), increase of the incident angle results in an increase of the amount of shift and an increase in the divergence of the cutoff wavelength from the designed value.

In the projection optics, there is also the constraint of etendue that is determined by the area of the light source and the angle of divergence. If the value that is the product of the area of the light source and the angle of divergence is not made less than or equal to the value of the product of the area of a display element and the acceptance angle (solid angle) that is determined by the f-number of the projection lens, the light from the light source will not be used as projection light. In other words, in the projection optics, there are constraints regarding the area of a semiconductor chip of an LED or the number of LEDs, and moreover, there is a constraint regarding the angular spread of the illumination light. Even if a multiplicity of LEDs is aligned in an array, brightness cannot be improved beyond the limits of etendue.

Still further, because the optical output characteristic of LEDs differ for each of the colors of red, green, and blue, the optical output of the LEDs of other colors must be restrained to match the optical output of the LEDs of the color having the lowest performance. As a result, the LEDs of other colors cannot be allowed to display maximum optical output performance.

A color synthesis optical element that enables display of the maximum optical output performance of the LEDs of each color and that can improve the optical utilization efficiency with mixed colors is difficult to obtain even with the combined use of the techniques of Patent Documents 1-11.

For example, even if the technique disclosed in Patent Document 11 in which the polarization dependence of a dichroic mirror is taken into consideration in selecting the polarization direction of incident light is used in a device that, taking the incident angle dependency and polarization dependency into consideration, uses polarization to synthesize light (Patent Document 9) or in a device that aligns the light of each color in a specific polarization direction in advance and then irradiates the light into a dichroic mirror (Patent Document 10), the light of a color that is inadequate at the LED light source cannot be compensated, and consequently, the constraints of etendue cannot be canceled and the optical output efficiency of all LEDs cannot be displayed at the maximum.

In a case in which an auxiliary illumination light is used to compensate brightness as in Patent Document 2 or Patent Document 3, the light utilization efficiency is not necessarily improved because the basic light that was replaced cannot be used, and further, because optical loss occurs during replacement.

When attempting to obtain a brighter luminous flux by synthesizing the light of four colors or six colors within the band of white light as shown in Patent Documents 5-8, light other than parallel luminous flux is produced, whereby the efficiency of synthesis of light falls due to incident angle dependency or polarization dependency.

It is an object of the present invention to provide a color synthesis optical element, a projection-type display device that is provided with this color synthesis optical element, and a display control method that can provide a solution to the above-described problems, enable the display of maximum optical output performance of LEDs, and improve optical utilization efficiency during color mixing.

To achieve the above-described object, the color synthesis optical element of the present invention includes:
an exit surface;
first to third incident surfaces; and
first and second films that are provided such that the film surfaces intersect each other and that selectively reflect or transmit incident light according to wavelength;
wherein:
the first film transmits, of visible light of a first polarization, at least light of a specific wavelength band and reflects, of visible light of a second polarization whose polarization state differs from that of the first polarization, at least light of the specific wavelength band;
the second film transmits, of visible light of the first polarization, at least light of the specific wavelength band and transmits, of visible light of the second polarization, at least light of the specific wavelength band;
the cutoff wavelengths of the first and second films with respect to the second polarization are set within a range of bands outside the wavelength bands of red, green and blue that are the three primary colors of light; and
light of the specific wavelength band of the first polarization and light of the specific wavelength of the second polarization are entered from different incident surfaces of the first to third incident surfaces and are exited by way of the first and second films from the exit surface.

The projection-type display device of the present invention includes:

first to third light sources;
first to third display elements that have a one-to-one correspondence with the first to third light sources and into each of which colored light is entered from the corresponding light source;
the above-described color synthesis optical element in which colored light of a first polarization that is entered to the second incident surface from the second display element and colored light of a second polarization whose polarization state differs from that of the first polarization that is entered to the first and third incident surfaces from the first and third display elements, respectively, are exited from the exit surface; and
projection optics that are provided in the direction of progression of light that is entered from the color synthesis optical element and that project an image that is displayed by the first to third display elements;
wherein:
the first light source includes a solid-state light source of a first color;
the second light source includes a solid-state light source of a second color that differs from the first color;
the third light source includes a solid-state light source of a third color that differs from the first and second colors; and
one of the first to third light sources further includes a solid-state light source of at least one specific color having a peak wavelength in a wavelength band that corresponds to the color of the solid-state light source that is used for one of the other two light sources.

The display control method of the present invention is a display control method of a projection-type display device that irradiates luminous flux from a first light source that is composed of a solid-state light source of a first color and a solid-state light source of a second color that differs from the first color to a first display element, irradiates luminous flux from a second light source that is composed of another solid-state light source of the second color to a second display element, irradiates luminous flux from a third light source composed of a solid-state light source of a third color that differs from the first and second colors to a third display element, and projects, by projection optics and by way of the above-described color synthesis optical element, images that are formed in the first to third display elements; the display control method including:
when a first display mode for implementing a display that prioritizes color reproducibility is set, controlling, in accordance with the emitted luminous flux of the light source having the smallest optical output among the first to third light sources, the optical output of the other two light sources in a state in which the solid-state light source of the second color in the first light source is not lighted; and
when a second display mode for implementing a display that prioritizes brightness is set, lighting all solid-state light sources of the first to third light sources and controlling the optical output of the solid-state light sources of the first to third colors in accordance with luminous flux obtained by adding together the emitted luminous flux from the solid-state light source of the second color and the luminous flux from the other solid-state light source of the second color.

EXPLANATION OF REFERENCE NUMBERS 1 color synthesis optical element
1a-1d right angle prisms
2a first dichroic mirror
2b second dichroic mirror

BEST MODE FOR CARRYING OUT THE INVENTION

Exemplary embodiments of the present invention are next described with reference to the accompanying drawings.

Details regarding the exemplary embodiments of the present invention are described with reference to the accompanying figures.

First Exemplary Embodiment

Figure 2:
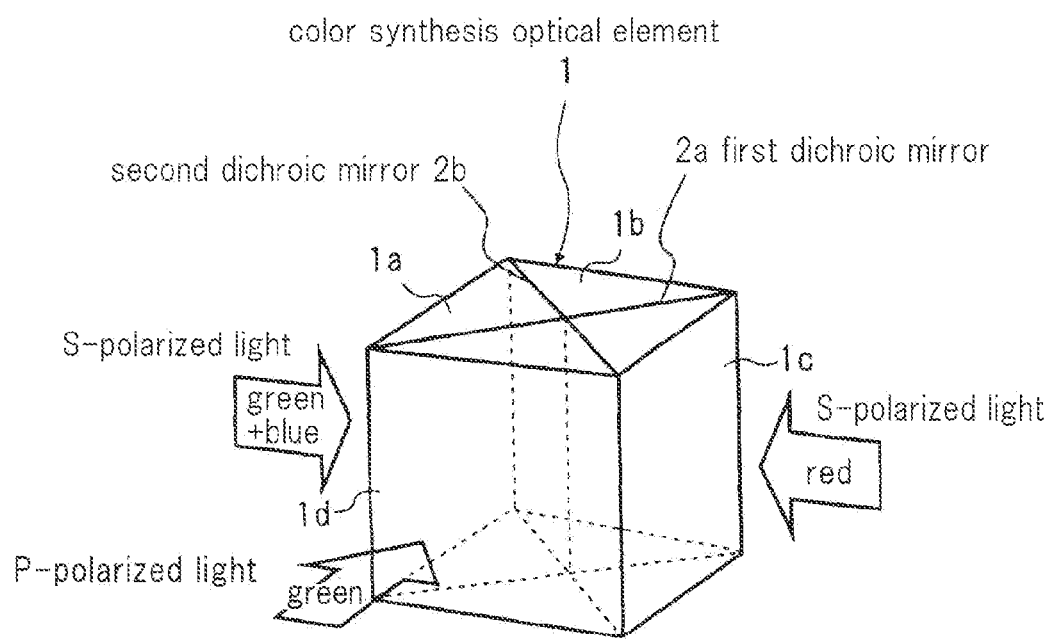
FIG. 2 is a perspective view showing the configuration of the color synthesis optical element that is the first exemplary embodiment of the present invention.

FIG. 2 is a perspective view showing the configuration of the color synthesis optical element that is the first exemplary embodiment of the present invention.

Referring to FIG. 2, color synthesis optical element 1 is a cross dichroic prism made up from four right angle prisms 1a-1d that are joined together at surfaces that form right angles. A uniform first plane is formed by the bonding surfaces of right angle prisms 1a and 1d and the bonding surfaces of right angle prisms 1b and 1c, and first dichroic mirror 2a that is composed of a dielectric multilayer film is formed on this first plane. A uniform second plane that intersects the first plane is formed by the bonding surfaces of right angle prisms 1a and 1b and the bonding surfaces of right angle prisms 1c and 1d, and second dichroic mirror 2b composed of a dielectric multilayer film is formed on this second plane. In other words, first dichroic mirror 2a and second dichroic mirror 2b are formed such that their film surfaces cross each other.

Light is entered from three surfaces (surfaces of each of right angle prisms 1a, 1c, and 1d) among the four side surfaces of color synthesis optical element 1 and the colors are synthesized. S-polarized light (green+blue) is entered to the surface (side surface) of right angle prism 1a, and S-polarized light (red) is entered to the surface (side surface) of right angle prism 1c that is opposite this surface. P-polarized light (green) is entered to the surface (side surface) of right angle prism 1d. The remaining side surface (the surface of right angle prism 1b that is opposite the surface of right angle prism 1d) is the exit surface from which light resulting from the synthesis of the light entered from the three side surfaces is exited.

Figure 3A:
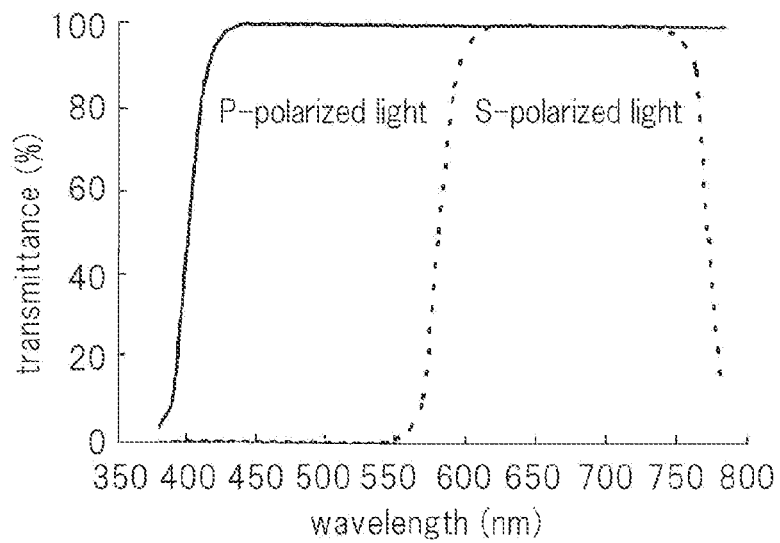
FIG. 3A is a graph showing the spectral transmittance characteristic with respect to P-polarized light and S-polarized light of the first dichroic mirror of the color synthesis optical element shown in FIG. 2.
Figure 3B:
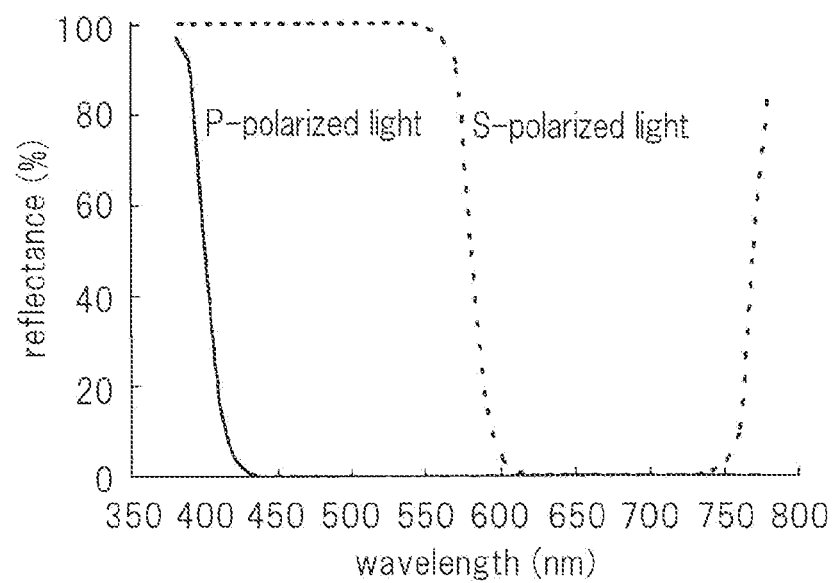
FIG. 3B is a graph showing the spectral reflectance characteristic with respect to P-polarized light and S-polarized light of the first dichroic mirror of the color synthesis optical element shown in FIG. 2.

FIG. 3A is a graph showing the spectral transmittance characteristic with respect to the P-polarized light and S-polarized light of first dichroic mirror 2a. FIG. 3B is a graph showing the spectral reflectance characteristic with respect to P-polarized light and S-polarized light of first dichroic mirror 2a.

The cutoff wavelength is defined as the wavelength at which transmittance, or reflectance, becomes 50%. The cutoff wavelength of first dichroic mirror 2a with respect to incident P-polarized light is 400 nm. In this case, first dichroic mirror 2a mainly transmits and does not reflect light of P-polarized light having a wavelength of 400 nm or more. On the other hand, the cutoff wavelength of first dichroic mirror 2a with respect to incident S-polarized light is 580 nm. In this case, first dichroic mirror 2a largely transmits and does not reflect S-polarized light having a wavelength of 580 nm or more. First dichroic mirror 2a largely reflects and does not transmit light of S-polarized light having a wavelength shorter than 580 nm.

If the characteristics of first dichroic mirror 2a are expressed as action with respect to colored light, regarding blue and green light, first dichroic mirror 2a transmits P-polarized light and reflects S-polarized light. In other words, first dichroic mirror 2a acts as a polarization beam splitter for blue and green light. In addition, first dichroic mirror 2a does not act in any way upon red light and transmits both P-polarized light and S-polarized light.

Figure 4A:
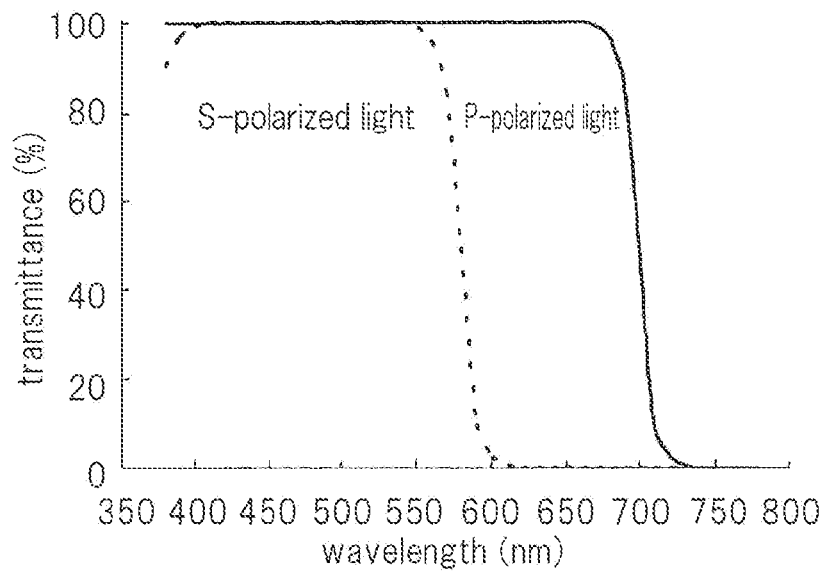
FIG. 4A is a graph showing the spectral transmittance characteristic with respect to P-polarized light and S-polarized light of the second dichroic mirror of the color synthesis optical element shown in FIG. 2.
Figure 4B:
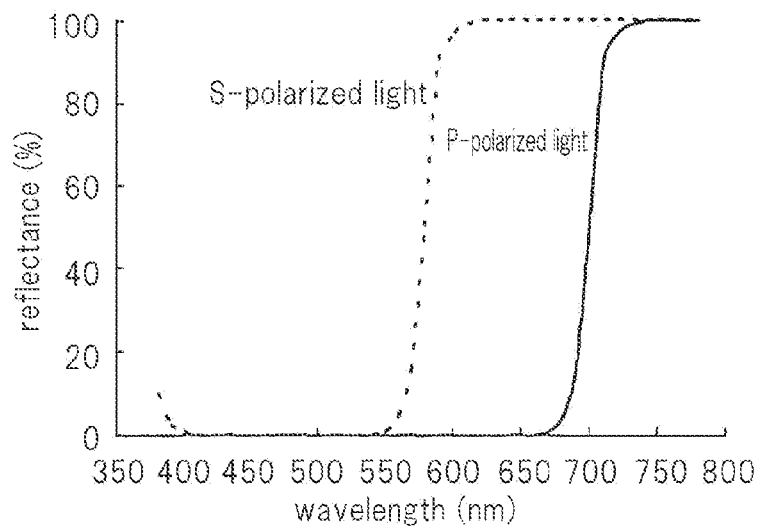
FIG. 4B is a graph showing the spectral reflectance characteristic with respect to P-polarized light and S-polarized light of the second dichroic mirror of the color synthesis optical element shown in FIG. 2.

FIG. 4A is a graph showing the spectral transmittance characteristic with respect to P-polarized light and S-polarized light of second dichroic mirror 2b. FIG. 4B is a graph showing the spectral reflectance characteristic with respect to P-polarized light and S-polarized light of second dichroic mirror 2b.

The cutoff wavelength of second dichroic mirror 2b for incident P-polarized light is 700 nm. In this case, second dichroic mirror 2b largely transmits and does not reflect P-polarized light having a wavelength of 700 nm or less. On the other hand, the cutoff wavelength of second dichroic mirror 2b with respect to incident S-polarized light is 580 nm. In this case, second dichroic mirror 2b largely reflects and does not transmit S-polarized light having a wavelength of 580 nm or more. In addition, second dichroic mirror 2b largely transmits and does not reflect S-polarized light having a wavelength shorter than 580 nm.

If the characteristics of second dichroic mirror 2b are expressed as action with respect to colored light, second dichroic mirror 2b does not act in any way upon blue and green light and transmits both P-polarized light and S-polarized light. With respect to red light, second dichroic mirror 2b transmits P-polarized light and reflects S-polarized light. In other words, with respect to red light, second dichroic mirror 2b acts as a polarization beam splitter.

Figure 1A:
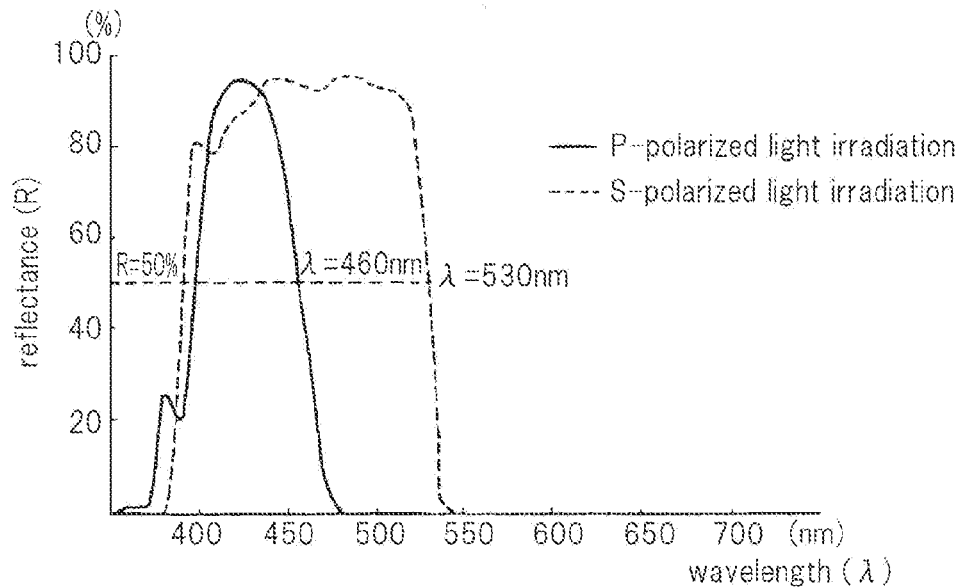
FIG. 1A is a graph showing the spectral reflectance characteristic of the blue-reflecting multilayer film of the color synthesis optical element described in Patent Document 11.
Figure 1B:
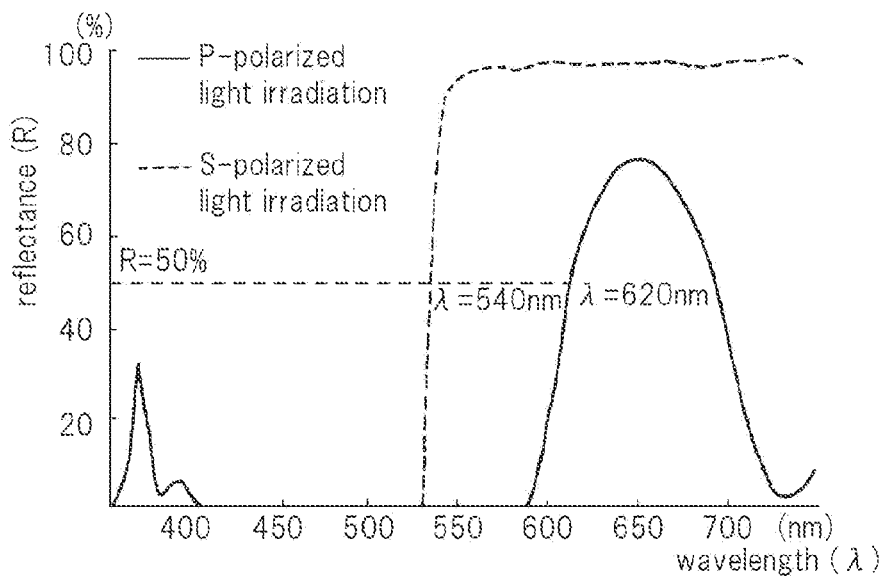
FIG. 1B is a graph showing the spectral reflectance characteristic of the red-reflecting multilayer film of the color synthesis optical element described in Patent Document 11.

The setting of the cutoff wavelength with respect to S-polarized light of first dichroic mirror 2a and second dichroic mirror 2b to the yellow band of 580 nm differs greatly from the spectral characteristics of the dichroic prism that is disclosed in Patent Document 11 (refer to FIGS. 1A and 1B). Due to this difference, it is possible to compensate light of color that is inadequate within the constraints of etendue to obtain good white balance, and the optical output characteristic of the LED light source can be displayed to its maximum. This feature is described in detail hereinbelow.

Figure 5:
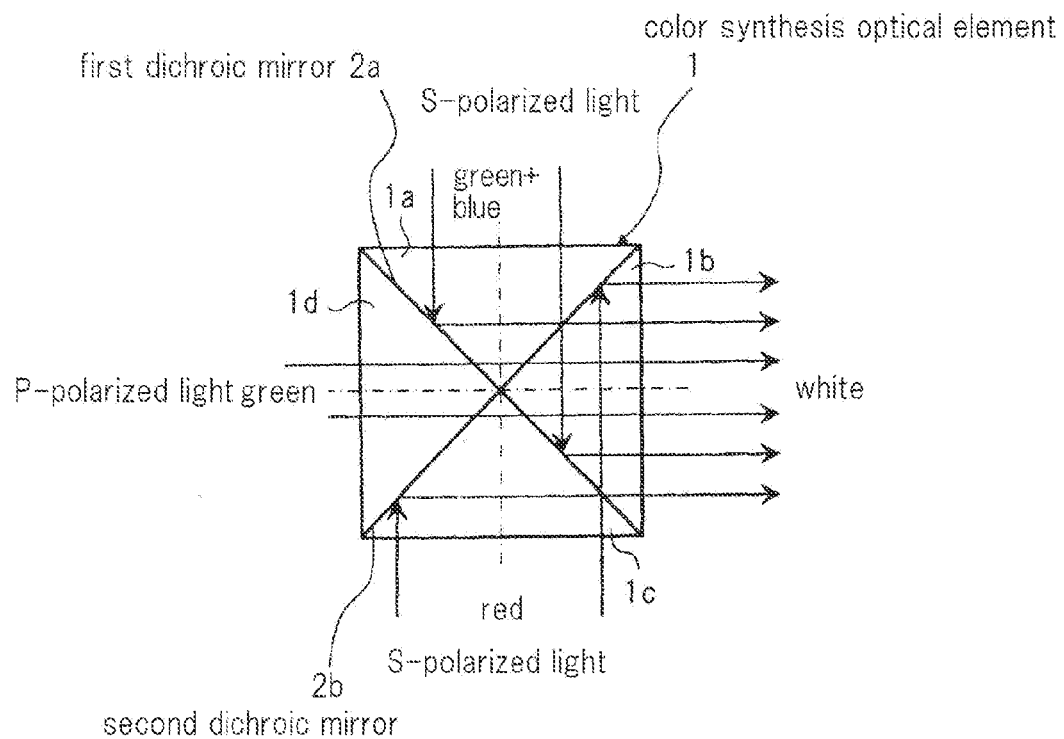
FIG. 5 is a schematic view showing an example of the optical paths in which colors are synthesized using the color synthesis optical element shown in FIG. 2.

FIG. 5 is a plan view for describing the optical paths when colored light is synthesized using color synthesis optical element 1 shown in FIG. 2.

Three of the four side surfaces of color synthesis optical element 1 are incident surfaces, and the colored light that is entered from these incident surfaces is synthesized by first dichroic mirror 2a and second dichroic mirror 2b. The remaining surface is the exit surface, and the synthesized colored light is exited from this exit surface.

In FIG. 5, although the lines indicated by solid lines with arrows show representative directions of progression of the incident luminous flux, this does not mean that only the lines shown by these solid lines with arrows are the incident rays. The incident light is luminous flux having a cross section that is no greater than the incident surfaces of color synthesis optical element 1 and includes rays having positions other than the lines shown by the solid lines with arrows as well as rays having angular components.

S-polarized light is used as red light. The red S-polarized light is entered into color synthesis optical element 1 from the incident surface of right angle prism 1c (in FIG. 5, the surface located on the lower side of the figure). First dichroic mirror 2a does not act in any way upon red S-polarized light and the red S-polarized light is therefore transmitted through first dichroic mirror 2a without alteration. On the other hand, second dichroic mirror 2b reflects all red S-polarized light. As a result, as shown in FIG. 5, the luminous flux of red S-polarized light is bent 90 degrees by second dichroic mirror 2b and then exited from the exit surface of right angle prism 1b.

P-polarized light and S-polarized light are used as green light. The green P-polarized light is entered into color synthesis optical element 1 from the incident surface of right angle prism 1d (in FIG. 5, the surface that is located on the left side of the figure). Neither first dichroic mirror 2a nor second dichroic mirror 2b act in any way upon green P-polarized light, and the green P-polarized light is therefore transmitted through first dichroic mirror 2a and second dichroic mirror 2b. The green P-polarized light that has been transmitted through first dichroic mirror 2a and second dichroic mirror 2b is exited from the exit surface of right angle prism 1b.

S-polarized light is used as blue light. The blue S-polarized light is entered into color synthesis optical element 1 from the incident surface of right angle prism 1a (in FIG. 5, the surface located on the upper side of the figure). Green S-polarized light and blue S-polarized light are both entered to this incident surface of right angle prism 1a from the same direction.

Second dichroic mirror 2b acts in no way upon blue and green S-polarized light, and the blue and green S-polarized light are therefore transmitted through second dichroic mirror 2b without alteration. However, first dichroic mirror 2a reflects all of the blue and green S-polarized light. As a result, the luminous flux of blue and green S-polarized light is bent 90 degrees by first dichroic mirror 2a and exited from the exit surface of right angle prism 1b.

As described hereinabove, white light can be obtained in color synthesis optical element 1 of the present exemplary embodiment by the synthesis in first dichroic mirror 2a and second dichroic mirror 2b of green and blue S-polarized light that is entered from the incident surface of right angle prism 1a, red S-polarized light that is entered from the incident surface of right angle prism 1c, and green P-polarized light that is entered from the incident surface of right angle prism 1d.

Figure 6A:
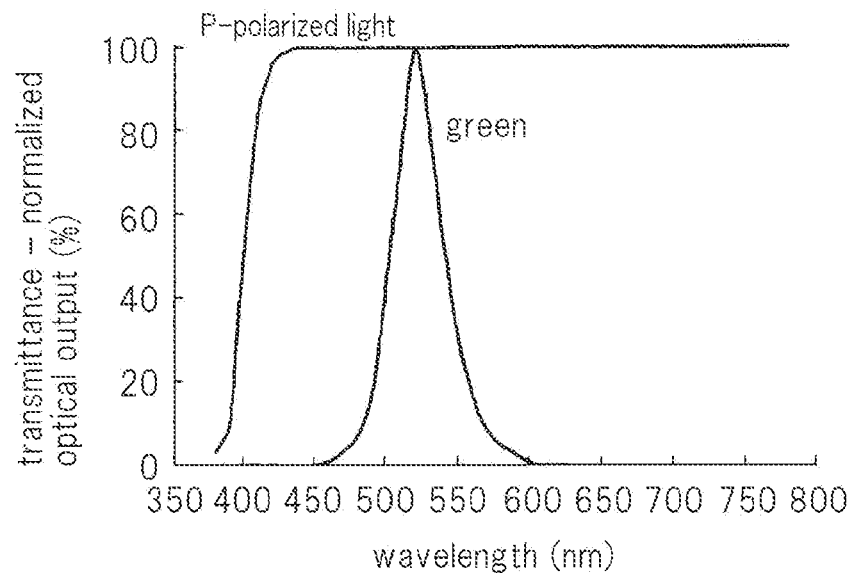
FIG. 6A is a graph showing the relation between the emission spectrum of the green LED light source and the spectral transmittance characteristic with respect to P-polarized light of the first dichroic mirror of the color synthesis optical element shown in FIG. 2.
Figure 6B:
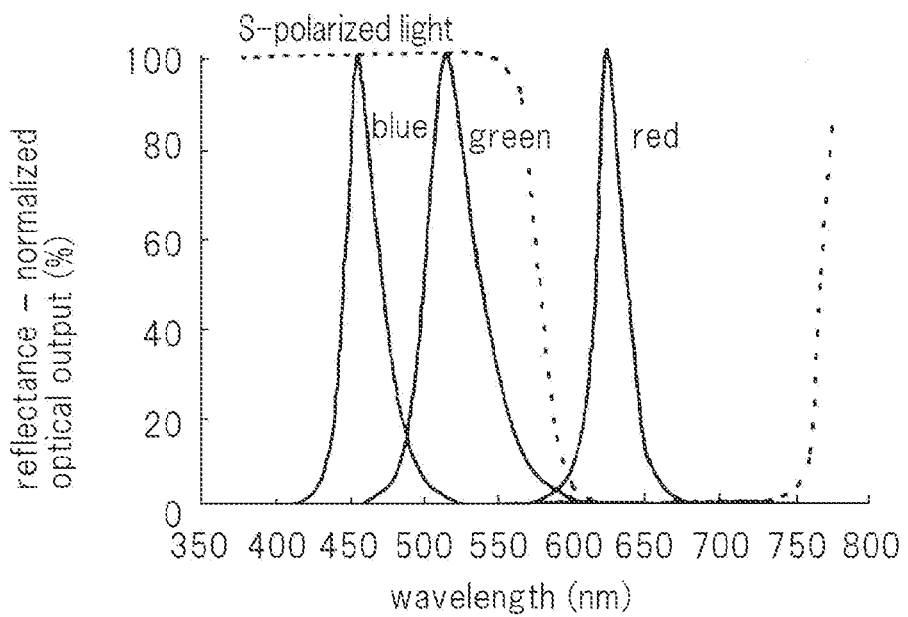
FIG. 6B is a graph showing the relation between emission spectrums of each of the red, green, and blue LED light sources and the spectral reflectance characteristic with respect to S-polarized light of the first dichroic mirror of the color synthesis optical element shown in FIG. 2.

FIG. 6A is a graph showing the relation of the emission spectrum of the green LED light source and the spectral transmittance characteristic with respect to P-polarized light of first dichroic mirror 2a. FIG. 6B is a graph showing the relation of the emission spectrums of each of the red, green, and blue LED light sources and the spectral reflectance characteristic with respect to S-polarized light of first dichroic mirror 2a. The peak wavelength of the red LED light source is 630 nm, the peak wavelength of the green LED light source is 520 nm, and the peak wavelength of the blue LED light source is 460 nm.

Figure 7A:
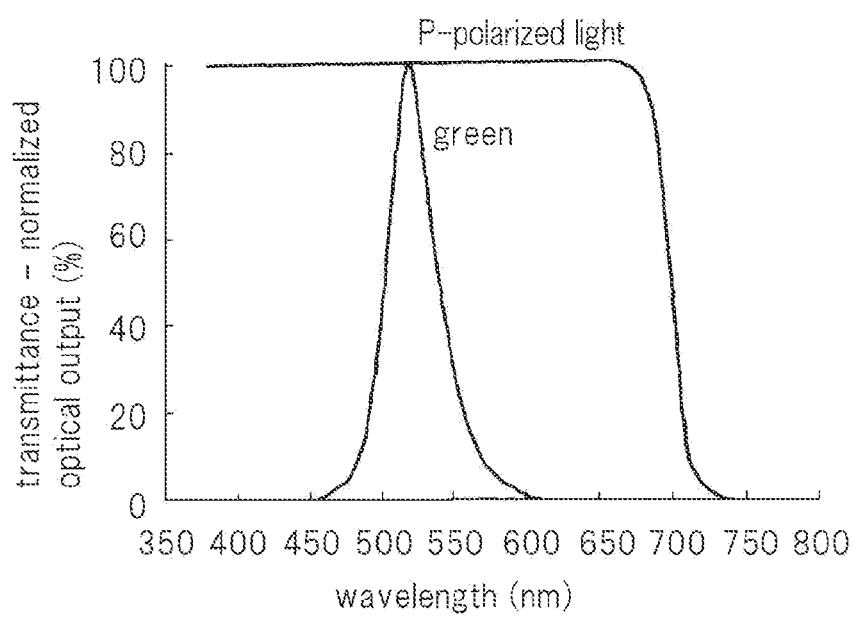
FIG. 7A is a graph showing the relation between the emission spectrum of the green LED light source and the spectral transmittance characteristic with respect to P-polarized light of the second dichroic mirror of the color synthesis optical element shown in FIG. 2.
Figure 7B:
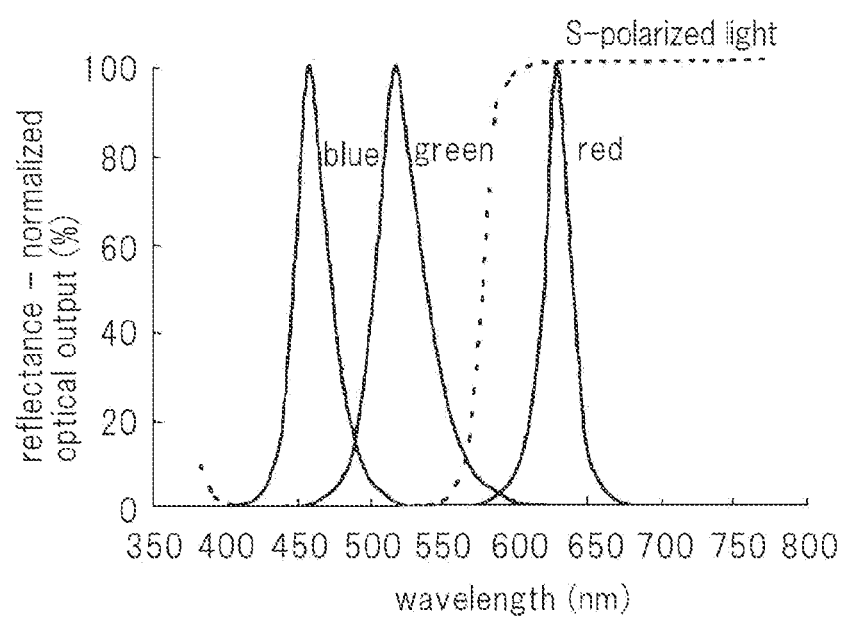
FIG. 7B is a graph showing the relation of the emission spectrums of each of the red, green, and blue LED light sources and the spectral reflectance characteristic with respect to S-polarized light of the second dichroic mirror of the color synthesis optical element shown in FIG. 2.

FIG. 7A is a graph showing the relation of the emission spectrum of the green LED light source and the spectral transmittance characteristic with respect to P-polarized light of second dichroic mirror 2b. FIG. 7B is a graph showing the relation of the emission spectrums of each of the red, green, and blue LED light sources and the spectral reflectance characteristic with respect to S-polarized light of second dichroic mirror 2b. The peak wavelength of the red LED light source is 630 nm, the peak wavelength of the green LED light source is 520 nm, and the peak wavelength of the blue LED light source is 460 nm.

As can be clearly seen from FIGS. 6A and 7A, the cutoff wavelengths of first dichroic mirror 2a and second dichroic mirror 2b with respect to green P-polarized light are sufficiently separated. Accordingly, even if the cutoff wavelengths should shift due to incident angle dependency, green P-polarized light will not be reflected by these dichroic mirrors 2a and 2b. As a result, loss due to incident angle dependency will not occur.

Further, as can be clearly seen from FIGS. 6B and 7B, the cutoff wavelengths of first dichroic mirror 2a and second dichroic mirror 2b with respect to green S-polarized light and red S-polarized light are sufficiently separated. Accordingly, red and green S-polarized light can be synthesized by these dichroic mirrors 2a and 2b with virtually no loss despite shift of the cutoff wavelengths due to incident angle dependency.

In this way, the cutoff wavelengths of first dichroic mirror 2a and second dichroic mirror 2b are set to a yellow band that is not used in color synthesis, whereby colored light can be synthesized efficiently for light that is incident at an angle that differs from parallel light.

Regarding the mixing ratios of the red, green, and blue light, when semiconductor light sources such as LEDs are used as each of red, green, and blue light sources and the red, green, and blue light from each semiconductor light source is synthesized to obtain white light with superior white balance, the blue optical output is typically greater than the other colors and the green optical output is smaller than the other colors. In this case, the optical output of the blue and red semiconductor light sources is limited to accord with the green semiconductor light source for which the optical output is relatively small, whereby the optical output of the white light that is obtained is inevitably also small.

According to the color synthesis optical element of the present exemplary embodiment, green light can be synthesized from two different directions. Still further, a configuration is adopted in which the quantity of blue light, for which optical output is relatively great, is reduced and green light is added. Accordingly, the three primary colors can be synthesized at optimum color-mixing ratios, and white light having a superior white balance can be obtained. In addition, the optical output of the LEDs of three colors can be displayed at their maximum without limitation.

Figure 8:
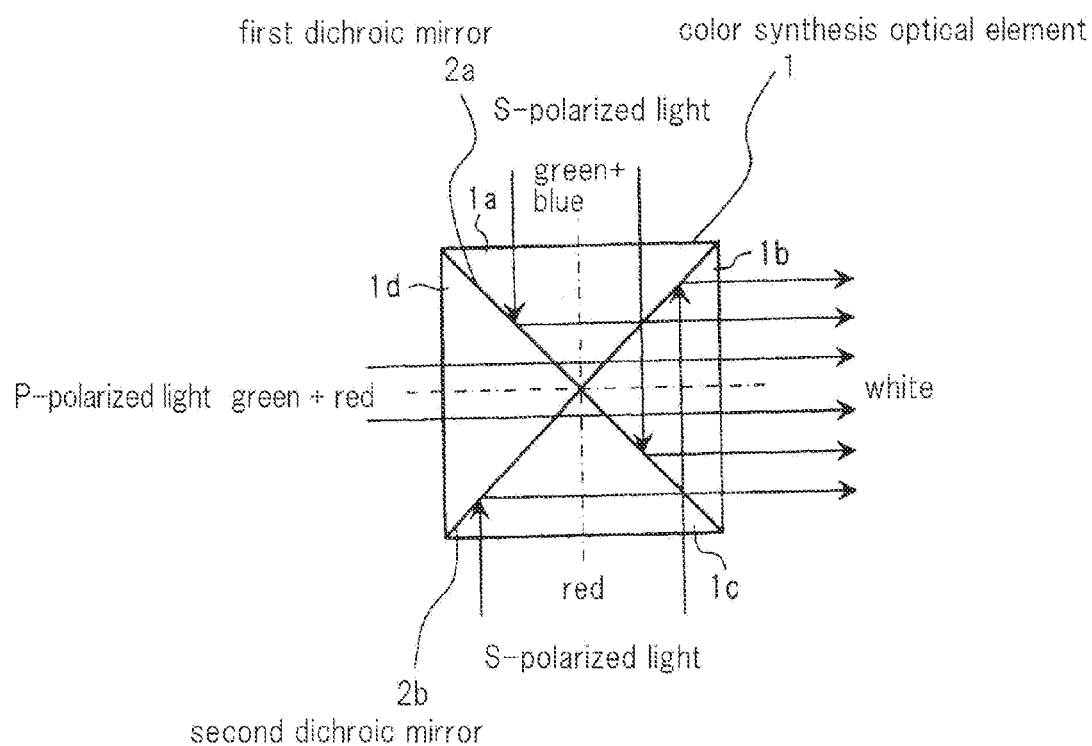
FIG. 8 is a schematic view showing another example of the optical paths in which colors are synthesized using the color synthesis optical element shown in FIG. 2.

The color synthesis optical element of the present exemplary embodiment is not limited to the configuration in which only green light is synthesized from two different directions. For example, as shown in FIG. 8, green and red P-polarized light may also be entered to color synthesis optical element 1 from the incident surface of right angle prism 1d. Similar to the configuration shown in FIG. 5, green and blue S-polarized light is entered to the incident surface of right angle prism 1a, and red S-polarized light is entered to the incident surface of right angle prism 1c.

Figure 9A:
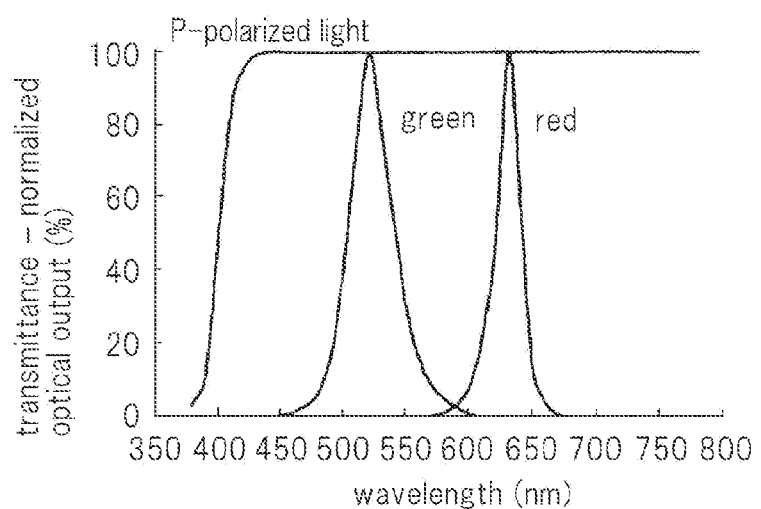
FIG. 9A is a graph showing the relation between the emission spectrums of each of the red and green LED light sources and the spectral transmittance characteristic with respect to P-polarized light of the first dichroic mirror of the color synthesis optical element shown in FIG. 8.
Figure 9B:
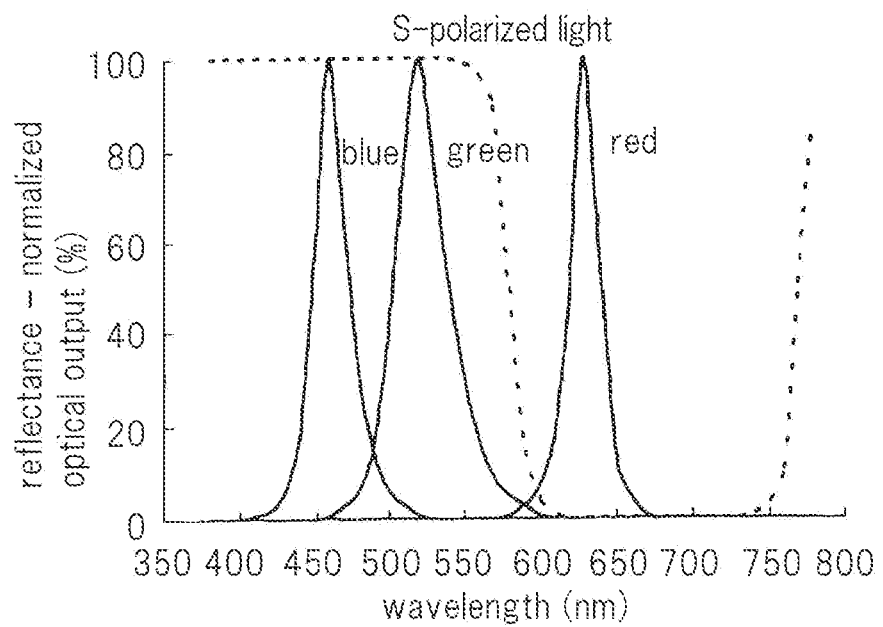
FIG. 9B is a graph showing the relation between the emission spectrums of each of the red, green, and blue LED light sources and the spectral reflectance characteristic with respect to S-polarized light of the first dichroic mirror of the color synthesis optical element shown in FIG. 8.

FIG. 9A is a graph showing the relation of the emission spectrums of each of green and red LED light sources and the spectral transmittance characteristic with respect to P-polarized light of first dichroic mirror 2a in the color synthesis optical element shown in FIG. 8. FIG. 9B is a graph showing the relation between the emission spectrums of each of red, green, and blue LED light sources and the spectral reflectance characteristic with respect to S-polarized light of first dichroic mirror 2a in the color synthesis optical element shown in FIG. 8. The peak wavelength of the red LED light source is 630 nm, the peak wavelength of the green LED light source is 520 nm, and the peak wavelength of the blue LED light source is 460 nm.

Figure 10A:
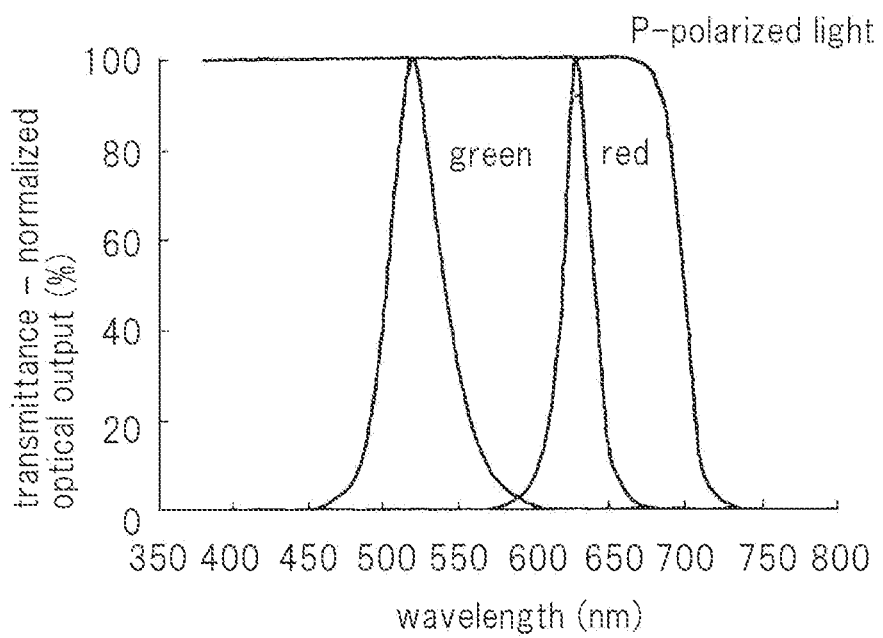
FIG. 10A is a graph showing the relation between the emission spectrum of the red and green LED light sources and the spectral transmittance characteristic with respect to P-polarized light of the second dichroic mirror of the color synthesis optical element shown in FIG. 8.
Figure 10B:
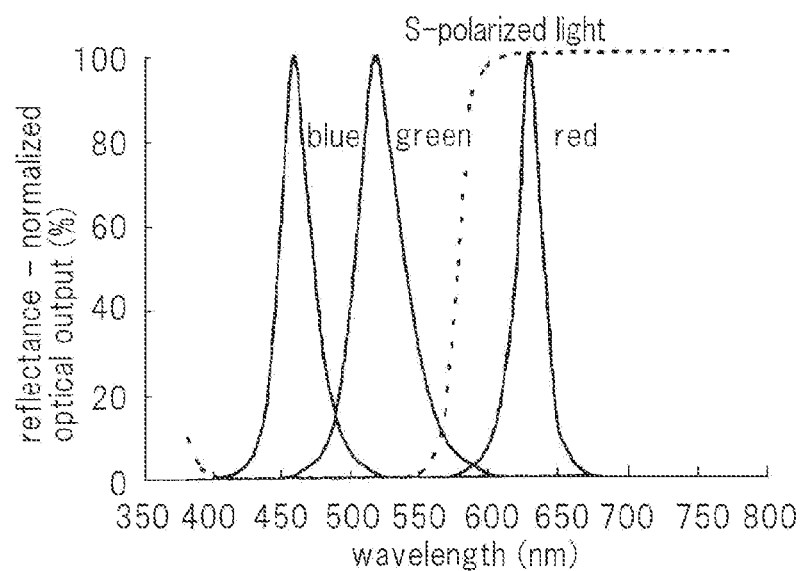
FIG. 10B is a graph showing the relation between the emission spectrums of each of the red, green, and blue LED light sources and the spectral reflectance characteristic with respect to S-polarized light of the second dichroic mirror of the color synthesis optical element shown in FIG. 8.

FIG. 10A is a graph showing the relation between the emission spectrum of the red and green LED light sources and the spectral transmittance characteristic with respect to P-polarized light of second dichroic mirror 2b in the color synthesis optical element shown in FIG. 8. FIG. 10B is a graph showing the relation between the emission spectrums of each of red, green, and blue LED light sources and the spectral reflectance characteristic with respect to S-polarized light of second dichroic mirror 2b in the color synthesis optical element shown in FIG. 8. The peak wavelength of the red LED light source is 630 nm, the peak wavelength of the green LED light source is 520 nm, and the peak wavelength of the blue LED light source is 460 nm.

As shown in FIGS. 9A and 10A, neither first dichroic mirror 2a nor second dichroic mirror 2b act in any way upon green and red P-polarized light. As a result, the green and red P-polarized light that are entered from the incident surface of right angle prism 1d are transmitted through each of dichroic mirrors 2a and 2b without alteration and then exited from the exit surface of right angle prism 1b. In addition, the action of each of dichroic mirrors 2a and 2b upon red, green, and blue S-polarized light is identical to the configuration shown in FIG. 5.

In addition, the cutoff wavelengths of first dichroic mirror 2a and second dichroic mirror 2b with respect to green and red P-polarized light are sufficiently separated. Accordingly, green and red P-polarized light will not be reflected by these dichroic mirrors 2a and 2b despite shift of the cutoff wavelengths resulting from incident angle dependency. As a result, loss due to incident angle dependency will not occur.

As can be clearly seen from FIGS. 9B and 10B, the cutoff wavelengths of first dichroic mirror 2a and second dichroic mirror 2b with respect to green S-polarized light and red S-polarized light are sufficiently separated. Accordingly, red and green S-polarized light can be synthesized in these dichroic mirrors 2a and 2b with virtually no loss despite shifts of the cutoff wavelengths due to incident angle dependency.

According to the color synthesis optical element shown in FIG. 8, not only can green light be entered and synthesized from two different directions, but red light can also be entered from two different directions and synthesized.

In the color synthesis optical element shown in FIG. 5 or FIG. 8, a configuration may be adopted in which blue P-polarized light is further entered into the incident surface of right angle prism 1*d*. In this case, the blue light can be entered from two different directions and synthesized.

Second Exemplary Embodiment

Figure 11:
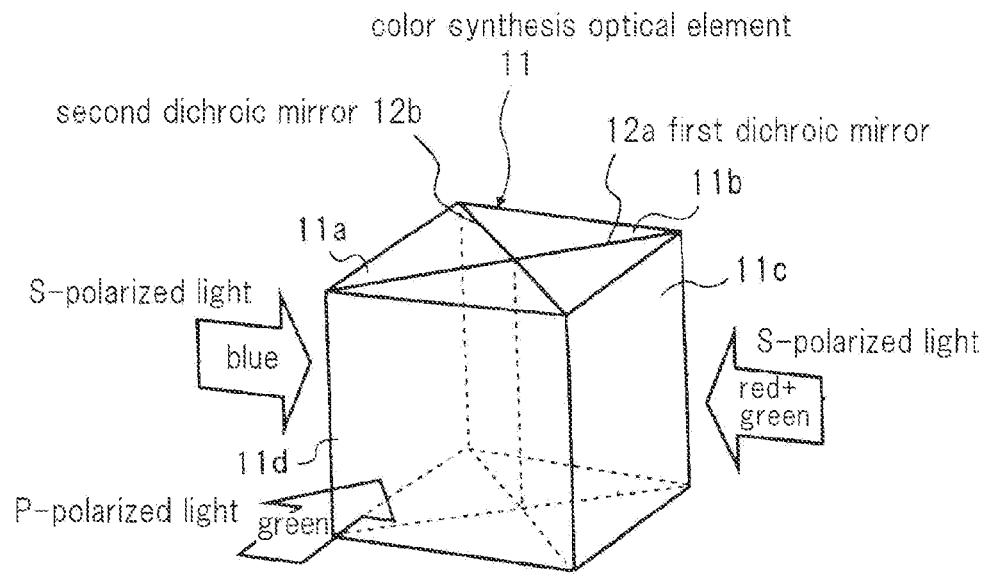
FIG. 11 is a perspective view showing the configuration of the color synthesis optical element that is the second exemplary embodiment of the present invention.

FIG. 11 is a perspective view showing the configuration of the color synthesis optical element that is the second exemplary embodiment of the present invention.

Referring to FIG. 11, color synthesis optical element 11 is a cross dichroic prism composed of four right angle prisms 11*a*-*d* in which surfaces that form right angles are joined together, as in the first exemplary embodiment. First dichroic mirror 12*a* and second dichroic mirror 12*b* composed of dielectric multilayer films are formed on the joined surfaces of right angle prisms 11*a*-1*d* so as to intersect.

Of the four side surfaces of color synthesis optical element 11, light is entered from three surfaces (the surfaces of each of right angle prisms 11*a*, 11*c*, and 11*d*) and colors are synthesized. S-polarized light (blue) is entered to the surface of right angle prism 11*a*, and S-polarized light (red +green) is entered to the surface of right angle prism 11*c* that is opposite this incident surface. P-polarized light (green) is entered to the surface of right angle prism 11*d*. Light realized by synthesizing the light entered from the three side surfaces is exited from the one remaining side surface (the surface of right angle prism 11*b* that is opposite the surface of right angle prism 11*d*).

In color synthesis optical element 1 of the first exemplary embodiment shown in FIG. 2, green and blue S-polarized light are entered to color synthesis optical element 1 from the incident surface of right angle prism 1*a*. In color synthesis optical element 11 of the present exemplary embodiment, in contrast, green S-polarized light is entered to color synthesis optical element 11 together with red S-polarized light not from the incident surface of right angle prism 11*a* but from the incident surface of right angle prism 11*c* that is opposite this incident surface. Color synthesis optical element 11 of the present exemplary embodiment differs from color synthesis optical element 1 of the first exemplary embodiment with regard to this point.

Figure 12A:
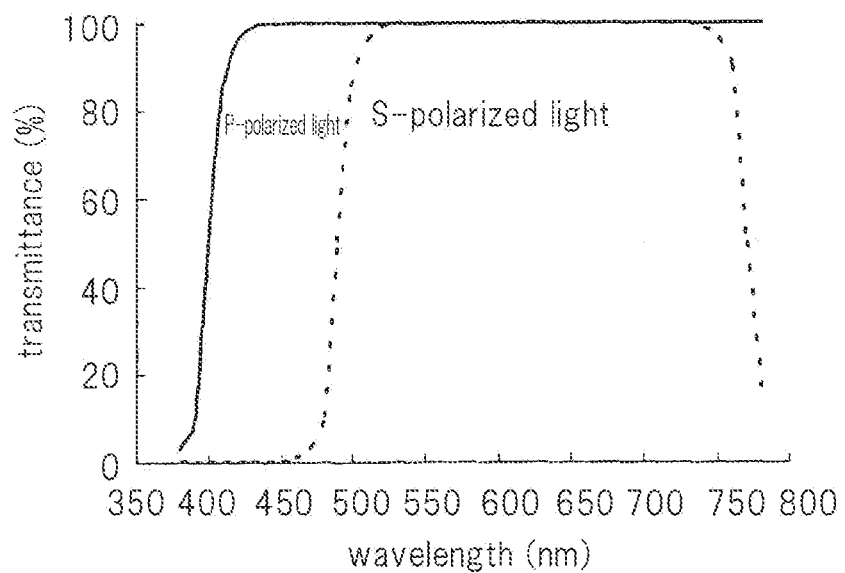
FIG. 12A is a graph showing the spectral transmittance characteristic with respect to P-polarized light and S-polarized light of the first dichroic mirror of the color synthesis optical element shown in FIG. 11.
Figure 12B:
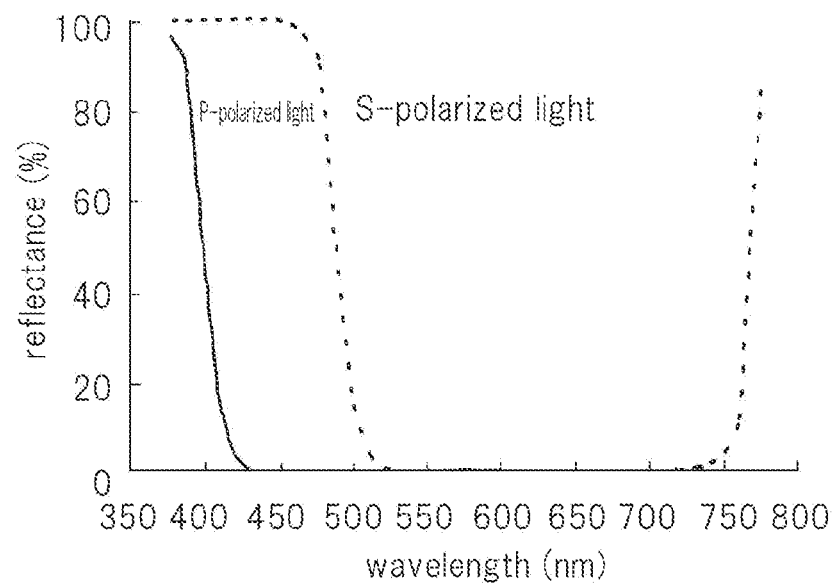
FIG. 12B is a graph showing the spectral reflectance characteristic with respect to P-polarized light and S-polarized light of the first dichroic mirror of the color synthesis optical element shown in FIG. 11.

FIG. 12A is a graph showing the spectral transmittance characteristic with respect to P-polarized light and S-polarized light of first dichroic mirror 12*a*. FIG. 12B is a graph showing the spectral reflectance characteristic with respect to P-polarized light and S-polarized light of first dichroic mirror 12*a*.

The cutoff wavelength of first dichroic mirror 12*a* with respect to light that is entered as P-polarized light is 400 nm. In this case, first dichroic mirror 12*a* largely transmits and does not reflect P-polarized light having a wavelength of 400 nm or more. On the other hand, the cutoff wavelength of first dichroic mirror 12*a* with respect to light that is entered as S-polarized light is 490 nm. In this case, first dichroic mirror 12*a* largely transmits and does not reflect S-polarized light having a wavelength of 490 nm or more. In addition, first dichroic mirror 12*a* largely reflects and does not transmit S-polarized light having a wavelength shorter than 490 nm.

If the characteristics of first dichroic mirror 12*a* are represented by first dichroic mirror 12*a* acting upon colored light, regarding blue light, first dichroic mirror 12*a* transmits P-polarized light and reflects S-polarized light. In other words, first dichroic mirror 12*a* also acts as a polarization beam splitter with respect to blue light. On the other hand, first dichroic mirror 12*a* does not act in any way upon green light and red light and transmits both P-polarized light and S-polarized light.

Figure 13A:
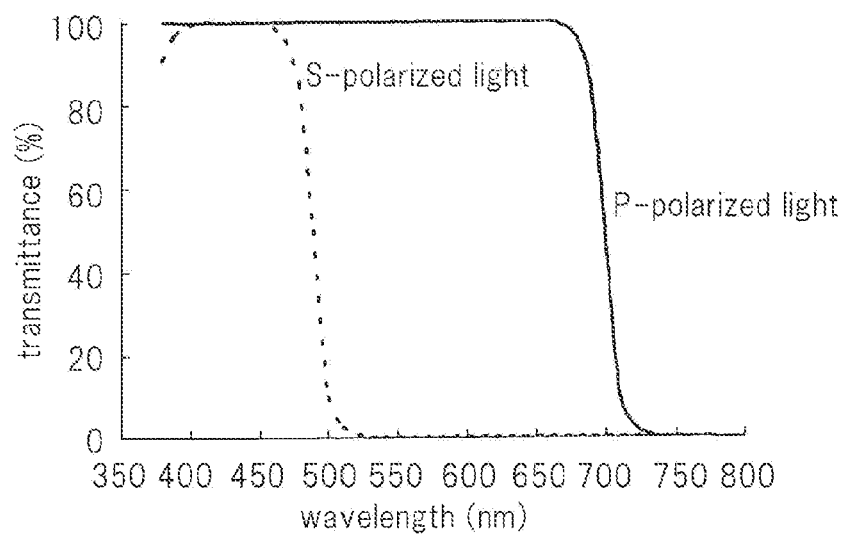
FIG. 13A is a graph showing the spectral transmittance characteristic with respect to P-polarized light and S-polarized light of the second dichroic mirror of the color synthesis optical element shown in FIG. 11.
Figure 13B:
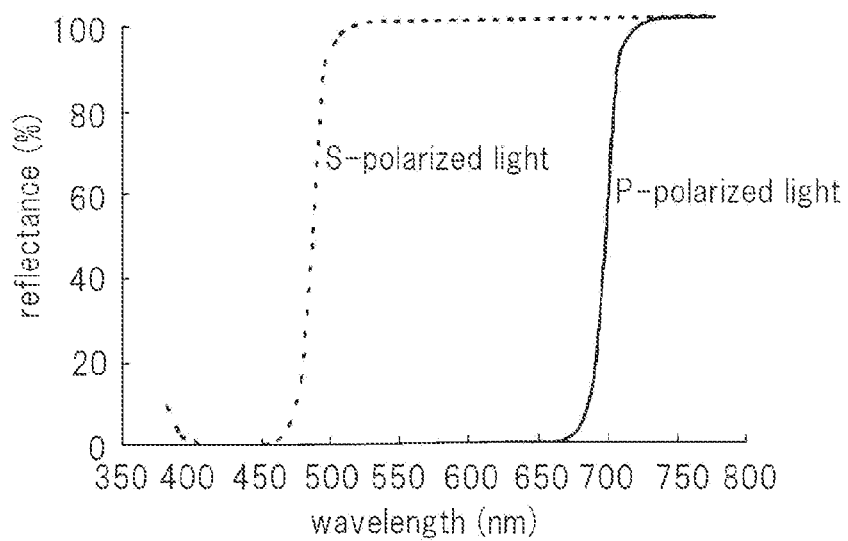
FIG. 13B is a graph showing the spectral reflectance characteristic with respect to P-polarized light and S-polarized light of the second dichroic mirror of the color synthesis optical element shown in FIG. 11.

FIG. 13A is a graph showing the spectral transmittance characteristic with respect to P-polarized light and S-polarized light of second dichroic mirror 12*b*. FIG. 13B is a graph showing the spectral reflectance characteristic with respect to P-polarized light and S-polarized light of second dichroic mirror 12*b*.

The cutoff wavelength of second dichroic mirror 12*b* with respect to light entered as P-polarized light is 700 nm. In this case, second dichroic mirror 12*b* largely transmits and does not reflect P-polarized light having a wavelength of 700 nm or less. On the other hand, the cutoff wavelength of second dichroic mirror 12*b* with respect to light entered as S-polarized light is 490 nm. In this case, second dichroic mirror 12*b* largely reflects and does not transmit S-polarized light having a wavelength of 490 or more. In addition, second dichroic mirror 12*b* largely transmits and does not reflect S-polarized light having a wavelength shorter than 490 nm.

If the characteristics of second dichroic mirror 12*b* are represented by second dichroic mirror 12*b* acting upon colored light, second dichroic mirror 12*b* does not act in any way upon blue light and transmits both P-polarized light and S-polarized light. However, with respect to green light and red light, second dichroic mirror 12*b* transmits P-polarized light but reflects S-polarized light. In other words, second dichroic mirror 12*b* acts as a polarization beam splitter for green light and red light.

Color synthesis optical element 11 of the present exemplary embodiment differs from the dichroic prism that is disclosed in Patent Document 11 in that the cutoff wavelength of first dichroic mirror 12*a* and second dichroic mirror 12*b* with respect to S-polarized light is set to 490 nm, the band of blue-green (cyan). Due to this point of difference, colored light that is insufficient can be compensated within the limits of etendue to obtain good white balance and the optical output characteristics of the LED light sources can be displayed at their maximum. This feature is next explained in greater detail.

Figure 14:
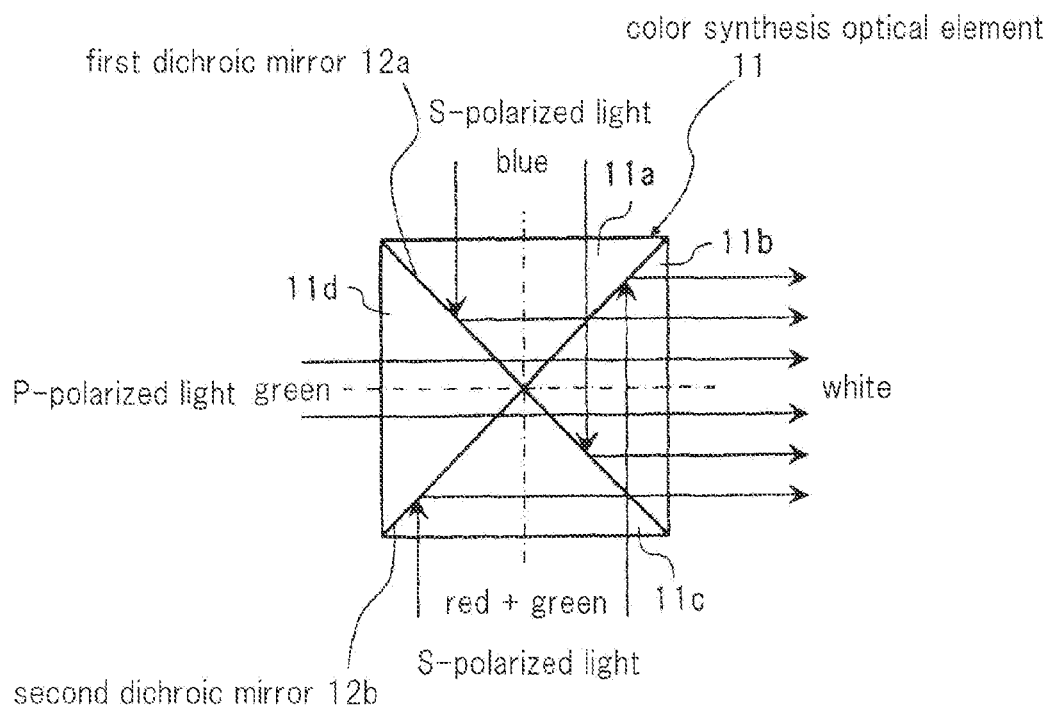
FIG. 14 is a schematic view showing an example of the optical paths in which colors are synthesized using the color synthesis optical element shown in FIG. 11.

FIG. 14 is a plan view for describing the optical paths when color synthesis optical element 11 shown in FIG. 11 is used to synthesize colored light.

Of the four side surfaces of color synthesis optical element 11, three surfaces are incident surfaces, and colored light that is entered from these incident surfaces is synthesized by first dichroic mirror 12*a* and second dichroic mirror 12*b*. The remaining surface is an exit surface and colored light that has been synthesized is exited from this surface.

In FIG. 14, the lines that are shown as solid lines with arrows each indicate representative directions of the progression of incident luminous flux, but this representation does not mean that only the lines shown as these solid lines with arrows represent the incident rays. The incident light is luminous flux having a cross section no greater than the incident surfaces of color synthesis optical element 11 and includes rays having positions other than the lines represented as solid lines with arrows as well as rays having an angular component.

S-polarized light is used as blue light. The blue S-polarized light is entered to color synthesis optical element 11 from the incident surface of right angle prism 11*a* (in FIG. 14, the surface located on the upper side of the figure). Second dichroic mirror 12*b* does not act in any way upon the blue S-polarized light and the blue S-polarized light is therefore transmitted through second dichroic mirror 12*b* without alteration. On the other hand, first dichroic mirror 12*a* reflects all of blue S-polarized light. As a result, blue S-polarized luminous flux is bent 90 degrees by first dichroic mirror 12*a* and then exited from the exit surface of right angle prism 11*b*.

P-polarized light and S-polarized light are used as green light. The green P-polarized light is entered to color synthesis optical element 11 from the incident surface of right angle prism 11d (in FIG. 14, the surface located on the left side of the figure). Neither first dichroic mirror 12a nor second dichroic mirror 12b act in any way upon green P-polarized light, and the green P-polarized light is therefore transmitted through dichroic mirrors 12a and 12b without alteration and then exited from the exit surface of right angle prism 11b.

S-polarized light is used as red light. Green and red S-polarized light are entered to color synthesis optical element 11 from the incident surface of right angle prism 11c (in FIG. 14, the surface located on the lower side of the figure). First dichroic mirror 12a does not act in any way upon green and red S-polarized light, and the green and red S-polarized light is therefore transmitted through first dichroic mirror 12a without alteration. On the other hand, second dichroic mirror 12b reflects all green and red S-polarized light. As a result, the green and red S-polarized luminous flux is bent 90 degrees at second dichroic mirror 12b and then exited from the exit surface of right angle prism 11b as shown in FIG. 14.

Thus, according to color synthesis optical element 11 of the present exemplary embodiment, blue S-polarized light, green P-polarized light and S-polarized light, and red S-polarized light can be synthesized to obtain white light.

Figure 15A:
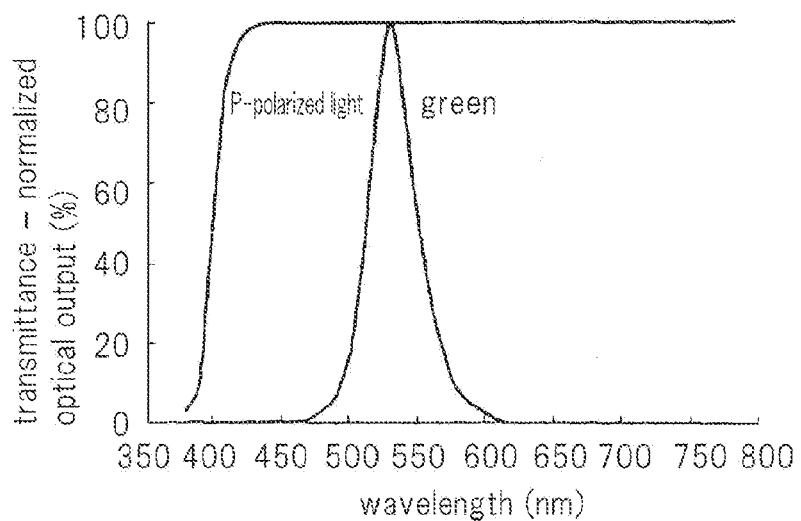
FIG. 15A is a graph showing the relation between the emission spectrum of the green LED light source and the spectral transmittance characteristic with respect to P-polarized light of the first dichroic mirror of the color synthesis optical element shown in FIG. 11.
Figure 15B:
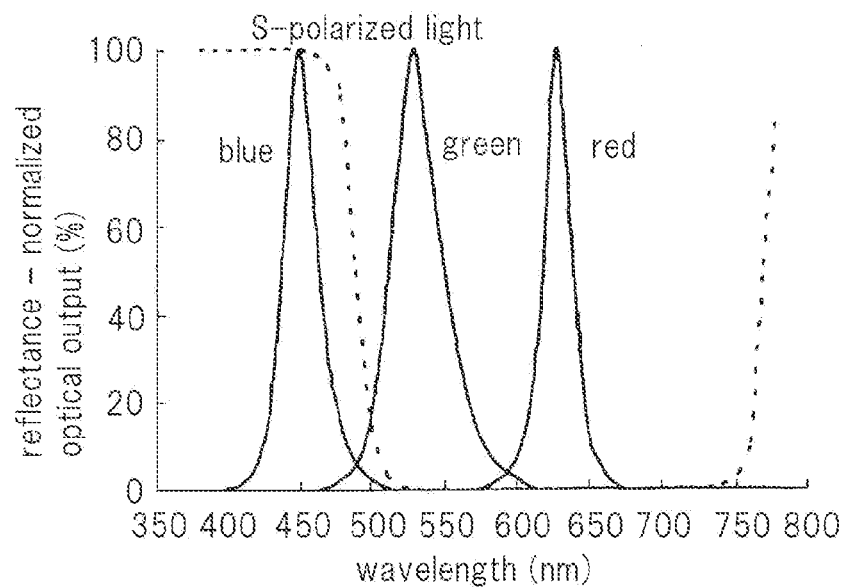
FIG. 15B is a graph showing the relation between the emission spectrums of each of the red, green, and blue LED light sources and the spectral reflectance characteristic with respect to S-polarized light of the first dichroic mirror of the color synthesis optical element shown in FIG. 11.

FIG. 15A is a graph showing the relation between the emission spectrum of a green LED light source and the spectral transmittance characteristic with respect to P-polarized light of first dichroic mirror 12a. FIG. 15B is a graph showing the relation between emission spectrums of each of red, green and blue LED light sources and the spectral reflectance characteristic with respect to S-polarized light of first dichroic mirror 12a. The peak wavelength of the red LED light source is 630 nm, the peak wavelength of the green LED light source is 530 nm, and the peak wavelength of the blue LED light source is 450 nm.

Figure 16A:
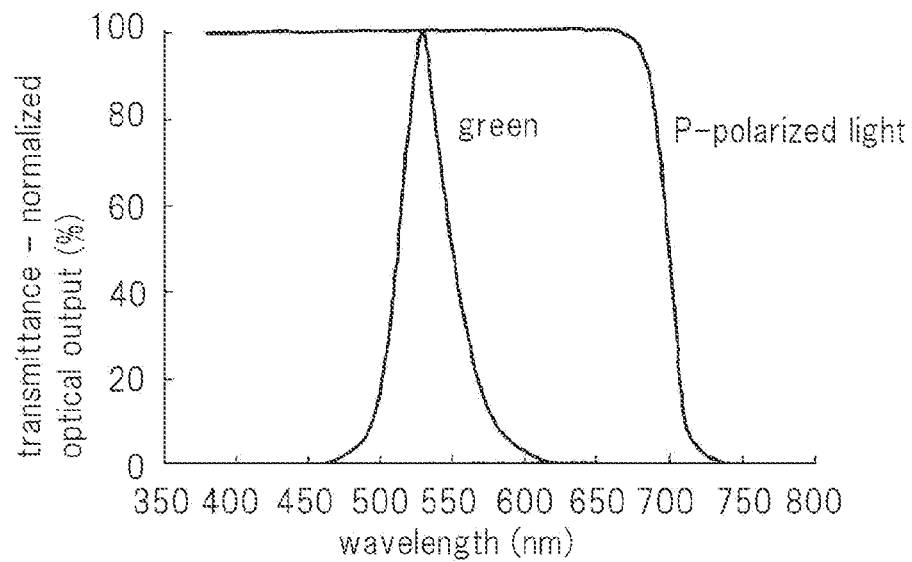
FIG. 16A is a graph showing the relation between the emission spectrum of the green LED light source and the spectral transmittance characteristic with respect to P-polarized light of the second dichroic mirror of the color synthesis optical element shown in FIG. 11.
Figure 16B:
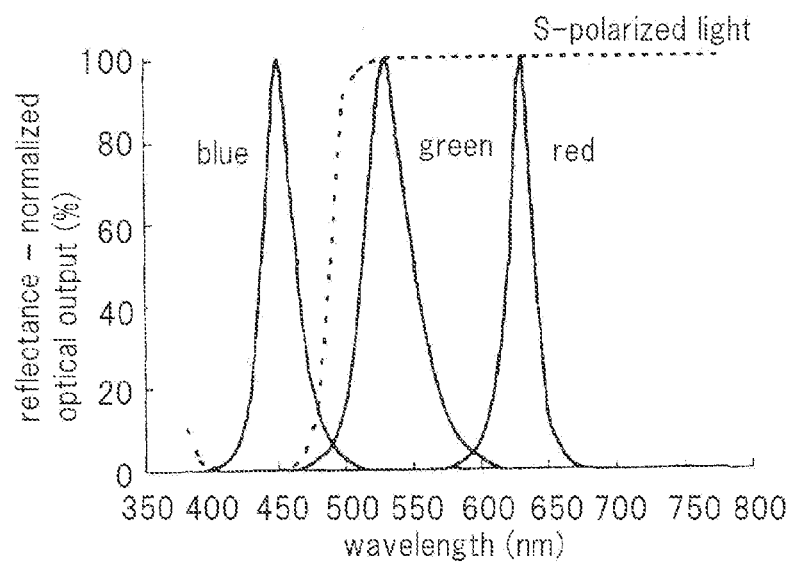
FIG. 16B is a graph showing the relation between the emission spectrums of each of the red, green, and blue LED light sources and the spectral reflectance characteristic with respect to S-polarized light of the second dichroic mirror of the color synthesis optical element shown in FIG. 11.

FIG. 16A is a graph showing the relation between the emission spectrum of the green LED light source and the spectral transmittance characteristic with respect to P-polarized light of second dichroic mirror 12b. FIG. 16B is a graph showing the relation between the emission spectrums of each of the red, green, and blue LED light sources and the spectral reflectance characteristic with respect to S-polarized light of second dichroic mirror 12b. The peak wavelength of the red LED light source is 630 nm, the peak wavelength of the green LED light source is 530 nm, and the peak wavelength of the blue LED light source is 450 nm.

As can be clearly seen from FIG. 15A and FIG. 16A, the cutoff wavelengths of first dichroic mirror 12a and second dichroic mirror 12b with respect to green P-polarized light are sufficiently separated. Accordingly, green P-polarized light is not reflected by these dichroic mirrors 12a and 12b despite shifts of the cutoff wavelengths due to incident angle dependency. As a result, no loss occurs due to incident angle dependency.

As can be clearly seen from FIGS. 15B and 16B, the cutoff wavelengths of first dichroic mirror 12a and second dichroic mirror 12b with respect to blue S-polarized light and green S-polarized light are sufficiently separated. Accordingly, blue and green S-polarized light can be synthesized with virtually no loss in these dichroic mirrors 12a and 12b despite shifts of the cutoff wavelengths due to incident angle dependency.

Thus, because the cutoff wavelengths of first dichroic mirror 12a and second dichroic mirror 12b are set to the blue-green (cyan) band that is not used in color synthesis, colored light can be synthesized efficiently even for light that is incident at angles that differ from parallel light.

According to the present exemplary embodiment, green light can be synthesized from two different directions, as in the first exemplary embodiment. Moreover, a configuration is adopted that decreases the quantity of red light for which the optical output is relatively great and adds green light. Accordingly, the three primary colors can be synthesized at optimum color mixing ratios and white light having superior white balance can be obtained. In addition, the LEDs of three colors can be caused to be displayed at their maximum without limiting the optical output.

Color synthesis optical element 11 of the present exemplary embodiment is not limited to the configuration that synthesizes only green light from two different directions. For example, in color synthesis optical element 11 shown in FIG. 11, blue or red P-polarized light or even red and blue P-polarized light may be further entered to the incident surface of right angle prism 11d to which green P-polarized light is entered. The colors that are mixed can be set from among a combination of these forms.

It is known that, due to problems arising in the fabrication of LEDs, the peak wavelength of an LED may vary within a range of approximately ±10-20 nm. In the first exemplary embodiment, the cutoff wavelength of the dichroic mirrors is set to the yellow wavelength band (at least 560 nm but no greater than 600 nm), whereby loss during color synthesis can be further suppressed through the use of LEDs in which variations in the peak wavelength of green LEDs occur on the side of shorter wavelengths. In the second exemplary embodiment, the cutoff wavelength of the dichroic mirrors is set to the blue-green (cyan) wavelength band (at least 480 nm but no greater than 500 nm), whereby loss during color synthesis can be still further decreased through the use of LEDs in which the peak wavelength of green LEDs varies toward longer wavelengths and the peak wavelength of blue LEDs varies toward shorter wavelengths. The color synthesis optical element may therefore be selected according to the variation in the peak wavelengths of LEDs.

In addition, the optical output characteristics of LEDs are subject to even greater variation due to problems in fabrication. When the optical output of blue LEDs is relatively great, blue is decreased and green is added, as in the first exemplary embodiment. On the other hand, when the optical output of red LEDs is relatively great, red is decreased and green is added as in the second exemplary embodiment. Still further, the arrangement or combination of light sources of each color can be selected by adding red or blue P-polarized light to the optical path of green P-polarized light.

Thus, the color synthesis optical element of each exemplary embodiment is useful for enabling the utilization of LEDs having a large variation in peak wavelength or optical output.

Third Exemplary Embodiment

Figure 17:
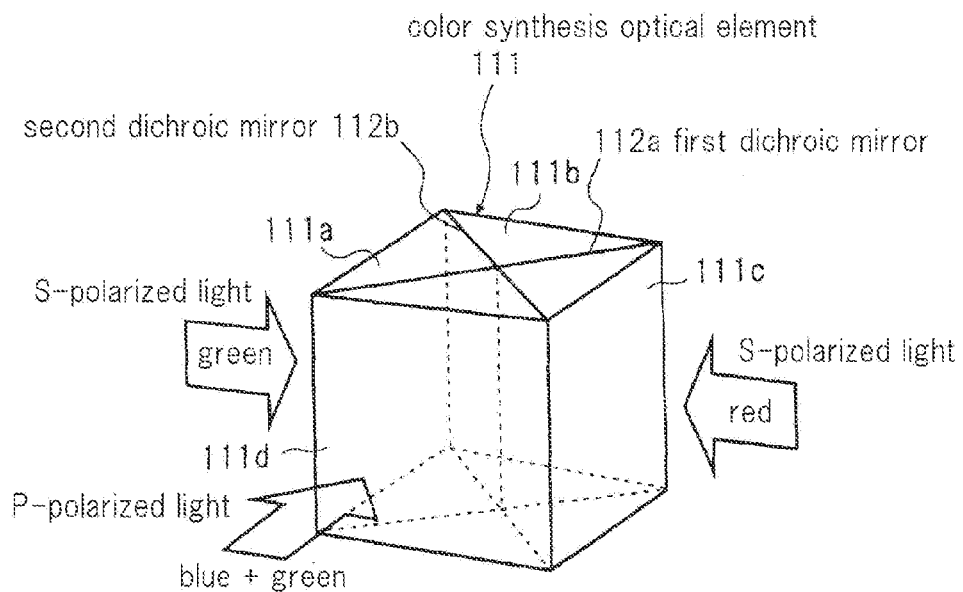
FIG. 17 is a perspective view showing the configuration of the color synthesis optical element that is the third exemplary embodiment of the present invention.

FIG. 17 is a perspective view showing the configuration of the color synthesis optical element that is the third exemplary embodiment of the present invention.

Referring to FIG. 17, similar to the first exemplary embodiment, color synthesis optical element 111 is a cross dichroic prism composed of four right angle prisms 111a-111d that are joined together at surfaces that form right angles. First dichroic mirror 112a and second dichroic mirror 112b composed of dielectric multilayer films are formed on the bonding surfaces of right angle prisms 111a-111d so as to intersect.

Of the four side surfaces of color synthesis optical element 111, light is entered from three surfaces (surfaces of each of right angle prisms 111a, 111c, and 111d) and colors are synthesized. S-polarized light (green) is entered to the surface of right angle prism 111a, and S-polarized light (red) is entered to the surface of right angle prism 111c that is opposite this incident surface. P-polarized light (blue+green) is entered to the surface of right angle prism 111d. Light that results from synthesizing the light entered from the three side surfaces is exited from the one remaining side surface (the surface of right angle prism 111b that is opposite the surface of right angle prism 111d).

In color synthesis optical element 1 of the first exemplary embodiment shown in FIG. 2, green and blue S-polarized light is entered to the incident surface of right angle prism 1a, red S-polarized light is entered to the incident surface of right angle prism 1c, and green P-polarized light is entered to the incident surface of right angle prism 1d. In contrast, in color synthesis optical element 111 of the present exemplary embodiment, green S-polarized light is entered to the incident surface of right angle prism 111a, red S-polarized light is entered to the incident surface of right angle prism 111c, and blue and green P-polarized light is entered to the incident surface of right angle prism 111d. In other words, color synthesis optical element 111 of the present exemplary embodiment differs from the color synthesis optical element of the first exemplary embodiment in that blue P-polarized light and green P-polarized light are entered to the transmission optical path of P-polarized light and green S-polarized light and red S-polarized light are each entered to the reflection optical path of S-polarized light.

Figure 18A:
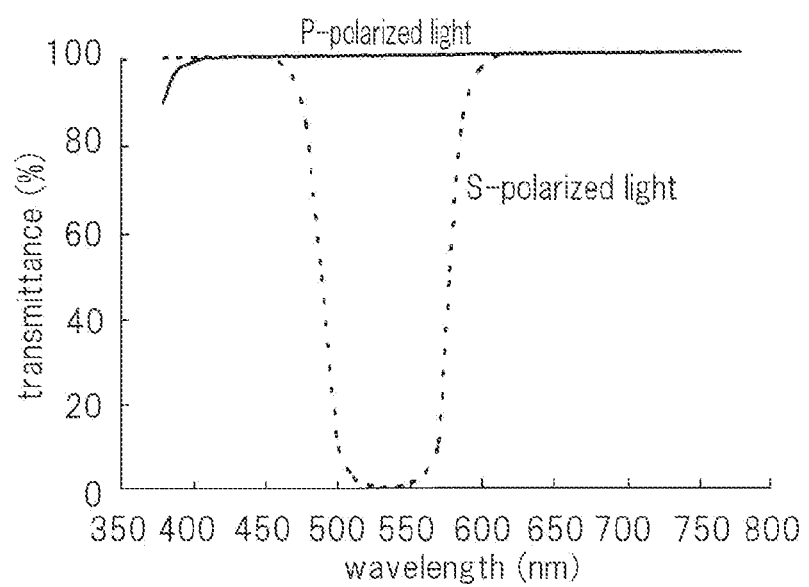
FIG. 18A is a graph showing the spectral transmittance characteristic with respect to P-polarized light and S-polarized light of the first dichroic mirror of the color synthesis optical element shown in FIG. 17.
Figure 18B:
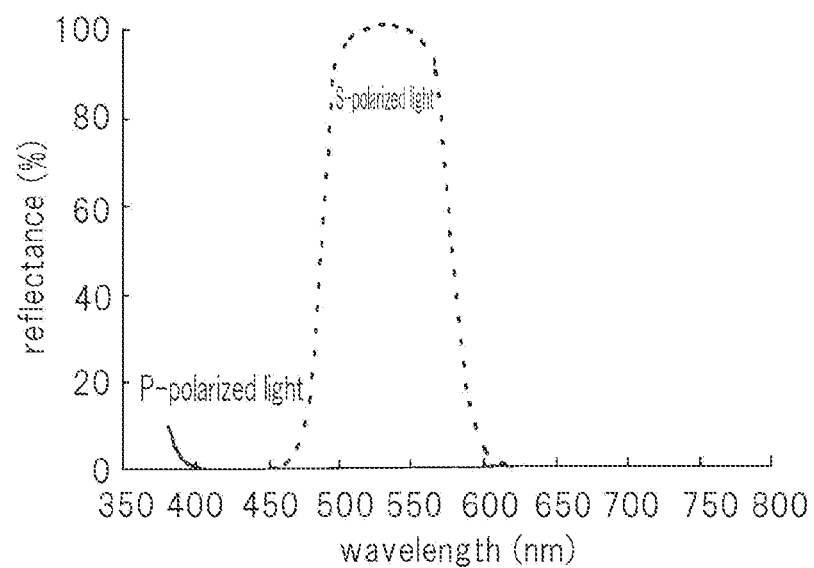
FIG. 18B is a graph showing the spectral reflectance characteristic with respect to P-polarized light and S-polarized light of the first dichroic mirror of the color synthesis optical element shown in FIG. 17.

FIG. 18A is a graph showing the spectral transmittance characteristic with respect to P-polarized light and S-polarized light of first dichroic mirror 112a. FIG. 18B is a graph showing the spectral reflectance characteristic with respect to P-polarized light and S-polarized light of first dichroic mirror 112a.

First dichroic mirror 112a largely transmits and does not reflect light of the visible band of light that is entered as P-polarized light. The cutoff wavelengths of first dichroic mirror 112a with respect to light that is entered as S-polarized light are 490 nm and 580 nm. In this case, first dichroic mirror 112a largely transmits and does not reflect S-polarized light having a wavelength no greater than 490 nm and S-polarized light having a wavelength of at least 580 nm. In addition, first dichroic mirror 112a largely reflects and does not transmit S-polarized light having a wavelength that is greater than 490 nm and S-polarized light having a wavelength less than 580 nm.

If the characteristics of first dichroic mirror 112a are represented by first dichroic mirror 112a acting upon colored light, regarding green light, first dichroic mirror 112a transmits P-polarized light and reflects S-polarized light. In other words, first dichroic mirror 112a also acts as a polarization beam splitter with respect to green light. On the other hand, first dichroic mirror 112a does not act in any way upon blue and red light, and transmits both P-polarized light and S-polarized light.

Figure 19A:
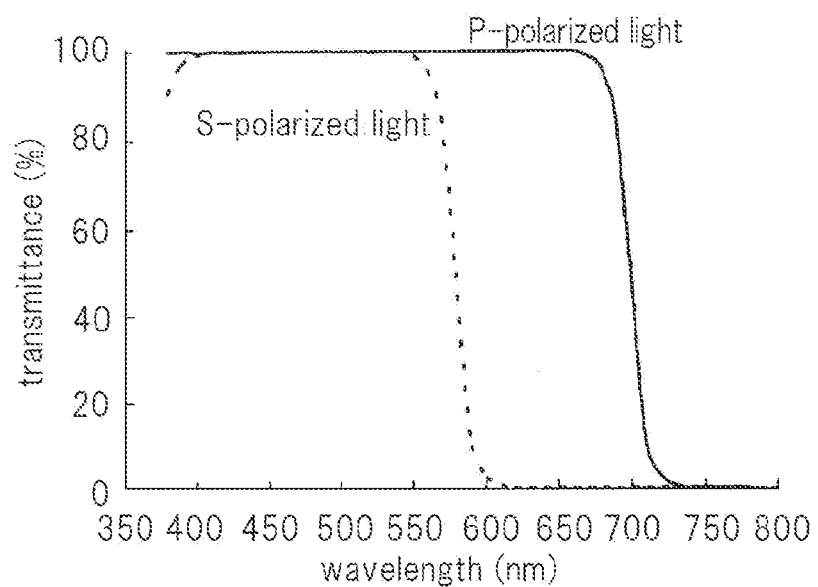
FIG. 19A is a graph showing the spectral transmittance characteristic with respect to P-polarized light and S-polarized light of the second dichroic mirror of the color synthesis optical element shown in FIG. 17.
Figure 19B:
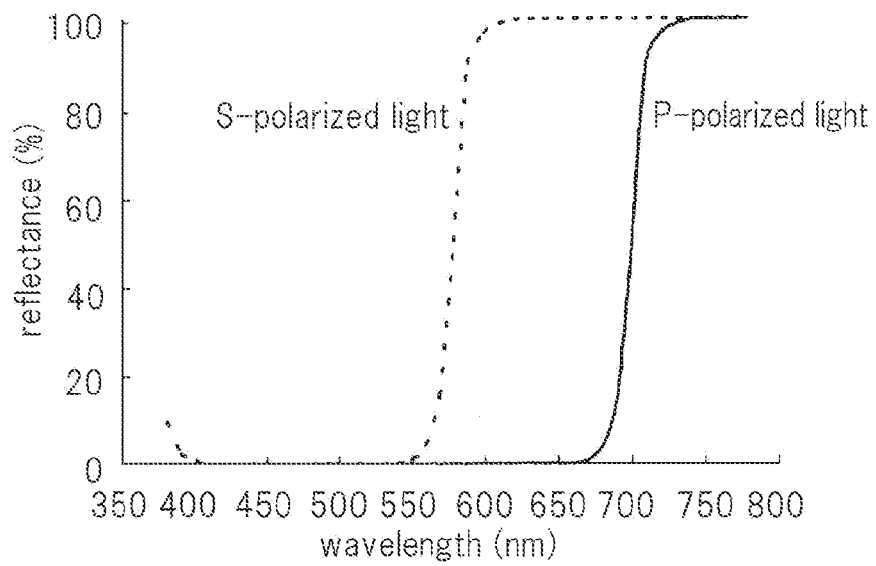
FIG. 19B is a graph showing the spectral reflectance characteristic with respect to P-polarized light and S-polarized light of the second dichroic mirror of the color synthesis optical element shown in FIG. 17.

FIG. 19A is a graph showing the spectral transmittance characteristic with respect to P-polarized light and S-polarized light of second dichroic mirror 112b. FIG. 19B is a graph showing the spectral reflectance characteristic with respect to P-polarized light and S-polarized light of second dichroic mirror 112b.

The cutoff wavelength of second dichroic mirror 112b with respect to light that is entered as P-polarized light is 700 nm. In this case, second dichroic mirror 112b largely transmits and does not reflect P-polarized light having a wavelength of 700 nm or less. On the other hand, the cutoff wavelength of second dichroic mirror 112b with respect to light that is entered as S-polarized light is 580 nm. In this case, second dichroic mirror 112b largely reflects and does not transmit S-polarized light having a wavelength of 580 nm or more. Conversely, second dichroic mirror 112b largely transmits and does not reflect S-polarized light having a wavelength shorter than 580 nm.

If the characteristics of second dichroic mirror 112b are represented by second dichroic mirror 112b acting upon colored light, second dichroic mirror 112b does not act in any way upon blue and green light and transmits both P-polarized light and S-polarized light. With respect to red light, second dichroic mirror 112b transmits P-polarized light and reflects S-polarized light. In other words, second dichroic mirror 112b also acts as a polarization beam splitter with respect to red light.

A major point of difference from the spectral characteristics of the dichroic prism disclosed in Patent Document 11 (see FIGS. 1A and 1B) is the setting of the cutoff wavelengths with respect to S-polarized light of first dichroic mirror 112a and second dichroic mirror 112b to the blue-green (cyan) band of 490 nm and the yellow band of 580 nm. Due to this point of difference, light of a color that is insufficient can be compensated within the limits of etendue to obtain good white balance and the optical output characteristic of LED light sources can therefore be displayed to the maximum. This feature is next described in greater detail.

Figure 20:
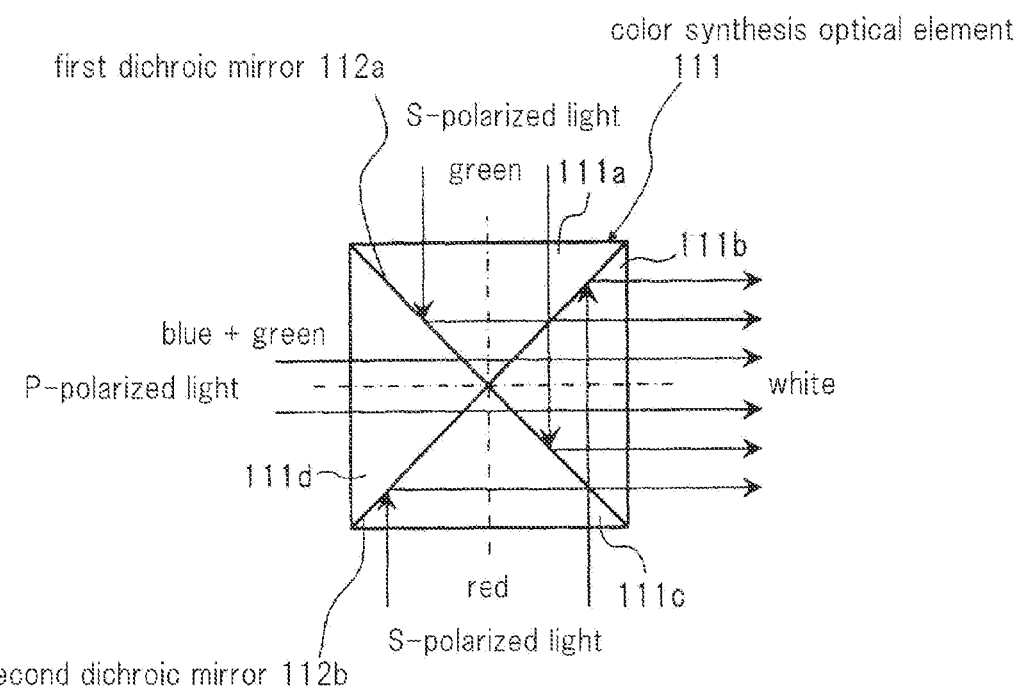
FIG. 20 is a schematic view showing an example of the optical paths in which colors are synthesized using the color synthesis optical element shown in FIG. 17.

FIG. 20 is a plan view for describing the optical paths when colors are synthesized using color synthesis optical element 111 shown in FIG. 17. As previously described, of the four side surfaces of color synthesis optical element 111, three surfaces are incident surfaces, and light is entered from the incident surfaces to synthesize colored light by first dichroic mirror 112a and second dichroic mirror 112b. The one remaining surface is the exit surface, and light that has been synthesized at first dichroic mirror 112a and second dichroic mirror 112b is exited from the exit surface.

In FIG. 20, the lines represented by solid lines with arrows are for describing the representative directions of progression of the incident luminous flux, but these lines do not mean that only the lines represented by solid lines with arrows represent the incident rays themselves. The incident light is luminous flux having a cross sectional area no greater than the incident surfaces of color synthesis optical element 111 and includes rays having positions other than the lines represented as solid lines with arrows as well as light rays having an angular component.

S-polarized light is used as green light. The green S-polarized light is entered to color synthesis optical element 111 from the incident surface of right angle prism 111a (in FIG. 20, the surface that is located on the upper side of the figure). Second dichroic mirror 112b does not act in any way upon green S-polarized light and the green S-polarized light is therefore transmitted through second dichroic mirror 112b without alteration. In contrast, first dichroic mirror 112a reflects all green S-polarized light. As a result, the optical path of green S-polarized light is bent 90 degrees at first dichroic mirror 112a as shown in FIG. 20 and the green S-polarized light that was reflected by first dichroic mirror 112a is exited from the exit surface.

S-polarized light is used as red light. Red S-polarized light is entered to color synthesis optical element 111 from the incident surface of right angle prism 111c (in FIG. 20, the surface located on the lower side of the figure). First dichroic mirror 112a does not act in any way upon red S-polarized light, and the red S-polarized light is therefore transmitted through first dichroic mirror 112a without alteration. In contrast, second dichroic mirror 112b reflects all red S-polarized light. As a result, the optical path of red S-polarized light is bent 90 degrees at second dichroic mirror 112b as shown in FIG. 20 and the red S-polarized light that was reflected at second dichroic mirror 112b is exited from the exit surface.

P-polarized light is used as blue light, and P-polarized light is further used as green light. The blue and green P-polarized light is entered to color synthesis optical element 111 from the incident surface of right angle prism 111d (in FIG. 20, the surface located on the left side of the figure). Neither first dichroic mirror 112a and second dichroic mirror 112b act in any way upon blue and green P-polarized light, and the blue and green P-polarized light is therefore transmitted through first dichroic mirror 112a and second dichroic mirror 112b without alteration and exited from the exit surface.

As described hereinabove, in color synthesis optical element 111 of the present exemplary embodiment, white light can be obtained by synthesizing blue P-polarized light, green P-polarized light and S-polarized light, and red S-polarized light.

Figure 21A:
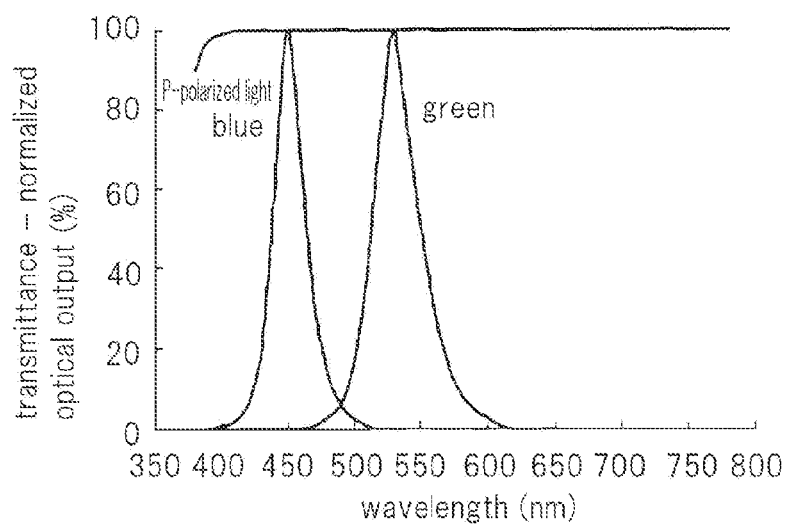
FIG. 21A is a graph showing the relation between the emission spectrums of each of the blue and green LED light sources and the spectral transmittance characteristic with respect to P-polarized light of the first dichroic mirror of the color synthesis optical element shown in FIG. 17.
Figure 21B:
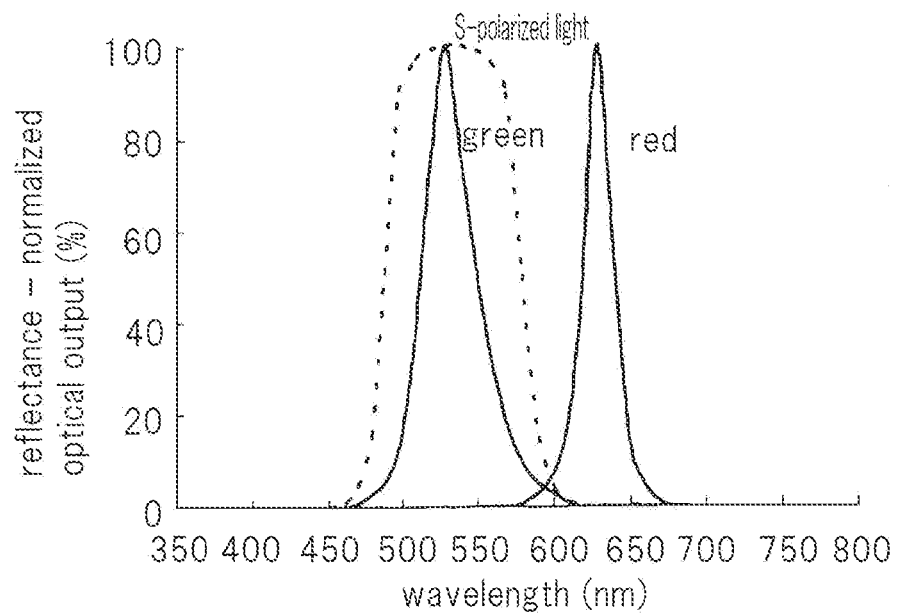
FIG. 21B is a graph showing the relation between the emission spectrums of each of the green and red LED light sources and the spectral reflectance characteristic with respect to S-polarized light of the first dichroic mirror of the color synthesis optical element shown in FIG. 17.

FIG. 21A is a graph showing the relation between the emission spectrums of each of blue and green LED light sources and the spectral transmittance characteristic with respect to P-polarized light of first dichroic mirror 112a. FIG. 21B is a graph showing the relation between the emission spectrums of each of green and red LED light sources and the spectral reflectance characteristic with respect to S-polarized light of first dichroic mirror 112a. The peak wavelength of a red LED light source is 630 nm, the peak wavelength of a green LED light source is 530 nm, and the peak wavelength of a blue LED light source is 450 nm.

Figure 22A:
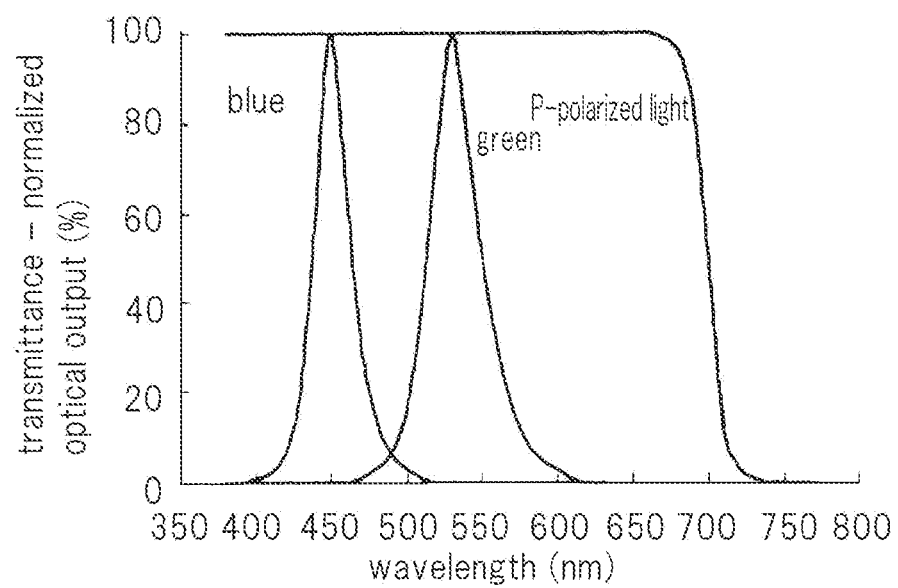
FIG. 22A is a graph showing the relation between the emission spectrums of each of the blue and green LED light sources and the spectral transmittance characteristic with respect to P-polarized light of the second dichroic mirror of the color synthesis optical element shown in FIG. 17.
Figure 22B:
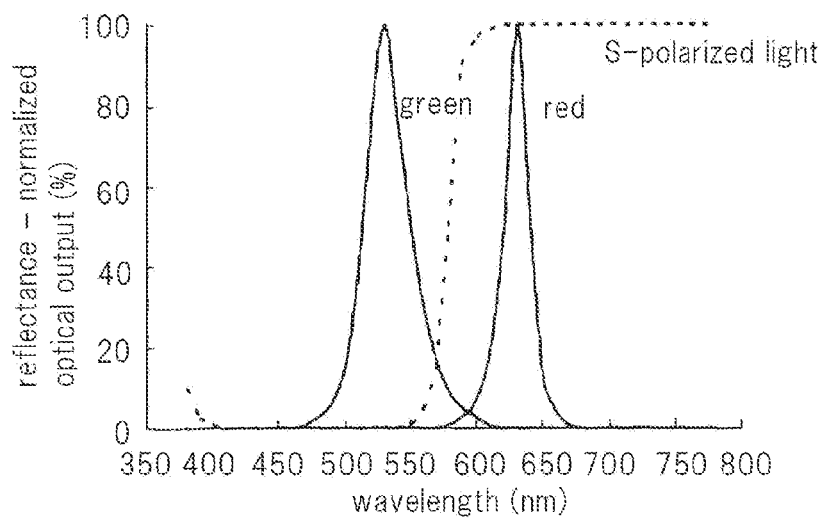
FIG. 22B is a graph showing the relation between the emission spectrums of each of the green and red LED light sources and the spectral reflectance characteristic with respect to S-polarized light of the second dichroic mirror of the color synthesis optical element shown in FIG. 17.

FIG. 22A is a graph showing the relation between the emission spectrums of each of blue and green LED light sources and the spectral transmittance characteristic with respect to P-polarized light of second dichroic mirror 112b. FIG. 22B is a graph showing the relation between the emission spectrums of each of red and green LED light sources and the spectral reflectance characteristic with respect to S-polarized light of second dichroic mirror 112b. The peak wavelength of a red LED light source is 630 nm, the peak wavelength of a green LED light source is 530 nm, and the peak wavelength of a blue LED light source is 450 nm.

As can be clearly seen from FIGS. 21A and 22A, the cutoff wavelengths of first dichroic mirror 112a and second dichroic mirror 112b with respect to blue and green P-polarized light are sufficiently separated. Accordingly, blue and green P-polarized light is not reflected by dichroic mirrors 112a and 112b despite shifts of the cutoff wavelengths due to incident angle dependency. As a result, loss due to incident angle dependency will not occur.

Further, as can be clearly seen from FIGS. 21B and 22B, the cutoff wavelengths of first dichroic mirror 112a and second dichroic mirror 112b with respect to red S-polarized light and green S-polarized light are sufficiently separated. Accordingly, red and green S-polarized light can be synthesized by these dichroic mirrors 112a and 112b with virtually no loss despite shifts of the cutoff wavelengths due to incident angle dependency.

By thus setting the cutoff wavelengths of first dichroic mirror 112a and second dichroic mirror 112b to the wavelength bands of yellow and blue-green (cyan) that are not used in color synthesis, colored light can be synthesized efficiently for light that is entered at angles that differ from parallel light.

As with the first exemplary embodiment, the present exemplary embodiment enables synthesis of green light from two different directions. Moreover, a configuration is adopted that decreases the quantity of blue light for which optical output is relatively great and that adds green light. Accordingly, the three primary colors can be synthesized at preferable color mixing ratios and white light with superior white balance can be obtained. In addition, the optical output of the LEDs of three colors can be displayed at a maximum without limitation.

Fourth Exemplary Embodiment

Figure 23:
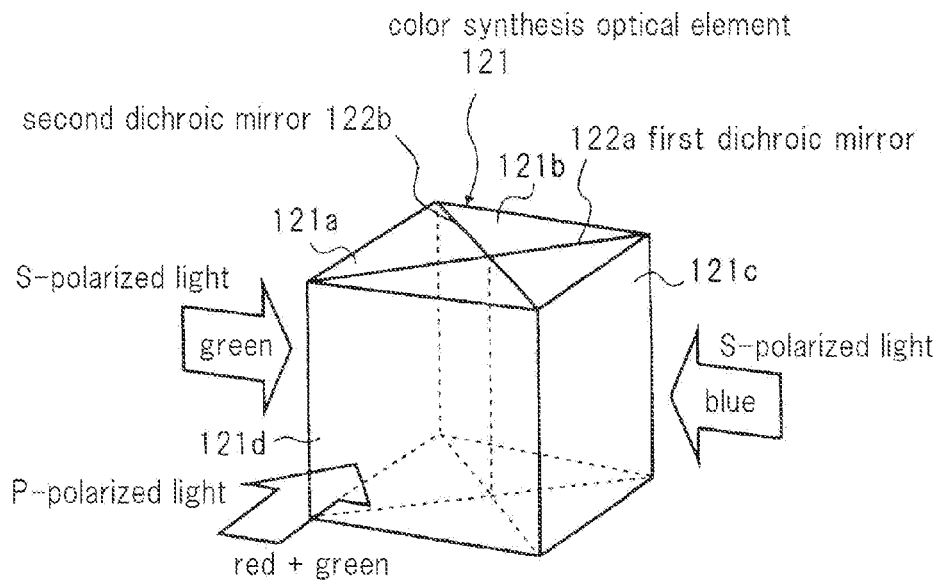
FIG. 23 is a perspective view showing the configuration of the color synthesis optical element that is the fourth exemplary embodiment of the present invention.

FIG. 23 is a perspective view showing the configuration of the color synthesis optical element that is the fourth exemplary embodiment of the present invention.

Referring to FIG. 23, similar to the first exemplary embodiment, color synthesis optical element 121 is a cross dichroic prism composed of four right angle prisms 121a-121d in which surfaces that form right angles are joined together. First dichroic mirror 122a and second dichroic mirror 122b composed of dielectric multilayer films are formed on the bonding surfaces of right angle prisms 121a-121d so as to intersect.

Of the four side surfaces of color synthesis optical element 121, light is entered from three surfaces (the surfaces of each of right angle prisms 121a, 121c, and 121d) and the colors are synthesized. S-polarized light (green) is entered to the surface of right angle prism 121a, and S-polarized light (blue) is entered to the surface of right angle prism 121c that is opposite this incident surface. P-polarized light (red+green) is entered to the surface of right angle prism 121d. Light that is obtained by synthesizing the light that was entered from the three side surfaces is exited from the one remaining side surface (the surface of right angle prism 121b that is opposite the surface of right angle prism 121d).

In color synthesis optical element 1 of the first exemplary embodiment shown in FIG. 2, green and blue S-polarized light is entered to the incident surface of right angle prism 1a, red S-polarized light is entered to the incident surface of right angle prism 1c, and green P-polarized light is entered to the incident surface of right angle prism 1d. In contrast, in color synthesis optical element 121 of the present exemplary embodiment, green S-polarized light is entered to the incident surface of right angle prism 121a, blue S-polarized light is entered to the incident surface of right angle prism 121c, and red and green P-polarized light is entered to the incident surface of right angle prism 121d. In other words, color synthesis optical element 121 of the present exemplary embodiment differs from the color synthesis optical element of the first exemplary embodiment in that red P-polarized light and green P-polarized light are entered to the transmission optical path of P-polarized light and green S-polarized light and blue S-polarized light are each entered to the reflection optical path of S-polarized light.

Figure 24A:
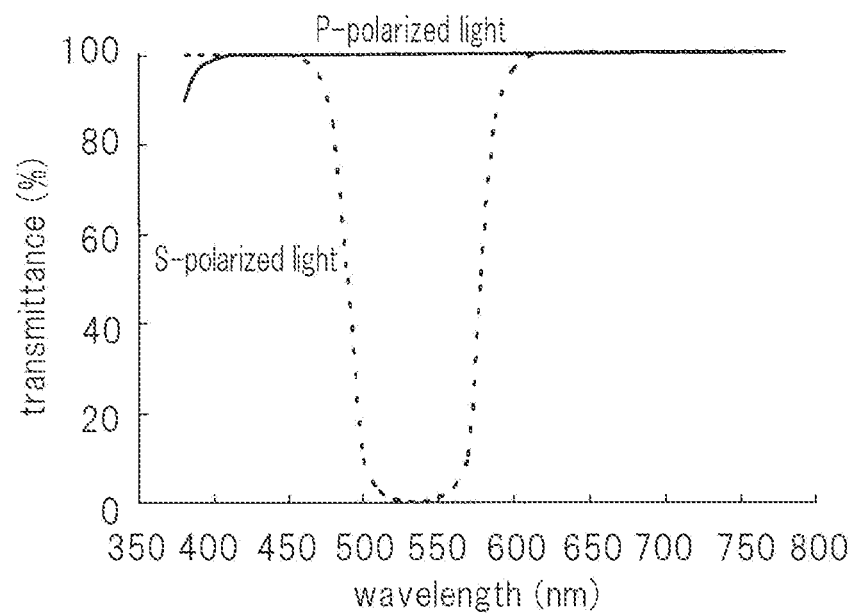
FIG. 24A is a graph showing the spectral transmittance characteristic with respect to P-polarized light and S-polarized light of the first dichroic mirror of the color synthesis optical element shown in FIG. 23.
Figure 24B:
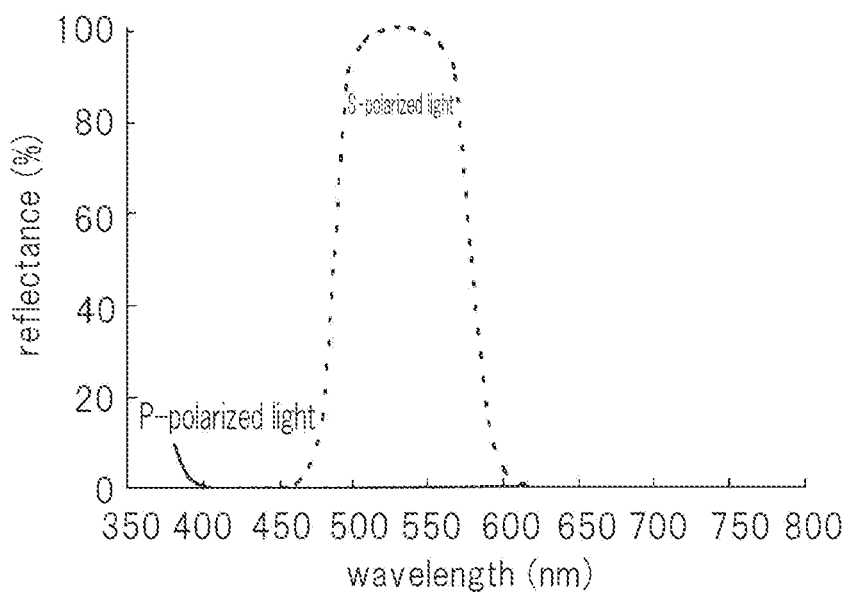
FIG. 24B is a graph showing the spectral reflectance characteristic with respect to P-polarized light and S-polarized light of the first dichroic mirror of the color synthesis optical element shown in FIG. 23.

FIG. 24A is a graph showing the spectral transmittance characteristic with respect to P-polarized light and S-polarized light of first dichroic mirror 122a. FIG. 24B is a graph showing the spectral reflectance characteristic with respect to P-polarized light and S-polarized light of first dichroic mirror 122a.

First dichroic mirror 122a largely transmits and does not reflect light of the visible band of light that is entered as P-polarized light. The cutoff wavelengths of first dichroic mirror 122a with respect to light that is entered as S-polarized light are 490 nm and 580 nm. In this case, first dichroic mirror 122*a* largely transmits and does not reflect S-polarized light having a wavelength no greater than 490 nm or a wavelength of at least 580 nm. In addition, first dichroic mirror 122*a* largely reflects and does not transmit S-polarized light having a wavelength greater than 490 nm but that falls below 580 nm.

If the characteristics of first dichroic mirror 122*a* are represented by first dichroic mirror 122*a* acting upon colored light, with regard to green light, first dichroic mirror 122*a* transmits P-polarized light and reflects S-polarized light. In other words, first dichroic mirror 122*a* also acts as a polarization beam splitter with respect to green light. First dichroic mirror 122*a* does not act in any way upon blue and red light and transmits both P-polarized light and S-polarized light.

Figure 25A:
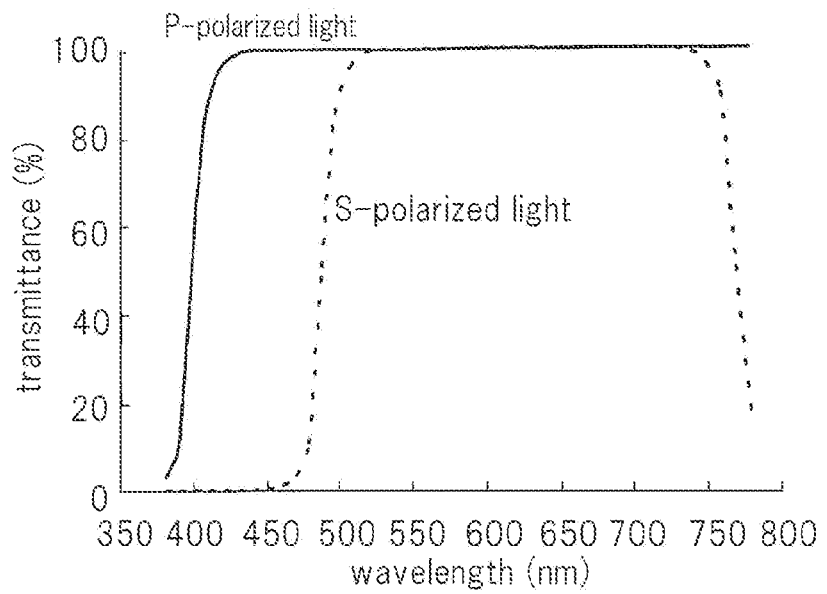
FIG. 25A is a graph showing the spectral transmittance characteristic with respect to P-polarized light and S-polarized light of the second dichroic mirror of the color synthesis optical element shown in FIG. 23.
Figure 25B:
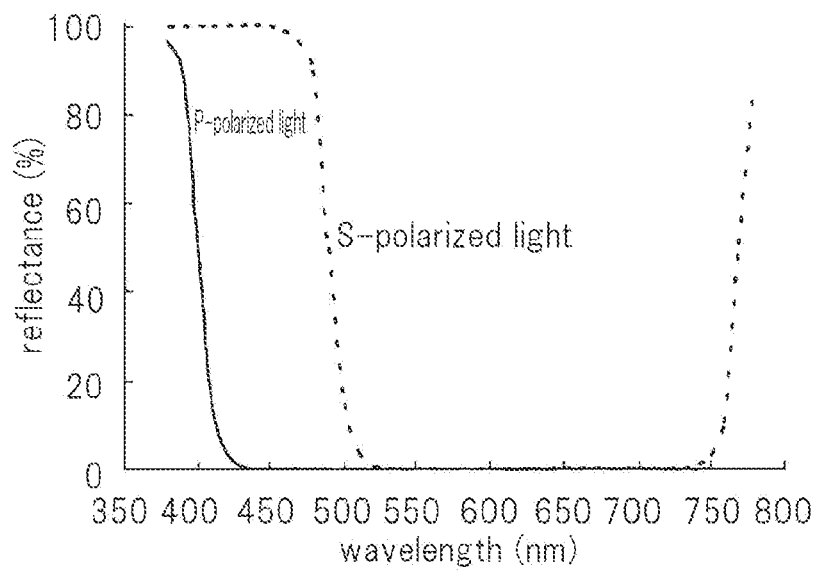
FIG. 25B is a graph showing the spectral reflectance characteristic with respect to P-polarized light and S-polarized light of the second dichroic mirror of the color synthesis optical element shown in FIG. 23.

FIG. 25A is a graph showing the spectral transmittance characteristic with respect to P-polarized light and S-polarized light of second dichroic mirror 122*b*. FIG. 25B is a graph showing the spectral reflectance characteristic with respect to P-polarized light and S-polarized light of second dichroic mirror 122*b*.

The cutoff wavelength of second dichroic mirror 122*b* with respect to light that is entered as P-polarized light is 400 nm. In this case, second dichroic mirror 122*b* largely transmits and does not reflect P-polarized light having a wavelength of 400 nm or more. The cutoff wavelength of second dichroic mirror 122*b* with respect to light that is entered as S-polarized light is 490 nm. In this case, second dichroic mirror 122*b* largely reflects and does not transmit S-polarized light having a wavelength of 490 nm or less. In addition, second dichroic mirror 122*b* largely transmits and does not reflect S-polarized light having a wavelength longer than 490 nm.

If the characteristics of second dichroic mirror 122*b* are represented as second dichroic mirror 122*b* acting upon colored light, with regard to red and green light, second dichroic mirror 122*b* does not act in any way upon either P-polarized light or S-polarized light and transmits both. With respect to blue light, second dichroic mirror 122*b* transmits P-polarized light and reflects S-polarized light. In other words, second dichroic mirror 122*b* also acts as a polarization beam splitter with respect to blue light.

The present exemplary embodiment differs greatly from the dichroic prism disclosed in Patent Document 11 (see FIGS. 1A and 1B) in that the cutoff wavelengths for S-polarized light of first dichroic mirror 122*a* and second dichroic mirror 122*b* are set to bands of blue-green (cyan) of 490 nm and yellow of 580 nm. Due to this difference, light of a color that is insufficient can be compensated within the limits of etendue to obtain good white balance and the optical output characteristic of LED light sources can be caused to be displayed at a maximum. This feature will next be described in greater detail.

Figure 26:
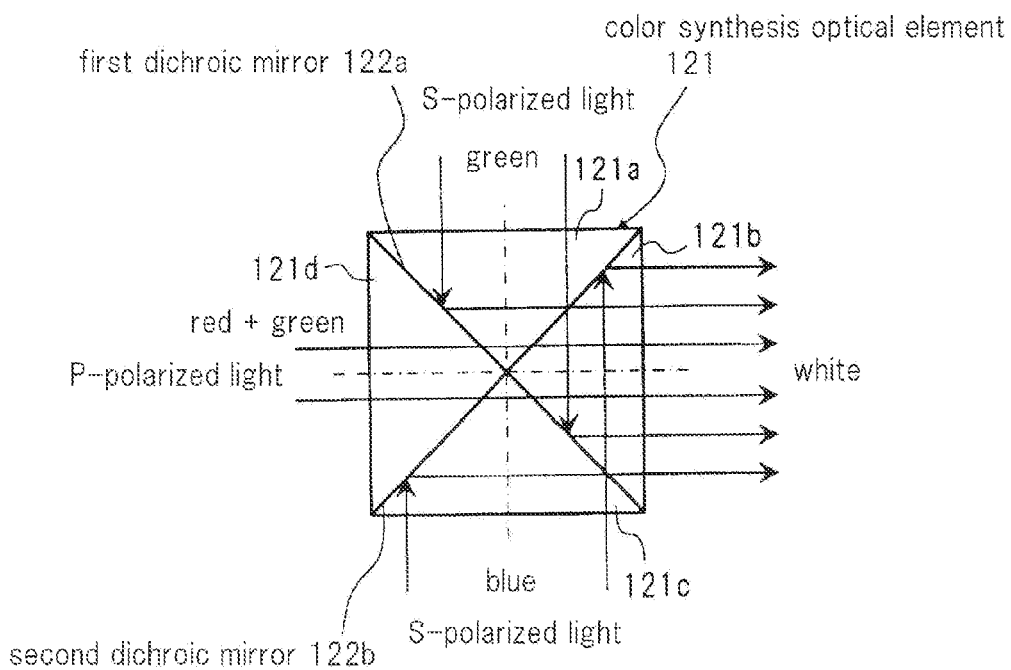
FIG. 26 is a schematic view showing an example of the optical paths in which colors are synthesized using the color synthesis optical element shown in FIG. 23.

FIG. 26 is a plan view for describing the optical paths when colors are synthesized using color synthesis optical element 121 shown in FIG. 23. As previously described, of the four side surfaces of color synthesis optical element 121, three surfaces are incident surfaces, and light is entered from the incident surfaces to synthesize colored light by first dichroic mirror 122*a* and second dichroic mirror 122*b*. The one remaining surface is the exit surface and light that has been synthesized at first dichroic mirror 122*a* and second dichroic mirror 122*b* is exited from this exit surface.

In FIG. 26, lines that are represented as solid lines with arrows are for describing representative directions of the progression of incident luminous flux but do not mean that the incident rays represent only these lines represented as solid lines with arrows. The incident light is luminous flux having a cross-sectional area no greater than the incident surfaces of color synthesis optical element 121 and includes rays having positions other than the lines represented as solid lines with arrows as well as rays having an angular component.

S-polarized light is used as green light. The green S-polarized light is entered to color synthesis optical element 121 from the incident surface of right angle prism 121*a* (in FIG. 26, the surface located on the upper side of the figure). Second dichroic mirror 122*b* does not act in any way upon green S-polarized light and the green S-polarized light is therefore transmitted through second dichroic mirror 122*b* without alteration. In contrast, first dichroic mirror 122*a* reflects all green S-polarized light. Accordingly, the optical path of the green S-polarized light is bent 90 degrees at first dichroic mirror 122*a* as shown in FIG. 26 and the green S-polarized light that was reflected at first dichroic mirror 122*a* is exited from the exit surface.

S-polarized light is used as blue light. The blue S-polarized light is entered to color synthesis optical element 121 from the incident surface of right angle prism 121*c* (in FIG. 26, the surface located on the lower side of the figure). First dichroic mirror 122*a* does not act in any way upon the blue S-polarized light, and the blue S-polarized light is therefore transmitted through first dichroic mirror 122*a* without alteration. In contrast, second dichroic mirror 122*b* reflects all blue S-polarized light. As a result, the optical path of the blue S-polarized light is bent 90 degrees at second dichroic mirror 122*b* as shown in FIG. 26 and the blue S-polarized light that was reflected at second dichroic mirror 122*b* is exited from the exit surface.

P-polarized light is used as red light, and further, P-polarized light is used as green light. The red and green P-polarized light are entered to color synthesis optical element 121 from the incident surface of right angle prism 121*d* (in FIG. 26, the surface located on the left side of the figure). Neither first dichroic mirror 122*a* nor second dichroic mirror 122*b* act in any way upon red and green P-polarized light, and the red and green P-polarized light are therefore transmitted through first dichroic mirror 122*a* and second dichroic mirror 122*b* without alteration and are exited from the exit surface.

As previously described, white light can be obtained in color synthesis optical element 121 of the present exemplary embodiment by the synthesis of red P-polarized light, green P-polarized light and S-polarized light, and blue S-polarized light.

Figure 27A:
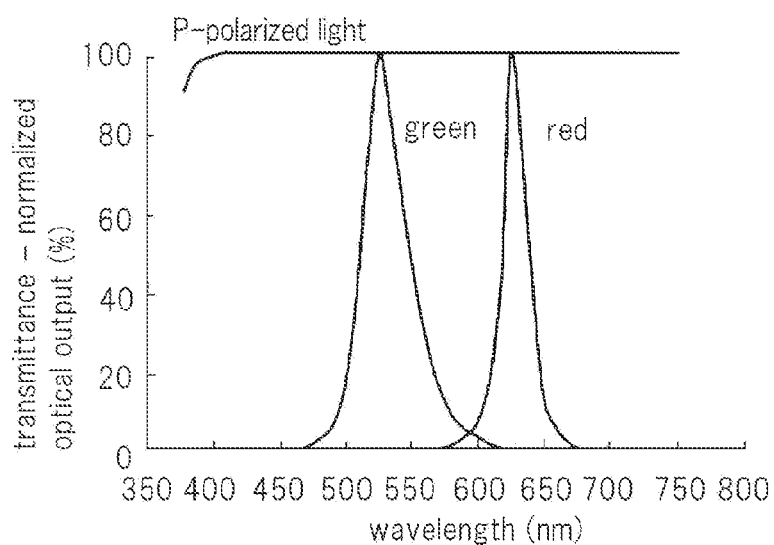
FIG. 27A is a graph showing the relation between the emission spectrums of each of the green and red LED light sources and the spectral transmittance characteristic with respect to P-polarized light of the first dichroic mirror of the color synthesis optical element shown in FIG. 23.
Figure 27B:
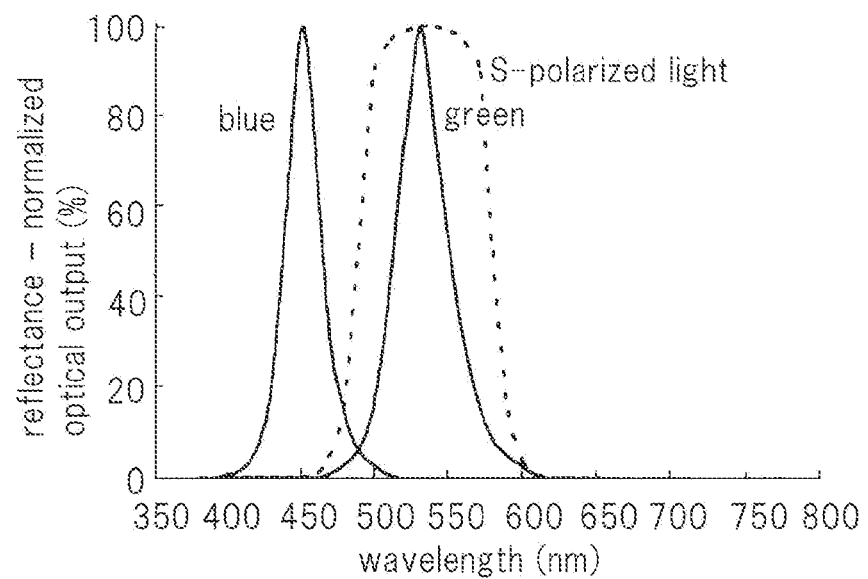
FIG. 27B is a graph showing the relation between the emission spectrums of each of the blue and green LED light sources and the spectral reflectance characteristic with respect to S-polarized light of the first dichroic mirror of the color synthesis optical element shown in FIG. 23.

FIG. 27A is a graph showing the relation between the emission spectrums of each of green and red LED light sources and the spectral transmittance characteristic with respect to P-polarized light of first dichroic mirror 122*a*. FIG. 27B is a graph showing the relation between the emission spectrums of each of blue and green LED light sources and the spectral reflectance characteristic with respect to S-polarized light of first dichroic mirror 122*a*. The peak wavelength of a red LED light source is 630 nm, the peak wavelength of a green LED light source is 530 nm, and the peak wavelength of a blue LED light source is 450 nm.

Figure 28A:
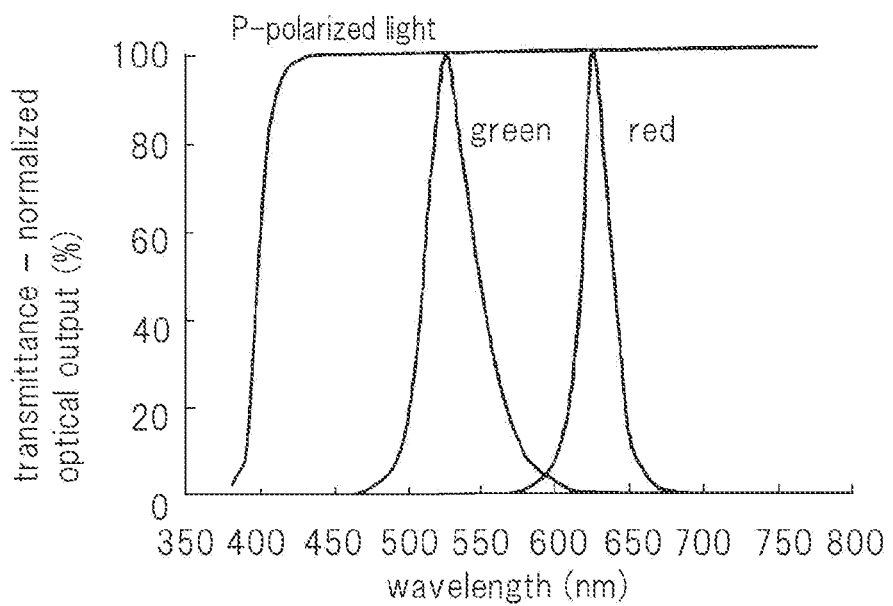
FIG. 28A is a graph showing the relation between the emission spectrums of each of the green and red LED light sources and the spectral transmittance characteristic with respect to P-polarized light of the second dichroic mirror of the color synthesis optical element shown in FIG. 23.
Figure 28B:
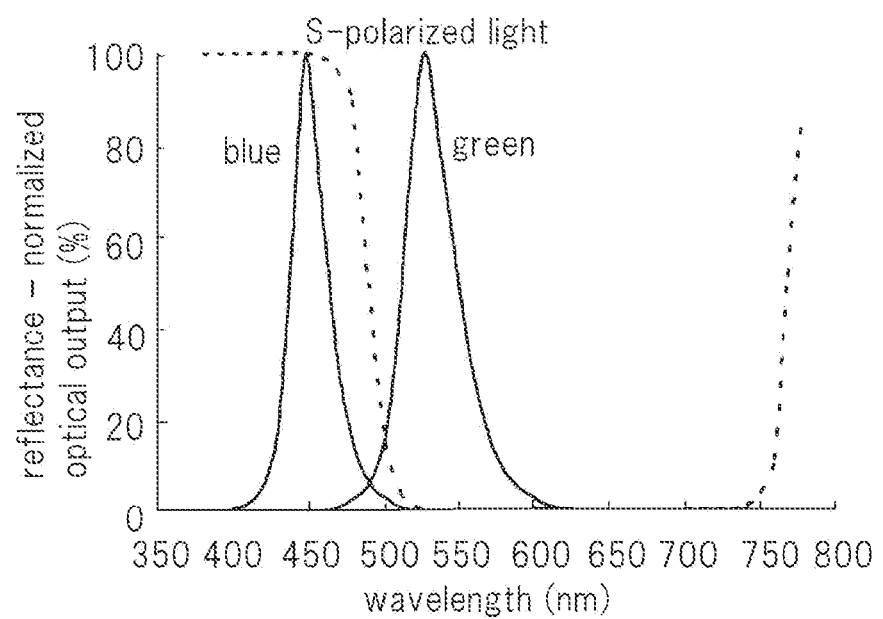
FIG. 28B is a graph showing the relation between the emission spectrums of each of the blue and green LED light sources and the spectral reflectance characteristic with respect to S-polarized light of the second dichroic mirror of the color synthesis optical element shown in FIG. 23.

FIG. 28A is a graph showing the relation between the emission spectrums of each of red and green LED light sources and the spectral transmittance characteristic with respect to P-polarized light of second dichroic mirror 122*b*. FIG. 28B is a graph showing the relation between the emission spectrums of each of blue and green LED light sources and the spectral reflectance characteristic with respect to S-polarized light of second dichroic mirror 122*b*.

The peak wavelength of a red LED light source is 630 nm, the peak wavelength of a green LED light source is 530 nm, and the peak wavelength of a blue LED light source is 450 nm.

As can be clearly seen from FIGS. 27A and 28A, the cutoff wavelengths of first dichroic mirror 122a and second dichroic mirror 122b with respect to red and green P-polarized light are sufficiently separated. Accordingly, red and green P-polarized light is not reflected by these dichroic mirrors 122a and 122b despite shifts of the cutoff wavelengths due to incident angle dependency. As a result, loss due to incident angle dependency does not occur.

In addition, as can be clearly seen from FIGS. 27B and 28B, the cutoff wavelengths of first dichroic mirror 122a and second dichroic mirror 122b with respect to blue S-polarized light and green S-polarized light are sufficiently separated. Accordingly, the blue and green S-polarized light can be synthesized in these dichroic mirrors 122a and 122b with virtually no loss despite shifts of the cutoff wavelengths due to incident angle dependency.

Because the cutoff wavelengths of first dichroic mirror 122a and second dichroic mirror 122b are thus set to the wavelength bands of blue-green (cyan) and yellow that are not used in color synthesis, colored light can be synthesized efficiently even for light that is incident at angles that differ from parallel light.

As with the first exemplary embodiment, the present exemplary embodiment enables synthesis of green light from two different directions. Moreover, a configuration is adopted that decreases the quantity of red light for which optical output is relatively great and that adds green light. Accordingly, the three primary colors can be synthesized at preferable color mixing ratios and white light having superior white balance can be obtained. In addition, the optical output of LEDs of three colors can be caused to be displayed at their maximum without limitations.

Fifth Exemplary Embodiment

Figure 29:
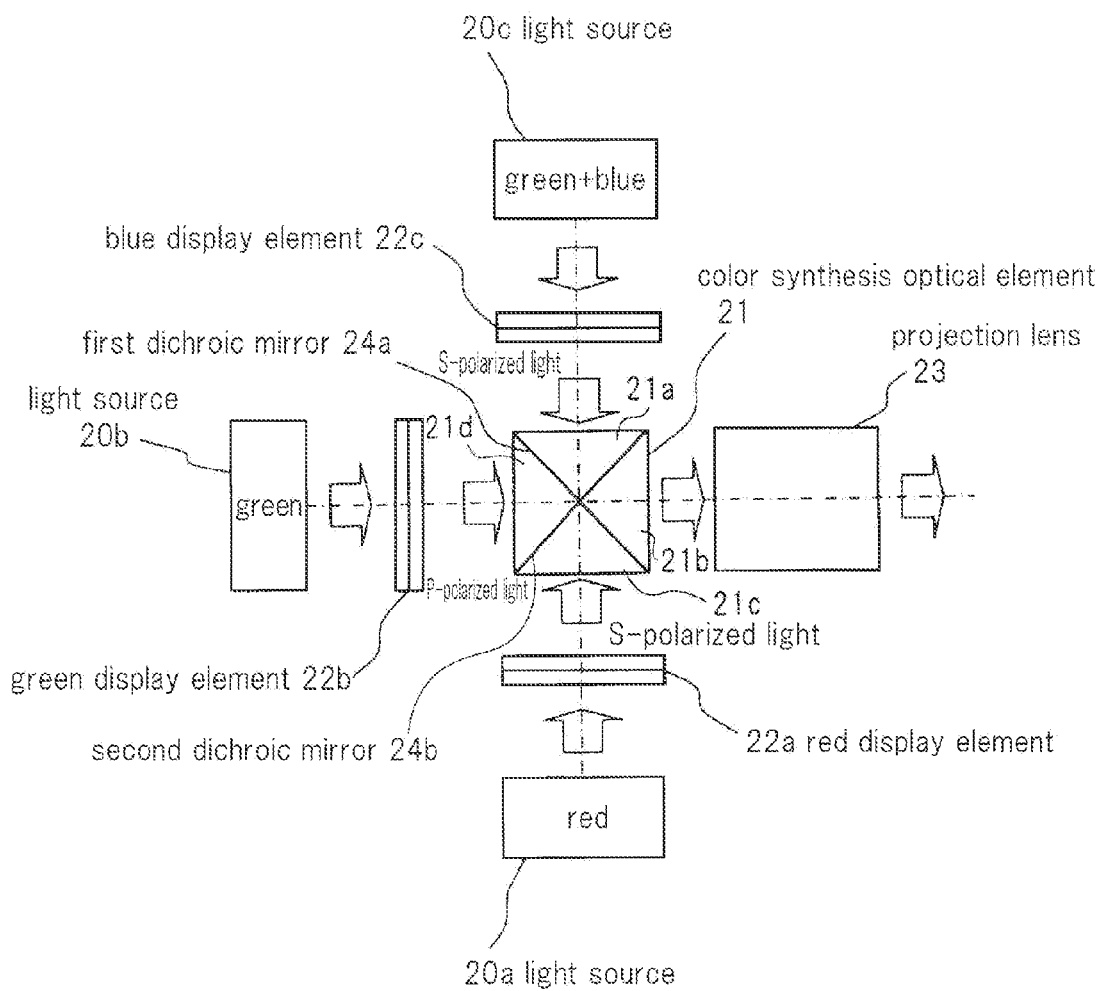
FIG. 29 is a block diagram showing the configuration of the projection-type display device that is the fifth exemplary embodiment of the present invention.

FIG. 29 is a block diagram showing the configuration of the projection-type display device that is the fifth exemplary embodiment of the present invention.

The projection-type display device of the present exemplary embodiment includes three light sources 20a-20c, color synthesis optical element 21, red display element 22a, green display element 22b, blue display element 22c, and projection lens 23.

Color synthesis optical element 21 is a cross dichroic prism similar to the first exemplary embodiment, and includes four right angle prisms 21a-21d in which the surfaces that form right angles are joined together. First dichroic mirror 24a and second dichroic mirror 24b that are composed of dielectric multilayer films are formed on the bonded surfaces of right angle prisms 21a-21d so as to intersect.

Light source 20a supplies red light. Light source 20b supplies green light. Light source 20c supplies green light and blue light. Red, green, and blue here correspond to the three primary colors of light.

Red display element 22a is provided in the direction of progression of the luminous flux (red) from light source 20a. The luminous flux (red) from light source 20a is irradiated to red display element 22a. Red display element 22a generates image light (red) of S-polarized light. Right angle prism 21c of color synthesis optical element 21 is arranged in the direction of progression of the image light (red) of S-polarized light from red display element 22a.

Green display element 22b is provided in the direction of progression of the luminous flux (green) from light source 20b. The luminous flux (green) from light source 20b is irradiated to green display element 22b. Green display element 22b generates image light (green) of P-polarized light. Right angle prism 21d of color synthesis optical element 21 is arranged in the direction of progression of image light (green) of P-polarized light from green display element 22b.

Blue display element 22c is provided in the direction of progression of the luminous flux (green+blue) from light source 20c. The luminous flux (green+blue) from light source 20c is irradiated to blue display element 22c. Blue display element 22c generates image light (green+blue) of S-polarized light. Right angle prism 21a of color synthesis optical element 21 is arranged in the direction of progression of image light (green+blue) of S-polarized light from blue display element 22c.

Of the four side surfaces of color synthesis optical element 21, the surfaces of right angle prisms 21a, 21c, and 21d are incident surfaces, and the surface of right angle prism 21b is the exit surface. An anti-reflection film composed of a dielectric multilayer film may be provided on these incident and exit surfaces.

Image light (red) of S-polarized light from red display element 22a is entered to color synthesis optical element 21 from the incident surface on the side of right angle prism 21c. Image light (green) of P-polarized light from green display element 22b is entered to color synthesis optical element 21 from the incident surface on the side of right angle prism 21d. Image light (green+blue) of S-polarized light from blue display element 22c is entered to color synthesis optical element 21 from the incident surface of the side of right angle prism 21a.

The spectral transmittance characteristic and spectral reflectance characteristic of first dichroic mirror 24a with respect to P-polarized light and S-polarized light are as shown in FIGS. 3A and 3B.

The spectral transmittance characteristic and spectral reflectance characteristic of second dichroic mirror 24b with respect to P-polarized light and S-polarized light are as shown in FIGS. 4A and 4B.

In color synthesis optical element 21, image light (red) of S-polarized light, image light (green) of P-polarized light, and image light (green+blue) of S-polarized light that are entered from the incident surfaces of each of right angle prisms 21a, 21c, and 21d are color-synthesized by first dichroic mirror 24a and second dichroic mirror 24b. This image light that has undergone color synthesis is exited from the exit surface of right angle prism 21b.

Projection lens 23 is provided in the direction of progression of the luminous flux (image light) that is exited from the exit surface of color synthesis optical element 21. The image (or picture) that is displayed on each of display elements 22a-22c is projected onto a screen (not shown) by projection lens 23.

The configuration of red display element 22a, green display element 22b, and blue display element 22c is next described more concretely.

Figure 30:
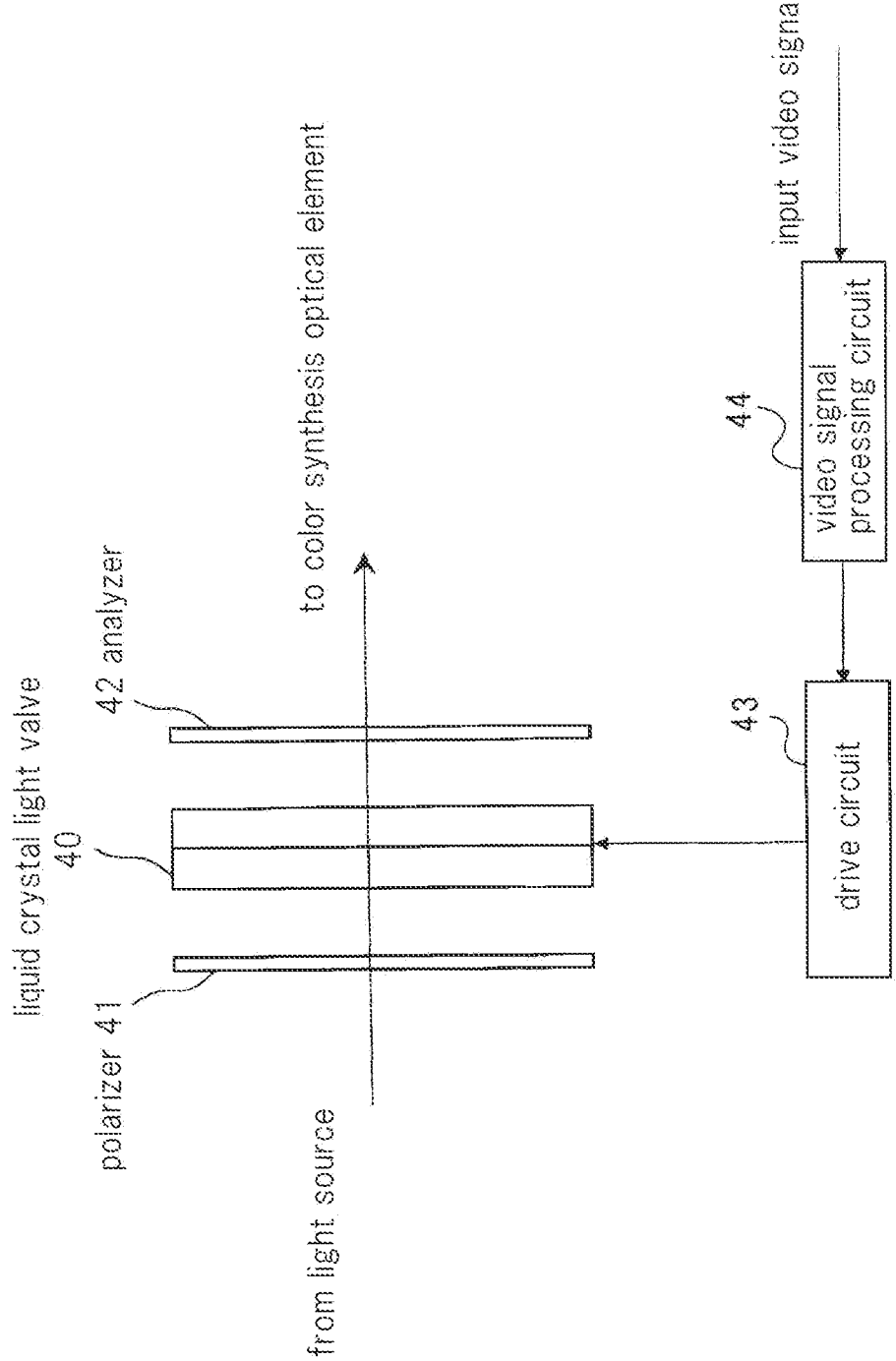
FIG. 30 is a block diagram showing the configuration of a display element of the projection-type display device shown in FIG. 29.

FIG. 30 is a block diagram showing the configuration of the display elements that are used as red display element 22a, green display element 22b, and blue display element 22c.

Referring to FIG. 30, a display element includes liquid crystal light valve 40. Polarizer 41 is attached to the incident surface side (light source side) of liquid crystal light valve 40, and analyzer 42 is attached to the exit surface side (color synthesis optical element side) of liquid crystal light valve 40.

Liquid crystal light valve 40 is provided with two glass substrates on which are formed transparent electrode films that form pixels, liquid crystal being filled between these glass substrates. As the liquid crystal, for example, twisted nematic (TN) liquid crystal is used. As the liquid crystal drive method, an active matrix (AM) method is employed that controls thin-film transistors (TFT) that are the switching elements provided for each pixel.

An input video signal is supplied to video signal processing circuit 44. Video signal processing circuit 44 carries out video signal processing such as brightness correction or color correction. A signal that has undergone video signal processing is supplied to drive circuit 43 from video signal processing circuit 44.

Drive circuit 43 subjects the signal from video signal processing circuit 44 to processing such as D/A conversion or polarity conversion for driving liquid crystal light valve 40 and supplies the drive signal to TFT that are provided in each pixel.

In liquid crystal light valve 40, the state of the liquid crystal is changed by the voltage that is applied to each pixel in accordance with the drive signal from drive circuit 43, and the polarization state of illumination light that passes through polarizer 41 changes according to the changes of the state of the liquid crystal. As a result, illumination light that has passed through analyzer 42 undergoes intensity modulation in accordance with an image that is based on the input video signal.

The liquid crystal mode is not limited to the TN type, and the drive mode is not limited to the AM method. However, the polarization direction of light that is exited from analyzer 42 is prescribed as the polarization direction that is used in the color synthesis optical element shown in FIG. 29. The polarization direction of light that passes through polarizer 41 according to the liquid crystal mode is prescribed by taking this point into consideration. The direction of polarization axis of polarizer 41 and analyzer 42 is determined based on this stipulation.

Each of color display elements 22a-22c shown in FIG. 29 is formed using the display element shown in FIG. 30. The length of the optical path from the liquid crystal light valve of each color to projection lens 23 and the position within a plane that is perpendicular to the optical axis of the liquid crystal light valve of each color are adjusted using a fine adjustment mechanism such that the displayed images of each color coincide on screen. The parts of the liquid crystal light valve of each color are fixed such that the positions relative to color synthesis optical element 21 do not shift.

An actual configuration of light sources 20a-20c shown in FIG. 29 is next described.

Figure 31:
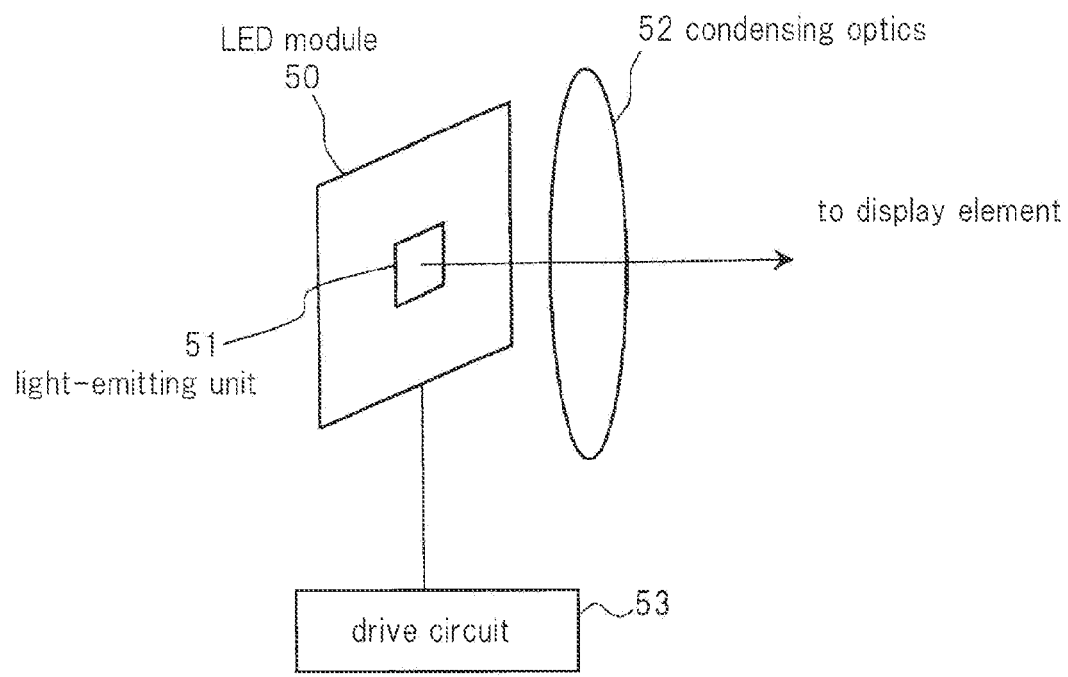
FIG. 31 is a block diagram showing the configuration of the light source of the projection-type display device shown in FIG. 29.

FIG. 31 is a block diagram showing the basic configuration of a light source used as light sources 20a-20c. Referring to FIG. 31, the light source includes LED module 50 in which an LED that is light-emitting unit 51 is mounted on a substrate. The substrate additionally serves the purpose of radiator plate and a heat sink (not shown) is also attached. A forced cooling device is further provided on LED module 50 and implements temperature control to stabilize the light-emission characteristic of the LED.

When the power supply switch of the projection-type display device is turned on, drive circuit 53 supplies drive current to light-emitting unit (LED) 51. When current flows to light-emitting unit (LED) 51, light-emitting unit (LED) 51 emits light. The light from light-emitting unit (LED) 51 is condensed by condensing optics 52. The luminous flux from condensing optics 52 is irradiated to the display element.

As the condensing optics, a lens-shaped optical element is used in FIG. 31, but a reflective optical unit such as a reflector may also be used. In addition, a fly-eye lens or glass rod may also be used as an integrator for causing the light to be irradiated to the display element uniformly. Still further, to prevent loss of one polarization component at the polarizer of a display element, optics may also be used for re-using one polarization component such as polarization conversion optics that employ a polarization beam splitter and half-wave plate. Of course, light-emitting unit 51 of LED module 50 may be the light source that produces polarized light, or a polarization conversion function may be provided in light-emitting unit 51 to generate polarized light from light-emitting unit 51. In either form, the light source can be constructed by means of any combination of known technology.

The actual configuration of an LED module of light sources 20a-20c is next described.

Figure 32A:
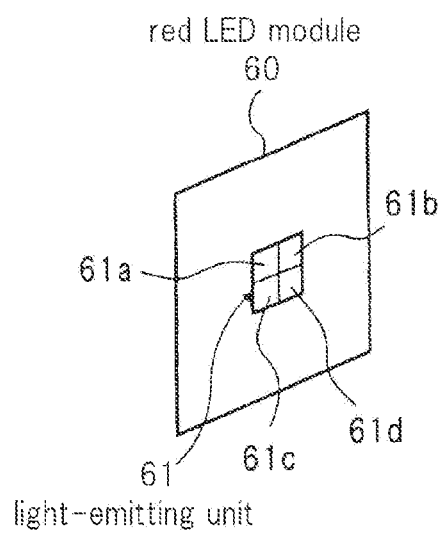
FIG. 32A is a schematic view showing the configuration of a red LED module that is used as a light source of the projection-type display device shown in FIG. 29.

FIG. 32A is a schematic view showing the configuration of red LED module 60 that is used in light source 20a. Referring to FIG. 32A, red LED module 60 includes light-emitting unit 61 composed of four LED chips 61a-61d. All of LED chips 61a-61d are composed of red LEDs in which the peak wavelength is 630 nm, the chip area of these components being substantially identical.

Figure 32B:
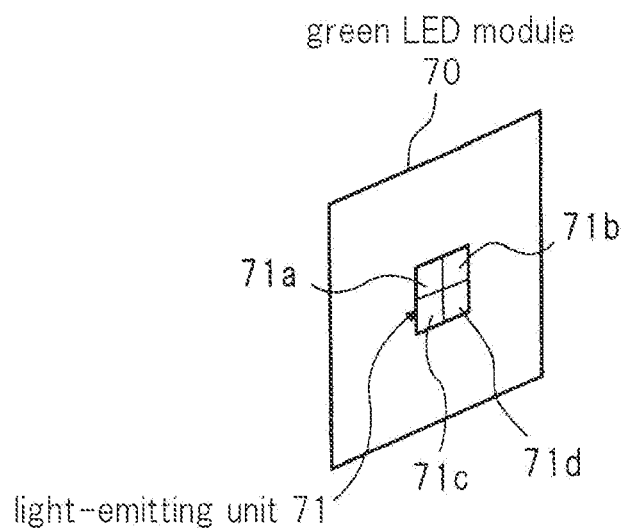
FIG. 32B is a schematic view showing the configuration of a green LED module that is used as a light source of the projection-type display device shown in FIG. 29.

FIG. 32B is a schematic view showing the configuration of green LED module 70 that is used in light source 20b. Referring to FIG. 32B, green LED module 70 includes light-emitting unit 71 composed of four LED chips 71a-71d. All of LED chips 71a-71d are composed of green LEDs in which the peak wavelength is 520 nm, the chip area of these LEDs being substantially identical.

Figure 32C:
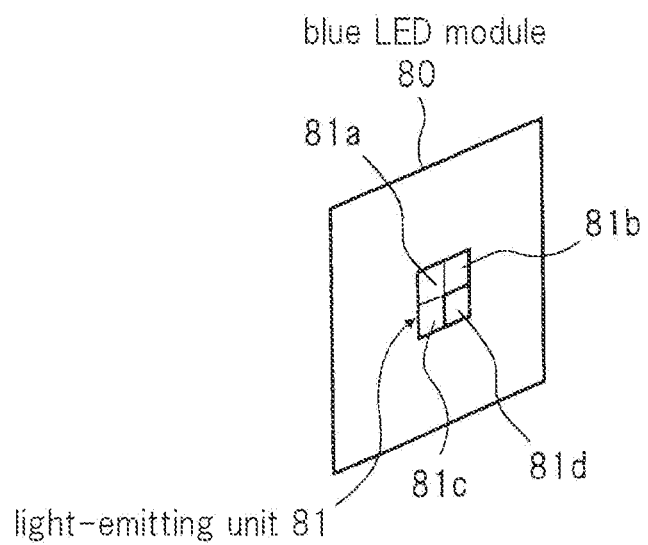
FIG. 32C is a schematic view showing the configuration of a blue LED module that is used as a light source of the projection-type display device shown in FIG. 29.

FIG. 32C is a schematic view showing the configuration of blue LED module 80 that is used in light source 20c. Referring to FIG. 32C, blue LED module 80 includes light-emitting unit 81 composed of four LED chips 81a-81d. All of LED chips 81a-81c are composed of blue LEDs in which the peak wavelength is 460 nm. LED chip 81d is composed of a green LED in which the peak wavelength is 520 nm. The chip areas of LED chips 81a-81d are substantially identical.

The emission spectrums of the red, green and blue LED that make up above-described LED chips 61a-61d, 71a-71d, and 81a-81d are similar to the examples shown in FIG. 6B.

The area of each of light-emitting units 61, 71, and 81 is basically determined by the area of the display element and the f-number of the projection lens based on the previously described limits of etendue, but in determining this area, the positioning margins in fabrication and uniformity of the illumination distribution of the illumination light are taken into consideration.

In red LED module 60, green LED module 70, and blue LED module 80, the LED chips that make up the light-emitting units have different light emission characteristics with respect to current, and the amount of current to light-emitting units 51 (LED chips) is therefore controlled by means of drive circuit 53 shown in FIG. 31 according to these light-emission characteristics.

In addition, the characteristics of the LEDs of each color at the time of rated drive are as next described. The chromaticity of a red LED is given as (0.700, 0.300) on xy chromaticity coordinates, and the emitted luminous flux is 455 lm per chip. The chromaticity of a green LED is given as (0.195, 0.700) on xy chromaticity coordinates, and the emitted luminous flux is 1000 lm per chip. The chromaticity of a blue LED is given as (0.140, 0.046) on xy chromaticity coordinates, and the emitted luminous flux is 133 lm per chip.

The operation of the projection-type display device of the present exemplary embodiment that is made up from the above-described constituent elements is next described with reference to FIG. 29.

Light source 20a is made up from red LED module 60 shown in FIG. 32A, and the light emitted from this red LED module 60 has the emission spectrum of a red LED such as shown in FIG. 6B. The light (red) from light source 20a is irradiated to red display element 22a.

The light (red) from light source 20a, after undergoing intensity modulation that accords with the image (for red) that is based on the input video signal in red display element 22a, is entered to color synthesis optical element 21 as image light (red) of S-polarized light from red display element 22a.

First dichroic mirror 24a has reflection characteristics with respect to S-polarized light such as shown in FIG. 6B, and image light (red) of S-polarized light from red display element 22a is therefore transmitted through first dichroic mirror 24a. Second dichroic mirror 24b has reflection characteristics with respect to S-polarized light as shown in FIG. 7B, and image light (red) of S-polarized light from red display element 22a is therefore reflected such that the optical path is bent 90 degrees by second dichroic mirror 24b. The image light (red) of S-polarized light that was reflected at second dichroic mirror 24b is exited from light exit surface of color synthesis optical element 21.

Light source 20b is made up of green LED module 70 shown in FIG. 32B, and the light emitted from this green LED module 70 has an exit spectrum of a green LED such as shown in FIG. 6B. The light (green) from light source 20b is irradiated to green display element 22b.

The light (green) from light source 20b, after having undergone intensity modulation according to an image (for green) that is based on the input video signal in green display element 22b, is entered to color synthesis optical element 21 as image light (green) of P-polarized light from green display element 22b.

First dichroic mirror 24a has the transmission characteristics with respect to P-polarized light such as shown in FIG. 6A and the image light (green) of P-polarized light from green display element 22b is therefore transmitted through first dichroic mirror 24a without alteration. Second dichroic mirror 24b has the transmission characteristics with respect to P-polarized light such as shown in FIG. 7A, and image light (green) of P-polarized light from green display element 22b is therefore transmitted through second dichroic mirror 24b without alteration. The image light (green) of P-polarized light that is transmitted by both dichroic mirrors 24a and 24b is exited from the exit surface of color synthesis optical element 21 without alteration.

Light source 20c is made up by blue LED module 80 shown in FIG. 32c, and the light emitted from this blue LED module 80 has the emission spectrum of blue and green LEDs such as shown in FIG. 6B. The light (green+blue) from light source 20c is irradiated to blue display element 22c.

Light (green+blue) from light source 20c, after having undergone intensity modulation according to an image (for blue) that is based on the input video signal in blue display element 22c, is entered to color synthesis optical element 21 as image light of S-polarized light from blue display element 22c.

Second dichroic mirror 24b has reflection characteristics with respect to S-polarized light such as shown in FIG. 7B and image light (green +blue) of S-polarized light from blue display element 22c is therefore transmitted through second dichroic mirror 24b. First dichroic mirror 24a has reflection characteristics with respect to S-polarized light such as shown in FIG. 6B, and image light (green +blue) of S-polarized light from blue display element 22c is therefore reflected such that its optical path is bent 90 degrees by first dichroic mirror 24a. The image light (green +blue) of S-polarized light that was reflected at first dichroic mirror 24a is exited from the exit surface of color synthesis optical element 21.

The light emitted from light source 20a and irradiated to red display element 22a has an angular spread in the order of ±15 degrees. Similarly, light that is emitted from light source 20b and irradiated to green display element 22b and light that is emitted from light source 20c and irradiated to blue display element 22c have an angular spread in the order of ±15 degrees. According to the present exemplary embodiment, the cutoff wavelengths of first dichroic mirror 24a and second dichroic mirror 24b with respect to green P-polarized light are sufficiently separated. Accordingly, green P-polarized light is not reflected by these dichroic mirrors 24a and 24b despite shifts in cutoff wavelengths due to incident angle dependency. As a result, light loss does not occur due to incident angle dependency.

Similarly, the cutoff wavelengths of first dichroic mirror 24a and second dichroic mirror 24b with respect to blue and green S-polarized light and red S-polarized light are sufficiently separated. Accordingly, blue, green, and red S-polarized light can be synthesized by these dichroic mirrors 24a and 24b with virtually no light loss despite shifts of cutoff wavelengths due to incident angle dependency.

As described hereinabove, color synthesis optical element 21 synthesizes light of red display element 22a, green display element 22b and blue display element 22c that is entered from three directions to a single luminous flux. The light that is synthesized by color synthesis optical element 21 is entered to projection lens 23. The image (picture), that is displayed on these red display element 22a, green display element 22b, and blue display element 22c, is projected onto a screen (not shown) by means of projection lens 23.

The effect of the projection-type display device of the present exemplary embodiment is next described.

As an example, the light-emitting unit of the blue LED module is made up of four blue LED chips, the light-emitting unit of the green LED module is made up of four green LED chips, and the light-emitting unit of the red LED module is made up of four red LED chips. When the luminous flux from these blue, green, and red LED modules is synthesized, the entire synthesized light beam is of 6352 lm (=(455+1000+133)×4).

However, the chromaticity of the above-described white color that was synthesized is (0.299, 0.271) and therefore diverges markedly in the direction of blue-violet from white chromaticity (0.313, 0.329) of standard illuminant D65. This divergence occurs because the optical output of green LED with respect to the light quantity ratio for obtaining good white color is relatively weak and the optical output of blue LED is relatively strong.

To obtain white balance, the emitted luminous flux of green must be increased. If within the rated range, the emitted luminous flux can be increased by increasing the amount of current that flows to the LED. However, increasing the amount of current in a state in which the emitted luminous flux from a green LED is 1000 lm will result in driving the LED at a level that exceeds the rating, and in this case, the luminous flux cannot be expected to increase in line with the increase in the amount of current. In addition, driving an LED in excess of the rating not only shortens the life expectancy of the LED but may also destroy the LED.

Based on the foregoing, the emitted luminous flux of the blue LED chip is controlled to from 133 lm to 80 lm and the emitted luminous flux of the red LED chip is controlled to from 455 lm to 364 lm in accordance with the emitted luminous flux of the green LED chip. In this case, the entire luminous flux is 5776 lm and the brightness is decreased by 9%.

In the projection-type display device of the present exemplary embodiment, in contrast, blue LED module 80 is made up of three LED chips 81*a*-81*c* that emit blue light and a single LED chip 81*d* that emits green light, as shown in FIG. 32C. In other words, compared to the above-described blue LED module that is made up of four blue LED chips, in this blue LED module 80, the number of blue LED chips is reduced by one and an LED chip that emits green light is arranged in its place.

In addition, in the projection-type display device of the present exemplary embodiment, red LED module 60 is made up of four LED chips 61*a*-61*d* that emit red light as shown in FIG. 32A, and green LED module 70 is made up of four LED chips 71*a*-71*d* that emit green light as shown in FIG. 32B. Accordingly, the number of green LED chips is the four LED chips 71*a*-71*d* that are provided in green LED module 70 and the single LED chip 81*d* that is used in blue LED module 80 for a total of five. In addition, the number of blue LED chips is three, and the number of red LED chips is four. When these red, green, and blue LEDs are all driven at rating, the white chromaticity obtained is the white chromaticity (0.313, 0.329) of standard illuminant D65. In addition, the total luminous flux is 7219 lm, enabling a 25% improvement over the 5776 lm described above.

The chromaticity of colored light that is emitted from light source 20*c* that is provided with the blue LED module shown in FIG. 32C is given as xy chromaticity coordinates (0.148, 0.139). This value indicates a shift toward a slightly brighter blue from the primary color blue. However, in a bright viewing environment, the effect of this shift in chromaticity does not raise concerns. In addition, at the time of video processing, color correction can reduce the effect of change in the chromaticity of intermediate colors.

As described hereinabove, according to the present exemplary embodiment, a projection-type display device is obtained that can display a bright projected image by using a color synthesis optical element that can bring about display of the optical output performance of LEDs at a maximum and obtain white light having superior white balance and further, having high optical utilization efficiency when mixing colors.

In the present exemplary embodiment, a cross dichroic prism shown in the first exemplary embodiment was used as the color synthesis optical element, but when the optical output characteristic of red LEDs surpasses that of blue LEDs, the cross dichroic prism shown in the second exemplary embodiment may also be used. In this case, four LED chips that emit green light are mounted on the green LED module, four LED chips that emit blue light are mounted on the blue LED module, and three LED chips that emit red light and one LED chip that emits green light are mounted on a red LED module.

As other examples, the number of green LEDs may be decreased and the red or blue LEDs may be added to the green LED module.

The blue LED module shown in FIG. 32C was assumed to have three blue LED chips 81*a*-81*c* and one green LED chip 81 d mounted on a substrate, but the module is not limited to this configuration. Four green LED of one-quarter the chip area may be used and these may be arranged in symmetrical form, for example, in the four corners of the light-emitting unit, whereby the color mixing of the emitted light is improved.

All of the LED modules of each color shown in FIGS. 32A-32C have four LED chips mounted on a substrate, but the modules are not limited to this form. The LED chip that is mounted in an LED module that emits light of a single color may be a single LED chip having four times the area. The number of LED chips that are mounted in an LED module that emits light of two colors may be two or more. The important point is not the number of LED chips, but rather, the chip area. The chip area of LED chips that are mounted in an LED module is preferably set in combination with the color-mixing ratio. Using LED chips having small area enables setting of the chip area at a more precise color-mixing ratio.

Of course, if the optical output characteristic of a blue LED is higher, two blue LED chips in the blue LED module shown in FIG. 32C may be replaced by two green LED chips. An LED module is therefore preferably designed as appropriate according to the optical output characteristic of the LEDs that are used.

Alternatively, rather than mounting a plurality of LED chips on a single substrate, a plurality of components each having one LED chip mounted may be used and synthesis realized using an optical means such as a light guide plate.

Still further, to increase the absolute quantity of light, means may be used in combination that use a hologram or dichroic mirror of the background art to synthesize light of a plurality of colors having different peak wavelengths.

In the interest of simplifying the foregoing explanation, the display elements of each color, the color synthesis optical element, and the projection lens are assumed to be components that do not generate loss that depends on wavelength, and ratios of the quantity of light of luminous flux emitted from each light source were used. In actuality, there are also constituent parts in which the transmission characteristics vary due to color, and when displaying an all-white screen, the area ratios of LED chips are preferably set by the light-quantity ratios of luminous flux of each color exited from the projection lens.

Sixth Exemplary Embodiment

Figure 33:
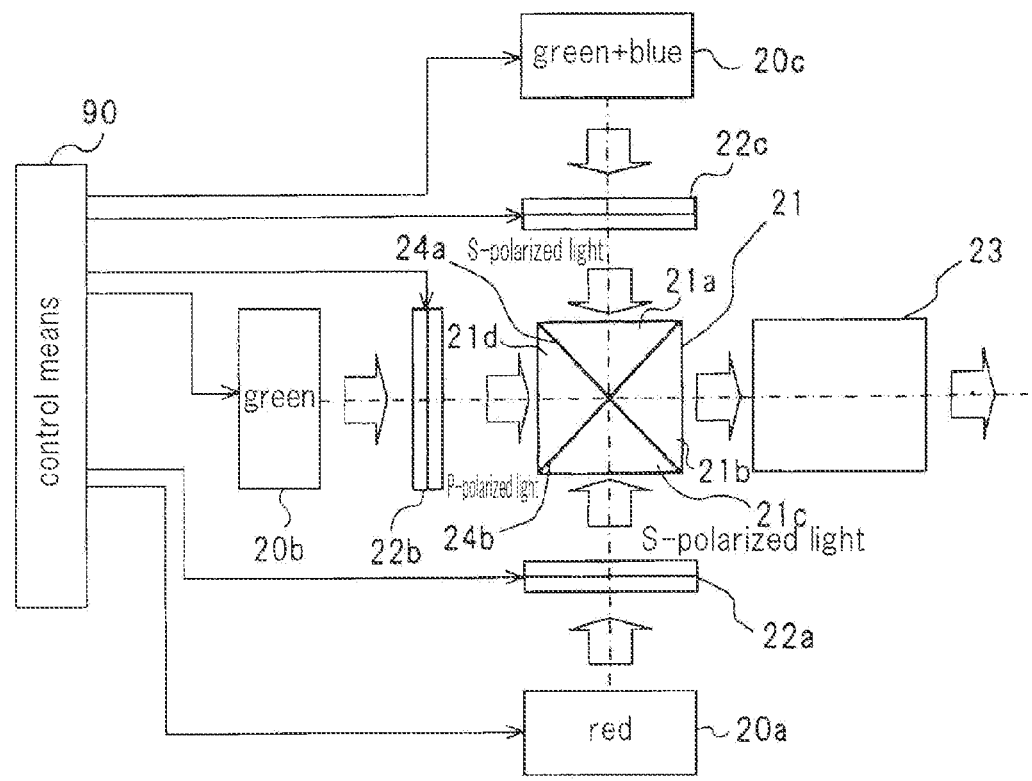
FIG. 33 is a block diagram showing the configuration of the projection-type display device that is the sixth exemplary embodiment of the present invention.

FIG. 33 is a block diagram showing the configuration of the projection-type display device that is the sixth exemplary embodiment of the present invention. The projection-type display device of the present exemplary embodiment is of a configuration in which control means 90 is added to the projection-type display device of the fifth exemplary embodiment. The constituent elements relating to the optics are entirely the same as the fifth exemplary embodiment.

The projection-type display device of the present exemplary embodiment is able to switch between a first display mode that implements color image display that prioritizes color reproducibility and a second display mode that implements color image display that prioritizes brightness. Control means 90 executes color image display according to the set display mode of the first and second display modes.

In the first display mode (color image display that prioritizes color reproducibility), control means 90 causes lighting of LED chips 81*a*-81*c* among LED chips 81*a*-81*c* (blue LED chips) and LED chip 81*d* (green LED chip) that are mounted in blue LED module 80 but does not cause lighting of LED chip 81*d*. Control means 90 causes lighting of LED chips 71*a*-71*d* that are mounted in green LED module 70 and LED chips 61*a*-61*d* that are mounted in red LED module 60 and obtains white balance by controlling the optical output of each of LED chips 81*a*-81*c* that are mounted in blue LED module 80 and LED chips 61*a*-61*d* that are mounted in red LED module 60 in accordance with the emitted luminous flux of LED chips 71*a*-71*c* that are mounted in green LED module 70. In this state, control means 90 implements picture display that uses the emitted luminous flux from the LED modules of each color.

The chromaticity and luminous flux of each of red green and blue in the first display mode are, for example, the following values. The chromaticity of red is (0.700, 0.300), and the emitted luminous flux from red LED module 60 is 1456 lm for all of LED chips 61*a*-61*d* that are mounted in the module. The chromaticity of green is (0.195, 0.700), and the emitted luminous flux from green LED module 70 is 4000 lm for all of LED chips 71*a*-71*d* that are mounted in the module. The chromaticity of blue is (0.140, 0.046), and the emitted luminous flux from blue LED module 80 is 320 lm for all of LED chips 81*a*-81*c* that are mounted in the module. When white is displayed under these conditions, a chromaticity of (0.313, 0.329) is obtained, and the total luminous flux from the LED modules of each color is 5776 lm. Thus, according to the first display mode, the color of the three primary colors is superior, but the brightness is low.

In the second display mode (color image display that prioritizes brightness), in contrast, control means 90 brings about lighting of all LED chips 81*a*-81*c* (blue LED chips) and LED chip 81*d* (green LED chip) that are mounted in blue LED module 80, LED chips 71*a*-71*d* that are mounted in green LED module 70, and LED chips 61*a*-61*d* that are mounted in red LED module 60. In addition, control means 90 implements control in accordance with all green luminous flux that includes the emitted luminous flux from each of LED chips 71*a*-71*d* mounted in green LED module 70 and the emitted luminous flux from LED chip 81*d* mounted in blue LED module 80 such that the optical output of each of LED chips 81*a*-81*c* mounted in blue LED module 80 and each of LED chips 61*a*-61*d* mounted in red LED module 60 is the maximum output that can obtain white balance. In this state, control means 90 implements image display that uses the emitted luminous flux from the LED modules of each color.

The chromaticity and luminous flux of each of red, green, and blue in the second display mode are, for example, the following values. The chromaticity of red is (0.700, 0.300), and the emitted luminous flux from red LED module 60 is a total of 1820 lm from all of LED chips 61*a*-61*d* that are mounted in the module. The chromaticity of green is (0.195, 0.700), and the emitted luminous flux from green LED module 70 is a total of 4000 lm by all LED chips 71*a*-71*d* that are mounted on the module. The chromaticity of blue is (0.148, 0.139), and the emitted luminous flux from blue LED module 80 is 1399 lm obtained by adding 399 lm obtained from all of LED chips 81*a*-81*c* that are mounted on the module and 1000 lm obtained by LED chip 81*d* that is mounted on the module. When white is displayed under these conditions, a chromaticity of (0.313, 0.329) is obtained and the total luminous flux from the LED modules of each color is 7219 lm. The blue primary color obtained in the second display mode is therefore somewhat degraded, but a bright image is obtained.

The actual configuration of control means 90 is next described.

Figure 34:
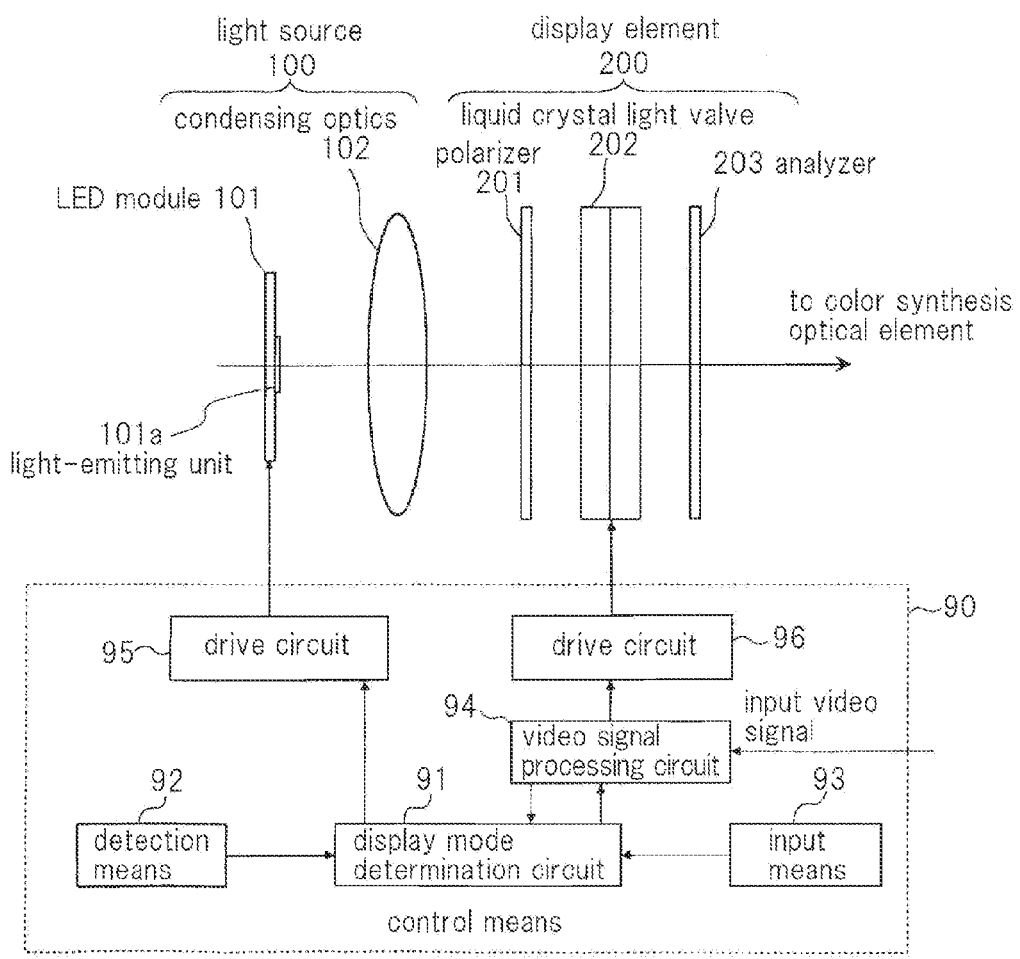
FIG. 34 is a block diagram showing the configuration of the control means of the projection-type display device shown in FIG. 33.

FIG. 34 is a block diagram showing the configuration of control means 90. In FIG. 34, for the sake of convenience, light source 100 and display element 200 are shown in addition to control means 90. Light source 100 is a component used as light sources 20*a*-20*c* that were shown in FIG. 33, and display element 200 is a component that was used as display elements 22*a*-22*c* shown in FIG. 33.

Light source 100 includes LED module 101 and light-condensing optics 102. The light from light-emitting unit 101*a* of LED module 101 is condensed in light-condensing optics 102 and display element 200 is then illuminated by this condensed luminous flux. The configuration of this light source 100 is similar to the light source shown in FIG. 31.

Display element 200 includes liquid crystal light valve 202, polarizer 201 provided on the incident surface side (light source side) of liquid crystal light valve 202, and analyzer 203 provided on the exit surface side (color synthesis optical element side) of liquid crystal light valve 202. The configuration of this display element 200 is similar to that of the display element shown in FIG. 30.

Control means 90 includes display mode determination circuit 91, detection means 92, input means 93, video signal processing circuit 94, and drive circuits 95 and 96.

An input video signal is supplied to video signal processing circuit 94. Video signal processing circuit 94 implements video signal processing such as brightness correction and color correction. The signal that has undergone video signal processing is supplied to drive circuit 96 from video signal processing circuit 94.

Drive circuit 96 subjects the signal from video signal processing circuit 94 to processing such as D/A conversion and polarity conversion for driving liquid crystal light valve 202 and supplies a drive signal to TFT provided in each pixel.

Display mode determination circuit 91 carries out a display mode determination process based on signals from detection means 92, input means 93, and video signal processing circuit 94. Drive circuit 95 drives LED module 101 in accordance with the display mode that was determined in display mode determination circuit 91.

There are three determination processes in the display mode determination process realized by display mode determination circuit 91: a display mode determination process that is based on manual input, an installation environment-adaptive display mode determination process, and an image content-adaptive display mode determination process.

(1) Manual Input

Input means 93 includes a plurality of operation buttons. In the projection-type display device of the present exemplary embodiment, mode selection screen information for selecting display modes is stored in a memory device (not shown), and after the power supply is turned on or when a predetermined operation button is pressed in input means 93, control means 90 carries out display control for projecting onto the screen a screen that is based on mode selection screen information that is stored in the memory device. Through input means 93, the operator is able to select the first or the second display mode on the mode selection screen that is projected on the screen.

When the input operation is carried out for selecting the display mode in input means 93, a mode selection signal that accords with the input operation is supplied to display mode determination circuit 91 from input means 93. Display mode determination circuit 91 determines the display mode from among the first and second display modes based on the mode selection signal from input means 93.

(2) Installation Environment-Adaptive Type

Detection means 92 includes either a first sensor (optical sensor) that detects the brightness of the room or a second sensor that detects the brightness of a white raster pattern or black raster pattern that is displayed on the screen or the brightness of both screens.

Display mode determination circuit 91 compares the detected value of the first sensor with a reference value. If the detected value of the first sensor is smaller than the reference value, display mode determination circuit 91 judges that the room is dark and determines the first display mode in which color image display is carried out that prioritizes color reproducibility. If the detected value of the first sensor is equal to or greater than the reference value, display mode determination circuit 91 judges that the room is bright and determines the second display mode in which color image display is carried out that prioritizes brightness.

Alternatively, display mode determination circuit 91 judges brightness of the projected screen based on the detected value of the second sensor. More specifically, display mode determination circuit 91 compares the detected value of the second sensor (brightness of a white raster pattern or black raster pattern) with a reference value.

In the first display mode in which color image display is carried out that prioritizes color reproducibility, a white raster pattern and a black raster pattern are displayed on the screen. When the value detected in measuring the brightness of a black raster pattern by the second sensor is smaller than the reference value, the room is judged to be dark and the first display mode is determined in which color image display is carried out that prioritizes color reproducibility. When the value detected in measuring the brightness of the black raster pattern is greater than the reference value, the room is bright, and in this case, the value detected in measuring the white raster pattern is also referred to. When the degree of enlargement of the projected image is small, the projected screen is brighter. In other words, if the difference or the ratio between the value detected when measuring the brightness of the white raster pattern and the value detected in measuring the brightness of the black raster pattern is greater than a reference value, the projected screen is judged to be sufficiently bright, and the first display mode, in which color image display is carried out that prioritizes color reproducibility, is determined. However, if the difference, or the ratio between the value detected in measuring the brightness of the white raster pattern and the value detected when measuring the brightness of the black raster pattern is smaller than the reference value, the projected screen is judged to be dark and the second display mode is determined in which color image display is carried out that prioritizes brightness.

Typically, when the degree of enlargement on a screen is great in a projection-type display device, the projected screen becomes darker, and conversely, when the degree of enlargement is small, the projected screen becomes brighter. Accordingly, the display mode may be determined based on the degree of enlargement. More specifically, means is provided for detecting the degree of enlargement (zoom magnification) of the projection lens, and display mode determination circuit 91 compares the degree of enlargement that was detected with a reference value. When the degree of enlargement is greater than the reference value, display mode determination circuit 91 judges that the projected screen is dark and determines the second display mode in which color image display is carried out that prioritizes brightness. When the degree of enlargement is equal to or less than the reference value, display mode determination circuit 91 judges that the projected screen is bright and determines the first display mode in which color image display is carried out that prioritizes color reproducibility.

Although the brightness of a black raster pattern is equivalent to the brightness of the room, there are cases in which the room is dark only in the vicinity of the screen, and it is therefore preferable to determine the display mode by the brightness of the screen surface.

In addition, means for detecting the zoom magnification and focus point (i.e., the projection distance) of the projection lens may be provided, and display mode determination circuit 91 may then estimate the projected screen size based on these detection results and use this estimated value to identify the brightness of the screen.

(3) Image Content-Adaptive Type Alternatively, video signal processing circuit 94 takes a histogram of image data from the input video signal, and based on this histogram, judges whether dark screens are frequent or bright screens are frequent, and then supplies the judgment result to display mode determination circuit 91. The judgment of whether the screen is dark or bright is carried out, for example, as next described. The judgment of whether a screen is dark or bright is carried out by dividing a histogram between portions that are lower than a reference luminance level and portions that are higher than the reference luminance level based on a reference luminance level (for example, a luminance level between a maximum luminance level and a minimum luminance brightness level) of the horizontal axis (luminance level) of the histogram and then by examining which portions are more numerous.

Upon receiving a signal from video signal processing circuit 94 indicating that dark screens are more numerous, display mode determination circuit 91 judges that the screen is a screen in which full color pictures are requested such as a movie and determines the first display mode in which color image display is carried out that prioritizes color reproducibility. Alternatively, upon receiving from video signal processing circuit 94 a signal indicating that bright screens are numerous, display mode determination circuit 91 judges that the screen is a presentation screen in a conference and therefore determines the second display mode in which color image display is carried out that prioritizes brightness.

Alternatively, video signal processing circuit 94 may judge whether the input video signal is a moving picture or a still picture and then supply the judgment result to display mode determination circuit 91. In this case, upon receiving a judgment result (signal) from video signal processing circuit 94 indicating that the input video signal is a moving picture, display mode determination circuit 91 determines the first display mode in which color image display is carried out that prioritizes color reproducibility. Upon receiving a judgment result (signal) from video signal processing circuit 94 indicating that the input video signal is a still picture, display mode determination circuit 91 determines the second display mode in which color image display is carried out that prioritizes brightness.

Alternatively, video signal processing circuit 94 examines whether an image that is based on the input video signal is an image having a preponderance of a specific primary color (for example, blue) among the primary colors red, green and blue and supplies the result to display mode determination circuit 91. The judgment of whether or not the image contains a preponderance of a specific color from among of the primary colors (for example, the primary color blue) can be realized by comparing a histogram of the specific color with the histograms of other colors. More specifically, video signal processing circuit 94 extracts histograms of image data from the input video signal for each of red, green and blue, and judges that the image based on the image data contains a preponderance of a specific color when the luminance level of the histogram of the specific color is higher than the luminance level of the histograms of the other colors.

Upon receiving a signal from video signal processing circuit 94 indicating that the image contains a preponderance of a specific primary color (for example, the primary color blue), display mode determination circuit 91 determines the first display mode in which color image display is carried out that prioritizes color reproducibility. Upon receiving a signal from video signal processing circuit 94 indicating that the image does not contain a preponderance of a specific primary color (for example, the primary color blue), display mode determination circuit 91 determines the second display mode in which color image display is carried out that prioritizes brightness.

The above-described judgment of screens based on the histograms (the judgment of screen brightness or primary colors) is carried out when a displayed scene changes, i.e., when the histogram of image data undergoes a major change.

The above-described method of determining a display mode is an example and can be set as appropriate.

When the display mode has been determined, display mode determination circuit 91 sends a control signal that is based on the display mode that was determined to drive circuit 95 and video signal processing circuit 94. Drive circuit 95 changes the current value that drives LED module 101 in accordance with the control signal from display mode determination circuit 91. At the same time, video signal processing circuit 94 changes video processing such as color correction processing in accordance with the control signal from display mode determination circuit 91.

In the configuration shown in FIG. 34, three each of light source 100, display element 200, and drive circuits 95 and 96 are provided for each of the colors red, green, and blue. In this case, display mode determination circuit 91 supplies a control signal based on the display mode that was determined to drive circuits 95 of each color. Video signal processing circuit 94 changes the image processing such as color correction processing in accordance with the control signal from display mode determination circuit 91 and supplies a drive signal in accordance with the image processing after the change to drive circuits 96 of each color.

In the foregoing explanation, the display modes were two modes: color image display that prioritizes color reproducibility and color image display that prioritizes brightness, but a plurality of middle modes between these two modes may also be provided.

The present invention as realized by each of the above-described exemplary embodiments exhibits the following actions and effects. The actions and effects of the present invention together with the problems of the technology in the previously described Patent Documents 1-11 are next described.

In the display device described in Patent Document 1 that enables switching between a color image display mode that prioritizes color reproducibility and a color image display mode that prioritizes brightness, the use of a solid-state light source such as an LED as the light source rather than a white light source of a discharge lamp such as a high-pressure mercury lamp gives rise to the problems described below.

There are two types of white LED light source that emits white light: a type in which a fluorescent material that emits yellow light is excited by blue light to obtain white light by blue and yellow light, and a type in which a fluorescent material that emits red, green, and blue light is excited by ultraviolet to obtain white light.

When a white light source of the former type is used, the quantity of green and red light is relatively small compared to blue or yellow, and the projected image is therefore extremely dark at the time of the color image display mode that prioritizes color reproducibility.

When a white light source of the latter type is used, the amount of yellow light is low, and the effect of improving brightness therefore cannot be obtained in the mode that prioritizes brightness.

Still further, the necessity to move the color selection element mechanically leads to an increase in the constituent parts, resulting not only in a complex construction but also in an increase in costs.

When an auxiliary illumination light is used to compensate brightness, as in Patent Document 2 and Patent Document 3, the basic light that is replaced is not used, and in addition, light is lost during the replacement whereby the light utilization efficiency is not necessarily improved.

When, instead of a white LED light source, three types of LED light sources are used that emit light of the three primary colors red, green and blue, respectively, superior color reproducibility is obtained in the mode that prioritizes color reproducibility, but in the mode that prioritizes brightness, an LED that emits yellow light that should be added must be separately disposed.

In addition, as shown in Patent Documents 5-8, in a case in which light of four colors or six colors within the band of white light are synthesized, because light other than parallel luminous flux is emitted when similarly attempting to obtain luminous flux, the efficiency of light synthesis falls due to incident angle dependency or polarization dependency. Still further, when there are differences in the ratios at which the plurality of colors is synthesized due to angular components, color irregularities will appear in the projected screen.

In particular, when light from LEDs of two colors is supplied from the same direction as in Patent Document 5 or Patent Documents 7 and 8, the colored light will not mix in a state of parallel luminous flux and an angular spread must be given to bring about uniform mixing of each of the colors. On the other hand, when angular spread is given, light loss occurs when mixing colors of light that is irradiated from other directions due to the incident angle dependency of the dichroic mirrors. Thus, there is the tradeoff that while angular spread must be given in order to mix each of the colors uniformly, the giving of angular spread gives rise to light loss due to incident angle dependency.

The color synthesis optical element according to one aspect of the present invention includes:
an exit surface;
first to third incident surfaces; and
first and second films that selectively reflect or transmit incident light according to wavelength and that are provided such that the film surfaces intersect;
wherein:
the first film transmits at least light of a specific wavelength band among visible light of a first polarization and reflects at least light of the specific wavelength band of visible light of a second polarization whose polarized state differs from that of the first polarization;
the second film transmits at least light of the specific wavelength band of visible light of the first polarization and transmits at least light of the specific wavelength band of visible light of the second polarization;

the cutoff wavelengths with respect to the second polarization of the first and second films are set within band ranges other than the wavelength bands of red, green and blue that are the three primary colors of light; and light of the specific wavelength band of the first polarization and light of the specific wavelength of the second polarization are entered from different incident surfaces of the first to third incident surfaces and exited by way of the first and second films from the exit surface.

According to the above-described configuration, a construction can be provided in which the cutoff wavelengths with respect to green P-polarized light of the first film (for example, a dichroic mirror) and second film (for example, a dichroic mirror) are sufficiently separated. Accordingly, green P-polarized light is not reflected by the films despite shift of the cutoff wavelength due to incident angle dependency, and light loss due to incident angle dependency therefore does not occur.

In addition, a construction can be provided in which, for example, the cutoff wavelengths with respect to green S-polarized light and red S-polarized light of the first film and second film are sufficiently separated. Accordingly, red and green S-polarized light can be synthesized in these films with virtually no light loss even if shifting should occur in the cutoff wavelengths due to incident angle dependency.

Accordingly, efficient colored light synthesis can be realized even for light that is irradiated at angles that differ from parallel light.

Typically, when semiconductor light sources such as LEDs are used as the light sources of each of red, green and blue and the red, green, and blue light from each semiconductor light source is synthesized to obtain white light having superior white balance, regarding the color mixing ratios of the red, green and blue light, the optical output of blue light is greater than that for the other colors and the optical output of green light is smaller than that for the other colors. In such cases, the optical output of the blue and red semiconductor light sources is limited to match that of the green semiconductor light source for which the optical output is relatively low, whereby the optical output of the white light that is obtained is reduced.

According to the color synthesis optical element of the present invention, green light can be synthesized from two different directions. Moreover, a configuration is adopted that decreases the quantity of blue light for which the optical output is relatively large and that adds green light. Accordingly, the three primary colors can be synthesized at optimum color mixing ratios and white light having superior white balance can be obtained. In addition, the optical output of the LEDs of three colors can be operated at a maximum without limitation.

Thus, according to the present invention, not only can the optical output performance of LEDs be displayed at their maximum and the light utilization efficiency raised during color mixing, but white light having superior white balance can also be obtained.

In addition, the use of the color synthesis optical element of the present invention enables the provision of a projection-type display device in which a bright projected image is obtained.

Still further, the use of the color synthesis optical element of the present invention enables the provision of a projection-type display device of enhanced usefulness that allows switching between a color image display that prioritizes color reproducibility and a color image display that prioritizes brightness.

The color synthesis optical element and the projection-type display device that uses the optical element of each of the above-described exemplary embodiments are only examples of the present invention, and the construction and operation are open to various modifications that do not depart from the scope of the present invention that will be clear to anyone of ordinary skill in the art.

For example, the color synthesis optical element of the third and fourth exemplary embodiments may be applied to the projection-type display device of the fifth or sixth exemplary embodiments.

In the first to sixth exemplary embodiments, the relation of P-polarized light and S-polarized light may be taken as the opposite relation (taking the description of P-polarized light as the description of S-polarized light and taking the description of S-polarized light as the description of P-polarized light).

The first dichroic mirror and the second dichroic mirror are not limited to dielectric multilayer films and may also be optical films having wavelength selectivity or polarization selectivity such as holograms.

In addition, the angle of intersection between the first dichroic mirror and the second dichroic mirror is not limited to 90 degrees. Still further, the first and second dichroic mirrors, rather than being in the form of a prism, may be realized by forming films on glass in plate form.

In the first to sixth exemplary embodiments, another solid-state light source such as a semiconductor laser may be used in place of an LED.

Still further, in the first to sixth exemplary embodiments, the display elements may be display elements that use a device other than a liquid crystal light valve, such as a digital mirror device.

The color synthesis optical element of the first to fourth exemplary embodiments can be applied not only to a three-panel projector such as in the fifth and sixth exemplary embodiments, but can also be applied to a single-panel projector.

This application claims the benefits of priority based on Japanese Patent Application No. 2009-222355 for which application was submitted on Sep. 28, 2009 and incorporates by citation all of the disclosures of that application.

The invention claimed is:

1. A color synthesis optical element comprising:
an exit surface;
first to third incident surfaces; and
first and second films that are provided such that the film surfaces intersect each other and that selectively reflect or transmit incident light according to wavelength of said incident light;
wherein:
said first film transmits, of visible light of a first polarization, at least light of a specific wavelength band and reflects, of visible light of a second polarization whose polarization state differs from that of said first polarization, at least light of said specific wavelength band;
said second film transmits, of visible light of said first polarization, at least light of said specific wavelength band and transmits, of visible light of said second polarization, at least light of said specific wavelength band;
cutoff wavelengths of said first and second films with respect to said second polarization are set within a range of bands other than the wavelength bands of red, green and blue that are the three primary colors of light; and light of said specific wavelength band of said first polarization and light of said specific wavelength of said second polarization are entered from different incident surfaces of said first to third incident surfaces and are exited by way of said first and second films from said exit surface.

2. The color synthesis optical element as set forth in claim 1, wherein at least colored light of said second polarization that is entered from said first incident surface, colored light of said first polarization that is entered from said second incident surface, and colored light of said second polarization that is entered from said third incident surface are exited from said exit surface.

3. The color synthesis optical element as set forth in claim 1, wherein said specific wavelength band is the wavelength band of green.

4. The color synthesis optical element as set forth in claim 1, wherein:
cutoff wavelengths of said first and second films with respect to said second polarization are set to within a range of the wavelength band of yellow; and
red light of said second polarization having a peak wavelength in said red wavelength band that is entered from said first incident surface, green light of said first polarization having a peak wavelength in said green wavelength band that is entered from said second incident surface, and green light of said second polarization having a peak wavelength within said green wavelength band and blue light of said second polarization having a peak wavelength in said blue wavelength band that are entered from said third incident surface are exited from said exit surface.

5. The color synthesis optical element as set forth in claim 1, wherein:
cutoff wavelengths of said first and second films with respect to said second polarization are set to within the wavelength band of yellow; and
red light of said second polarization having a peak wavelength in said red wavelength band that is entered from said first incident surface, green light of said first polarization having a peak wavelength in said green wavelength band and light of said first polarization having a peak wavelength outside said green wavelength band that are entered from said second incident surface, and green light of said second polarization having a peak wavelength in said green wavelength band and blue light of said second polarization having a peak wavelength in said blue wavelength band that are entered from said third incident surface are exited from said exit surface.

6. The color synthesis optical element as set forth in claim 4, wherein said yellow wavelength band is at least 560 nm and no greater than 600 nm.

7. The color synthesis optical element as set forth in claim 1, wherein:
the cutoff wavelengths of said first and second films with respect to said second polarization are set within the blue-green wavelength band; and
green light of said second polarization having a peak wavelength in said green wavelength band and red light of said second polarization having a peak wavelength in said red wavelength band that are entered from said first incident surface, green light of said first polarization having a peak wavelength in said green wavelength band that is entered from said second incident surface, and blue light of said second polarization having a peak wavelength in said blue wavelength band that is entered from said third incident surface are exited from said exit surface.

8. The color synthesis optical element as set forth in claim 1, wherein:
the cutoff wavelengths of said first and second films with respect to said second polarization are set within the range of the blue-green wavelength band; and
green light of said second polarization having a peak wavelength in said green wavelength band and red light of said second polarization having a peak wavelength in said red wavelength band that are entered from said first incident surface, green light of said first polarization having a peak wavelength in said green wavelength band and light of said first polarization having a peak wavelength other than said green wavelength band that are entered from said second incident surface, and blue light of said second polarization having a peak wavelength in said blue wavelength band that is entered from said third incident surface are exited from said exit surface.

9. The color synthesis optical element as set forth in claim 7, wherein said blue-green wavelength band is at least 480 nm but no greater than 500 nm.

10. The color synthesis optical element as set forth in claim 1, wherein:
the cutoff wavelength of said first film with respect to said second polarization includes first and second cutoff wavelengths, the first cutoff wavelength being set within the range of the yellow wavelength band and the second cutoff wavelength being set within the blue-green wavelength band;
the cutoff wavelength of said second film with respect to said second polarization is set within said yellow wavelength band; and
red light of said second polarization having a peak wavelength within said red wavelength band that is entered from said first incident surface, at least blue light of said first polarization having a peak wavelength in said blue wavelength band and green light of said first polarization having a peak wavelength in said green wavelength band that are entered from said second incident surface, and green light of said second polarization having a peak wavelength in said green wavelength band that is entered from said third incident surface are exited from said exit surface.

11. The color synthesis optical element as set forth in claim 10, wherein said yellow wavelength band is at least 560 nm and no greater than 600 nm, and said blue-green wavelength band is at least 480 nm and no greater than 500 nm.

12. The color synthesis optical element as set forth in claim 1, wherein:
the cutoff wavelengths of said first film with respect to said second polarization includes first and second cutoff wavelengths, the first cutoff wavelength being set to a wavelength of the yellow wavelength band and the second cutoff wavelength being set to a wavelength of the blue-green wavelength band;
the cutoff wavelength of said second film with respect to said second polarization is set to a wavelength of said blue-green wavelength band; and
blue light of said second polarization having a peak wavelength in said blue wavelength band that is entered from said first incident surface, at least green light of said first polarization having a peak wavelength in said green wavelength band and red light of said first polarization having a peak wavelength in said red wavelength band that are entered from said second incident surface, and green light of said second polarization having a peak wavelength in said green wavelength band that is entered from said third incident surface are exited from said exit surface.

13. The color synthesis optical element as set forth in claim 12, wherein said yellow wavelength band is at least 560 nm and no greater than 600 nm, and said blue-green wavelength band is at least 480 nm and no greater than 500 nm.

14. The color synthesis optical element as set forth in claim 1, further comprising four right angle prisms whose surfaces that form right angles are joined together, wherein said first and second films are formed on the joined surfaces of these right angle prisms.

15. A projection-type display device comprising:
first to third light sources;
first to third display elements that have a one-to-one correspondence with said first to third light sources and to each of which colored light is entered from a corresponding light source;
a color synthesis optical element as set forth in claim 1 in which colored light of a first polarization that is entered to said second incident surface from said second display element and colored light of a second polarization whose polarization state differs from that of said first polarization that is entered into said first and third incident surfaces from said first and third display elements, respectively, are exited from said exit surface; and
projection optics that are provided in the direction of progression of light that is exited from said color synthesis optical element and that project an image that is displayed by said first to third display elements;
wherein:
said first light source includes a solid-state light source of a first color;
said second light source includes a solid-state light source of a second color that differs from said first color;
said third light source includes a solid-state light source of a third color that differs from said first and second colors; and
any one of said first to third light sources further includes a solid-state light source of at least one specific color having a peak wavelength in a wavelength band that corresponds to the color of the solid-state light source that is used for one of the other two light sources.

16. The projection-type display device as set forth in claim 15, wherein one of said remaining two light sources further includes at least one solid-state light source having a peak wavelength in a wavelength band that corresponds to the color of the solid-state light source that is used in the other light source.

17. The projection-type display device as set forth in claim 15, wherein:
said first to third colors are the three primary colors of light; and
the solid-state light source of said specific color and a solid-state light source that corresponds to said specific color that is used in one of said two remaining light sources are solid-state light sources of green having a peak wavelength in the green wavelength band.

18. The projection-type display device as set forth in claim 15, further comprising a control unit that is capable of switching between a first display mode that carries out a display that prioritizes color reproducibility and a second display mode that carries out a display that prioritizes brightness and that controls each solid-state light source of said first to third light sources according to the display mode that is set; wherein:
when said first display mode is set, said control unit controls, in accordance with the emitted luminous flux of, among said first to third light sources, the light source for which optical output is smallest, the optical output of the remaining two light sources in a state in which the solid-state light source of said specific color is not lighted; and
when said second display mode is set, said control unit causes all solid-state light sources of said first to third light sources to be lighted, and controls, in accordance with the luminous flux obtained by adding together the emitted luminous flux from the solid-state light source of said specific color and the emitted luminous flux from the solid-state light source that corresponds to said specific color that is used in one of said two remaining light sources, the optical output of the solid-state light sources other than the solid-state light source that corresponds to said specific color that is used in one of said two remaining light sources, from among said first to third light sources.

19. The projection-type display device as set forth in claim 18, wherein said control unit comprises:
an input unit that selects a display mode from among said first and second display modes;
first to third drive circuits that drive said first to third light sources; and
a display mode determination circuit that controls said first to third drive circuits in accordance with the display mode that was selected in said input unit.

20. The projection-type display device as set forth in claim 18, wherein said control unit comprises:
first to third drive circuits that drive said first to third light sources;
an optical sensor; and
a display mode determination circuit that: compares the output value of said optical sensor with a reference value, controls said first to third drive circuits in accordance with said first display mode when said output value is smaller than said reference value, and controls said first to third drive circuits in accordance with said second display mode when said output value is equal to or greater than said reference value.

21. The projection-type display device as set forth in claim 18, wherein said control unit comprises:
first to third drive circuits that drive first to third light sources;
a sensor that detects brightness of a white screen or black screen in an image that is projected by said projection optics; and
a display mode determination circuit that compares an output value of said sensor with a reference value, controls said first to third drive circuits in accordance with said first display mode when said output value is smaller than said reference value, and controls said first to third drive circuits in accordance with said second display mode when said output value is equal to or greater than said reference value.

22. The projection-type display device as set forth in claim 18, wherein said control unit comprises:
first to third drive circuits that drive said first to third light sources;
a detection unit that detects the degree of enlargement of said projection lens; and a display mode determination circuit that compares the value of the degree of enlargement detected in said detection unit with a reference value, controls said first to third drive circuits in accordance with said first display mode when said value of the degree of enlargement is smaller than said reference value, and controls said first to third drive circuits in accordance with said second display mode when said value of the degree of enlargement is equal to or greater than said reference value.

23. The projection-type display device as set forth in claim 18, wherein said control unit comprises:

first to third drive circuits that drive said first to third light sources;

a video signal processing circuit that takes a histogram of image data from an input video signal, divides said histogram into portions that are lower than a reference luminance level and into portions that are higher than the reference luminance level, judges that the screen is dark when the low portions are more numerous than the high portions, and judges that the screen is bright when the high portions are more numerous than the low portions; and a display mode determination circuit that controls said first to third drive circuits in accordance with said first display mode when said screen is judged to be dark in said video signal processing circuit, and controls said first to third drive circuits in accordance with said second display mode when said screen is judged to be bright in said video signal processing circuit.

24. The projection-type display device as set forth in claim 18, wherein said control unit comprises:

first to third drive circuits that drive said first to third light sources;

a video signal processing circuit that judges whether an input video signal is a moving picture or a still picture; and a display mode determination circuit that controls said first to third drive circuits in accordance with said second display mode when said input video signal is judged to be a still picture in said video signal processing circuit and that controls said first to third drive circuits in accordance with said first display mode when said input video signal is judged to be a moving picture in said video signal processing circuit.

25. The projection-type display device as set forth in claim 18, wherein said control unit comprises:

first to third drive circuits that drive said first to third light sources;

a video signal processing circuit that takes histograms of image data from an input video signal for each of said first to third colors, and when the luminance level of a histogram of a specific primary color is higher than the luminance levels of histograms of other colors, judges that an image based on said image data contains a preponderance of said specific primary color; and a display mode determination circuit that controls said first to third drive circuits in accordance with said first display mode when said video signal processing circuit judges that a preponderance of said specific primary color is contained in said image, and otherwise controls said first to third drive circuits in accordance with said second display mode.

26. A display control method of a projection-type display device that irradiates luminous flux from a first light source that is composed of a solid-state light source of a first color and a solid-state light source of a second color that differs from said first color to a first display element, irradiates luminous flux from a second light source that is composed of another solid-state light source of said second color to a second display element, irradiates luminous flux from a third light source composed of a solid-state light source of a third color that differs from said first and second colors to a third display element, and, by way of the color synthesis optical element as set forth in claim 1, projects images that are formed in said first to third display elements by projection optics; said display control method comprising:

when a first display mode for implementing a display that prioritizes color reproducibility is set, controlling, in accordance with the emitted luminous flux of the light source having the smallest optical output among said first to third light sources, the optical output of the remaining two light sources in a state in which the solid-state light source of said second color in the first light source is not lighted; and when a second display mode for implementing a display that prioritizes brightness is set, lighting all solid-state light sources of the first to third light sources and controlling the optical output of the solid-state light sources of said first and third colors in accordance with the luminous flux obtained by adding together the emitted luminous flux from the solid-state light source of said second color and the emitted luminous flux from the other solid-state light source of said second color.

27. The color synthesis optical element as set forth in claim 5, wherein said yellow wavelength band is at least 560 nm and no greater than 600 nm.

28. The color synthesis optical element as set forth in claim 8, wherein said blue-green wavelength band is at least 480 nm but no greater than 500 nm.

* * * * *